(12) United States Patent
Sugahara et al.

(10) Patent No.: US 11,602,884 B2
(45) Date of Patent: Mar. 14, 2023

(54) PIPE-FORMING APPARATUS FOR SPIRAL PIPE AND PIPE-FORMING METHOD THEREOF

(71) Applicant: SEKISUI CHEMICAL CO., LTD., Osaka (JP)

(72) Inventors: Hiroshi Sugahara, Shiga (JP); Tatsurou Baba, Shiga (JP); Naoya Tsuda, Shiga (JP); Masahiro Yamasaki, Tokyo (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 91 days.

(21) Appl. No.: 17/147,736

(22) Filed: Jan. 13, 2021

(65) Prior Publication Data

US 2021/0129417 A1   May 6, 2021

Related U.S. Application Data

(62) Division of application No. 16/328,929, filed as application No. PCT/JP2017/031282 on Aug. 30, 2017, now Pat. No. 11,148,352.

(30) Foreign Application Priority Data

Aug. 30, 2016 (JP) .................................. 2016-167491
Sep. 13, 2016 (JP) .................................. 2016-178380
Aug. 7, 2017 (JP) .................................. 2017-152491

(51) Int. Cl.
*B29C 63/32* (2006.01)
*B29C 53/78* (2006.01)
(Continued)

(52) U.S. Cl.
CPC .............. *B29C 63/32* (2013.01); *B29C 53/78* (2013.01); *F16L 55/1655* (2013.01); *B29C 53/72* (2013.01)

(58) Field of Classification Search
CPC ......... B29C 63/32; B29C 53/78; B29C 53/72; F16L 55/1655
See application file for complete search history.

(56) References Cited

U.S. PATENT DOCUMENTS 5,595,800 A * 1/1997 Menzel ..................... F16L 9/16
428/34.7
5,799,701 A * 9/1998 Kitahashi ................ B29C 53/78
405/150.1
(Continued)

FOREIGN PATENT DOCUMENTS

CN       102481725      5/2012
EP       2 460 643      6/2012
(Continued)

OTHER PUBLICATIONS

International Search Report dated Oct. 3, 2017 in International (PCT) Application No. PCT/JP2017/031282.
(Continued)

*Primary Examiner* — Alison L Hindenlang
*Assistant Examiner* — Debjani Roy
(74) *Attorney, Agent, or Firm* — Wenderoth, Lind & Ponack, L.L.P.

(57) ABSTRACT

A spiral pipe-forming apparatus includes a non-circular guide portion which is rotatable with respect to an apparatus frame around a rotary axis. The non-circular guide portion is configured to be applied to a peripheral surface of a preceding spiral pipe portion. An acting portion is configured to act such that the non-circular guide portion follows a peripheral surface of an existing pipe.

7 Claims, 36 Drawing Sheets

(51) Int. Cl.
   *F16L 55/165*   (2006.01)
   *B29C 53/72*   (2006.01)

(56) References Cited

U.S. PATENT DOCUMENTS

| | | | |
|---|---|---|---|
| 6,637,092 B1 | 10/2003 | Menzel et al. | |
| 2010/0008731 A1 | 1/2010 | Kakine et al. | |
| 2010/0184577 A1* | 7/2010 | Nakagaki | F16L 55/1655 493/299 |
| 2012/0118482 A1* | 5/2012 | Yamane | F16L 55/1655 156/95 |
| 2014/0190236 A1 | 7/2014 | Tsuda et al. | |

FOREIGN PATENT DOCUMENTS

| | | |
|---|---|---|
| EP | 3 290 182 | 3/2018 |
| EP | 3 437 836 | 2/2019 |
| JP | 4505142 | 7/2010 |
| JP | 4866428 | 2/2012 |
| JP | 2013-256048 | 12/2013 |
| JP | 2014-104610 | 6/2014 |
| JP | 2014-213458 | 11/2014 |
| JP | 2014-238152 | 12/2014 |
| JP | 2015-006744 | 1/2015 |
| JP | 2015-016580 | 1/2015 |
| WO | 2016/115592 | 7/2016 |

OTHER PUBLICATIONS

International Preliminary Report on Patentability and Written Opinion of the International Searching Authority dated Mar. 5, 2019 in International (PCT) Application No. PCT/JP2017/031282.
Supplementary Partial European Search Report dated Feb. 20, 2020 in corresponding European Patent Application No. 17846623.1.
Notice of Submission of Opinions dated Feb. 19, 2020 in corresponding Korean Patent Application No. 10-2019-7004973.
Extended European Search Report dated May 27, 2020 in corresponding European Patent Application No. 17846623.1.
Office Action dated Jun. 3, 2020 in corresponding Chinese Patent Application No. 201780052730.8, with English Translation.
Office Action dated Oct. 29, 2020 in corresponding Indian Patent Application No. 201917008775.

* cited by examiner

PIPE-FORMING APPARATUS FOR SPIRAL PIPE AND PIPE-FORMING METHOD THEREOF

TECHNICAL FIELD

The present invention relates to a pipe-forming apparatus for a spiral pipe and, more particularly, to a pipe-forming apparatus forming a spiral pipe by spirally winding a strip member.

BACKGROUND ART

Known in the related art is rehabilitation of an existing pipe such as an old sewer pipe by means of lining with a rehabilitation pipe. For example, Japanese Patent No. 4866428 discloses a spiral pipe renewal (SPR) construction method as an example of rehabilitation methods. According to the construction method, fitting portions of edges adjacent to each other in a following strip portion of a synthetic resin-based strip member and a preceding spiral pipe portion of the strip member formed in a spiral pipe shape in advance are fitted with each other while the strip member is spirally wound along the inner wall of an existing pipe by means of a pipe-forming apparatus. As the preceding spiral pipe portion is formed, the pipe-forming apparatus is propelled (performs self-traveling). As a result, the spiral pipe is gradually extended.

In this type of pipe-forming apparatus, an inner periphery restriction body is provided inside the preceding spiral pipe portion.

For example, the pipe-forming apparatus disclosed in Japanese Patent No. 4866428 has an annular frame and a plurality of guide rollers as an inner periphery restriction body (link rollers). The guide rollers are disposed at intervals in the circumferential direction of the annular frame. The preceding spiral pipe portion is pressed against each guide roller. As a result, the cross section (including the shape and the diameter or the circumferential length) of the preceding spiral pipe portion, eventually the spiral pipe, is restricted from the inner periphery side.

The pipe-forming apparatus that is disclosed in Japanese Patent No. 4505142 is provided with a plurality of radially extending frames as an inner periphery restriction body. A guide roller is provided in the tip portion of each frame. Tension acts on the preceding spiral pipe portion by the inner peripheral surface of the preceding spiral pipe portion being pressed against the guide rollers. As a result, the cross section of the preceding spiral pipe portion is restricted from the inner periphery side. When the following strip portion is pressed toward the fitting position with the preceding spiral pipe portion, the preceding spiral pipe portion opposes only by the reaction force by the tension, and thus the fitting portion of the following strip portion fits with the fitting portion of the preceding spiral pipe portion.

SUMMARY OF THE INVENTION

Technical Problem

The pipe-forming apparatuses according to the related art have the inner periphery restriction body, which results in structural enlargement and an increase in weight. In addition, in a case where a water pipe such as an existing sewer pipe is rehabilitated by lining with a spiral rehabilitation pipe (spiral pipe), water flow inhibition may result from the inner periphery restriction body disposed inside the rehabilitation pipe (spiral pipe).

A first object of the invention is to provide a pipe-forming apparatus with which a spiral pipe can be formed using a simple configuration without an inner periphery restriction body, and the pipe-forming apparatus is capable of mitigating water flow inhibition during construction in a case where a water pipe such as an existing sewer pipe is rehabilitated by lining with a spiral rehabilitation pipe (spiral pipe).

When the existing pipe has a circular cross section (with a constant curvature in the circumferential direction), the inner periphery restriction body may be kept in a fixed shape regardless of the rotational position of the pipe-forming apparatus. In a case where the existing pipe has a non-circular cross section, the shape of the inner periphery restriction body needs to be changed in accordance with the rotational position of the pipe-forming apparatus. The inner periphery restriction body results in structural enlargement.

In this regard, the inventors of the invention developed a pipe end release-type pipe-forming apparatus that performs pipe forming in a state where most of the pipe end portion in the circumferential direction that is in the extension-direction front of the preceding spiral pipe portion is released from the pipe-forming apparatus. In the pipe-forming apparatus, a driving part presses the following strip portion that follows the preceding spiral pipe portion from the inner periphery side of the preceding spiral pipe portion toward the fitting position with the preceding spiral pipe portion. As a result, the preceding spiral pipe portion and the following strip portion are joined together, a propelling force is obtained. A guide portion is engaged with the preceding spiral pipe portion near the fitting position from the outer periphery side. As a result, pipe forming can be performed even without the inner periphery restriction body. By the inner periphery restriction body being omitted, an existing pipe with a non-circular cross section can be responded to without device enlargement.

A non-circular existing pipe has a place where the curvature of the inner peripheral surface changes along the circumferential direction or a change in angle occurs at a corner or the like. Accordingly, when the guide portion enters a changed peripheral surface portion in a posture preceding a change in curvature or angle, the tip portion of the guide portion may collide with the peripheral surface portion. Then, smooth pipe-forming apparatus propulsion is inhibited.

The invention has been made in view of the above-described circumstances, and a second object of the invention is to provide a pipe-forming apparatus allowing an inner periphery restriction body to be omitted, capable of responding to an existing pipe with a non-circular cross section, and smoothly propelled with the above-described collision prevented.

A strip member for this type of pipe forming tends to be reduced in diameter when spirally wound. With the inner periphery restriction body-equipped pipe-forming apparatus disclosed in Japanese Patent No. 4866428 and Japanese Patent No. 4505142, pipe forming is performed with the strip member tightly wound around the inner periphery restriction body by means of the diameter reduction properties. Accordingly, the cross-sectional area of the inner portion of the rehabilitation pipe tends to decrease.

The pipe end release-type pipe-forming apparatus, in contrast, focuses on maximizing the cross-sectional area of the inner portion of the rehabilitation pipe by performing pipe forming such that the strip member is attached to the inner wall of the existing pipe by being pressed to, for example, the outer periphery side in the inward-outward direction. In this case, the pipe diameter needs to allow expansion and contraction control such that a change in the cross section of the existing pipe can be responded to. However, in the case of a structure in which fitting-based pipe forming is performed on the guide portion on the reverse side (such as the outer periphery side) opposite to the face side of the pipe end portion where the driving part is present, fitting position displacement to the reverse side is hindered by the guide portion on the reverse side. In addition, in a structure in which fitting-based pipe forming is performed solely with the pressing force by the driving part with the guide portion on the face side (such as the inner periphery side) omitted, the fitting-based pipe forming may be impossible as the pressing force is insufficient during small-diameter pipe forming.

The invention has been made in view of the above-described circumstances, and a third object of the invention is to achieve diameter expansion and contraction control and fitting stabilization at the same time in a pipe end release-type pipe-forming apparatus.

Solution to Problem

In order to achieve the first object described above, the invention provides a pipe-forming apparatus forming a spiral pipe by fitting edges of a strip member adjacent with a difference of one lap with each other while spirally winding the strip member. The pipe-forming apparatus includes an apparatus frame disposed on a partial part in a circumferential direction of a pipe end portion of a preceding spiral pipe portion formed in advance of the strip member, the pipe end portion being provided on a forefront side in an extending direction along a pipe axis of the preceding spiral pipe portion, the apparatus frame having a propelling longitudinal direction being along a winding direction of the preceding spiral pipe portion; a driving part provided in the apparatus frame and pressing an unformed following strip portion of the strip member following the preceding spiral pipe portion obliquely with respect to a machine-height direction of the apparatus frame toward the partial part or a vicinity thereof in the preceding spiral pipe portion, the machine-height direction being along an inward-outward direction of the preceding spiral pipe portion; and a pipe end guide provided in a reverse portion of the apparatus frame in the machine-height direction, the pipe end guide being constrained with respect to the pipe end portion in a machine-width direction orthogonal to the propelling longitudinal direction and the machine-height direction, and the pipe end guide being engaged so as to be slidable with respect to the pipe end portion in the propelling longitudinal direction. The pressing force becomes a fitting force for the fitting and a propelling force for forward propulsion. The pipe-forming apparatus performs pipe-forming in a state where a part of the pipe end portion other than the partial part is released from the pipe-forming apparatus.

According to the pipe-forming apparatus of the first aspect, the fitting portions of the following strip portion and the preceding spiral pipe portion can be fitted together by the following strip portion being fed to the preceding spiral pipe portion and a propelling force can be obtained by the cooperative action of the driving part and the pipe end guide. Since the pipe end guide is constrained in the width direction of the strip member, the posture of the pipe-forming apparatus can be stabilized.

As a result, it is possible to form the spiral pipe even without an inner periphery restriction body. The configuration of the pipe-forming apparatus can be simplified by the inner periphery restriction body being omitted. It is possible to mitigate water flow inhibition during construction in a case where a water pipe such as an existing sewer pipe is rehabilitated by lining with the spiral pipe.

The pipe-forming apparatus is a pipe end release-type pipe-forming apparatus that performs pipe forming in a state where the part other than the partial part of the pipe end portion is released from the pipe-forming apparatus. Accordingly, the pipe-forming apparatus has a non-inner periphery restriction structure unlike those disclosed in Japanese Patent No. 4866428 and Japanese Patent No. 4505142. In other words, the pipe-forming apparatus does not have an inner periphery restriction body that restricts the cross section (shape, circumferential length, and diameter) of the pipe end portion of the preceding spiral pipe portion from the inner periphery side.

According to the pipe end release-type pipe-forming apparatus, spiral pipe forming can be performed along not only the inner peripheral surface of an outer periphery restriction structure such as an existing pipe but also the outer peripheral surface of an inner periphery restriction structure such as a pillar body, and thus spiral pipe forming can be performed in a free state without outer and inner periphery restriction structures.

Preferably, an engaging groove portion is formed along an extending direction in the strip member and a groove opening of the engaging groove portion is directed to the reverse side at the part of the preceding spiral pipe portion.

Preferably, the pipe end guide has an engaging portion engaged from the reverse side to the engaging groove portion.

In this manner, it is possible to stably slide the pipe-forming apparatus in the extending direction of the strip member while reliably constraining the pipe-forming apparatus in the machine-width direction with respect to the preceding spiral pipe portion. As a result, the spiral pipe can be smoothly formed.

Preferably, the pipe end guide includes a flat-shaped receiving portion along the propelling longitudinal direction and the receiving portion receives the pipe end portion from the reverse side.

A reaction force against the pressing force can be obtained by the receiving portion and the fitting portions at the adjacent edges of the following strip portion and the preceding spiral pipe portion can be reliably fitted with each other. The receiving portion receives the fitting portion from the reverse side, and thus the fitting can be reliably performed without deformation of the fitting portion even when pressure is applied to the fitting portion during the fitting.

In a case where a rehabilitation pipe (spiral pipe) is built along the inner wall of an existing pipe, it is possible to reduce the amount by which the preceding spiral pipe portion is pulled from the inner wall of the existing pipe for receiving portion insertion by reducing the thickness of the receiving portion.

Preferably, the receiving portion is provided with a rolling body rotatable around an axis of the rolling body and the rolling body protrudes in the machine-height direction from the receiving portion.

As a result, it is possible to reduce the friction between the receiving portion and the preceding spiral pipe portion and form the spiral pipe while smoothly propelling the pipe-forming apparatus. Alternatively, in a case where a rehabilitation pipe (spiral pipe) is built along the inner wall of an existing pipe, the friction between the receiving portion and the existing pipe can be reduced and the pipe-forming apparatus can be smoothly propelled.

Preferably, a ridge portion protruding to the reverse side beyond a fitting portion with the adjacent edge is formed in the strip member, the ridge portion extends along the extending direction of the strip member, and a thickness of the receiving portion is equal to or less than an amount by which the ridge portion protrudes from the fitting portion.

As a result, the receiving portion can be inserted into a gap resulting from the height difference between the ridge portion and the fitting portion.

In a case where a rehabilitation pipe (spiral pipe) is built along the inner wall of an existing pipe, it is possible to insert the receiving portion between the inner wall of the existing pipe and the preceding spiral pipe portion even without separating the preceding spiral pipe portion from the inner wall of the existing pipe. It is possible to reduce the load that is applied to the receiving portion, eventually the pipe end guide, and damage to the pipe end guide can be suppressed or prevented.

Preferably, the pipe end guide includes a guide portion constrained with respect to the pipe end portion in the machine-width direction and engaged so as to be slidable with respect to the pipe end portion in the propelling longitudinal direction. The guide portion is rotatable (swingable) around a rotary axis along the machine-width direction with respect to the apparatus frame.

As a result, it is possible to form the spiral pipe in accordance with the curvature of an existing pipe or the like.

"Rotation" in this specification includes swinging within a certain angular range.

In addition, "rotation" in the present specification includes angle-holdable rotation (angle adjustment) and free rotation.

The pipe end guide may have a plurality of guide portions spaced apart from each other in the propelling longitudinal direction and at least one of the plurality of guide portions may be rotatable (swingable) around the rotary axis with respect to the apparatus frame.

Preferably, the guide portion is freely rotatable (freely swingable) around the rotary axis.

As a result, the angle of the guide portion can be freely adjusted in response to a change in the curvature of an existing pipe or the like. Not only a spiral pipe with a circular cross section but also a spiral pipe with a non-circular cross section can be formed. Preferably, the angle of the guide portion is freely adjustable (freely changeable) around the rotary axis in a state where the pipe-forming apparatus is removed from the preceding spiral pipe portion or the spiral pipe. And preferably, the angle of the guide portion is automatically adjusted in accordance with the curvature of the pipe end portion at a time of pipe forming when the pipe-forming apparatus is engaged with the preceding spiral pipe portion.

The guide portion may have an angle holding portion holding an angle around the rotary axis.

The angle of the guide portion is adjusted in a state where angle holding by the angle holding portion is released. After the adjustment, the angle of the guide portion is held by the angle holding portion being put into operation. As a result, pipe forming can be stably performed at a desired curvature. This case is suitable for making a spiral pipe with a circular cross section.

Preferably, the pipe end guide includes a pressing portion pressing the pipe end portion from a face side opposite to the reverse side.

As a result, separation of the pipe end guide from the pipe end portion can be reliably prevented and pipe forming can be stably performed.

Preferably, the pressing portion is retracted to an extension rear side opposite to the forefront side in the extending direction beyond the following strip portion extruded from the driving part.

As a result, the pressing portion does not interfere with the following strip portion, and it is possible to stably form the pipe while allowing the fitting position to fluctuate in the propelling longitudinal direction.

Preferably, the pipe end guide includes: a movable pressing portion movable in a plane orthogonal to the machine-width direction, the movable pressing portion is disposed on a propulsion rear side of the following strip portion extruded from the driving part and is disposed on a face side opposite to the reverse side beyond the pipe end portion; and a pressing portion biasing device biasing the movable pressing portion toward a propulsion front side or the reverse side along a direction in which the movable pressing portion is movable.

As a result, the following strip portion is always pressed to the pipe end portion side with the fitting position allowed to fluctuate in the propelling longitudinal direction, and thus pipe forming can be stably performed.

Preferably, relative positions of the driving part and the pipe end guide in a plane orthogonal to the machine-width direction are variable.

As a result, not only a spiral pipe with a circular cross section but also a spiral pipe with a non-circular cross section can be formed. Specifically, the relative positions of the driving part and the pipe end guide can be variably adjusted in accordance with the curvature of the pipe end portion with which the pipe end guide is engaged. Accordingly, small- and large-diameter pipes can be stably formed in response to a change in pipe forming curvature, and it is possible to prevent the pipe end guide from detaching from the pipe end portion and the pipe end guide and the pipe end portion from being destroyed.

As the curvature of the pipe end portion changes, the positional relationship between the driving part and the pipe end guide is changed, and thus it is possible to prevent the pipe end guide from destroying the pipe end portion. In addition, in a case where the pipe end portion has a linear portion and a curved portion in the circumferential direction, the positional relationship between the driving part and the pipe end guide is changed between linear portion forming and curved portion forming, so that it is possible to prevent the pressing angle of the following strip portion with respect to the pipe end portion from fluctuating to a large extent. Moreover, it is possible to prevent the pipe end portion from being destroyed by the pipe end guide.

The relative position includes a relative angle between the driving part and the pipe end guide.

The relative positions of the driving part and the pipe end guide may be changed by the driving part undergoing a positional change (including an angular change) with respect to the apparatus frame. The relative positions of the driving part and the pipe end guide may change as a result of deformation of the apparatus frame. The pipe end guide may have a plurality of guide portions spaced apart from each other in the propelling longitudinal direction and the relative positions of the driving part and the pipe end guide may change as a result of a change in the positional relationship of the plurality of guide portions.

Preferably, the relative positions of the driving part and the pipe end guide are freely adjustable (freely changeable)

in a state where the pipe-forming apparatus is removed from the preceding spiral pipe portion or the spiral pipe and the relative positions of the driving part. Preferably, the pipe end guide is automatically adjusted in accordance with the curvature of the pipe end portion at a time of pipe forming when the pipe-forming apparatus is engaged with the preceding spiral pipe portion.

The relative positions of the driving part and the pipe end guide may vary with the force that is received from the preceding spiral pipe portion by engagement with the preceding spiral pipe portion, the reaction force against pressing against the existing pipe, gravity, and another external force.

The relative positions of the driving part and the pipe end guide may be fixable after adjustment. This case is suitable for making a spiral pipe with a circular cross section.

Preferably, the pipe end guide has a plurality of guide portions separated from each other in the propelling longitudinal direction and each of the guide portions includes an engaging portion constrained in the machine-width direction with respect to the pipe end portion and engaged so as to be slidable in the propelling longitudinal direction with respect to the pipe end portion.

As a result, the pipe-forming apparatus can be stably engaged in the pipe end portion and pipe forming can be stably performed.

Preferably, the guide portion avoids the fitting position in disposition.

The fitting position may be displaced in the propelling longitudinal direction.

The fitting position may be disposed on the propulsion rear side beyond the rear end guide portion.

The fitting position may be disposed between the front and rear guide portions.

Preferably, relative positions of the plurality of guide portions in a plane orthogonal to the machine-width direction are variable.

As a result, not only a spiral pipe with a circular cross section but also a spiral pipe with a non-circular cross section can be formed. Compliance with a change in pipe forming curvature is improved, and the pipe end guide becomes less likely to detach from the pipe end portion. In other words, the pipe-forming apparatus becomes unlikely to derail.

Preferably, the relative positions of the plurality of guide portions are freely adjustable (freely changeable) in a state where the pipe-forming apparatus is removed from the preceding spiral pipe portion or the spiral pipe. Preferably, the relative positions of the plurality of guide portions are automatically adjusted in accordance with the curvature of the pipe end portion at a time of pipe forming when the pipe-forming apparatus is engaged with the preceding spiral pipe portion.

The relative positions of the plurality of guide portions may vary with the force that is received from the preceding spiral pipe portion by engagement with the preceding spiral pipe portion, the reaction force against pressing against the existing pipe, gravity, and another external force.

The relative positions of the plurality of guide portions may be fixable after adjustment. This case is suitable for making a spiral pipe with a circular cross section.

Preferably, each guide portion has at least the engaging portion among the engaging portion, the receiving portion, and the pressing portion.

Preferably, the engaging portion is rotatable (swingable) around the rotary axis.

Preferably, the number of the guide portions is three or more from the viewpoint of positioning accuracy and curvature control. Preferably, the number is as small as possible from the viewpoint of simplifying the structure of the pipe-forming apparatus. More preferably, the number of the guide portions is three from both of the viewpoints.

In order to achieve the second object described above, the invention provides a pipe-forming apparatus forming a spiral pipe by joining edges of a strip member adjacent with a difference of one lap with each other while spirally winding the strip member along a peripheral surface of an existing pipe. The pipe-forming apparatus includes, as a second aspect, an apparatus frame disposed on a partial part in a circumferential direction of a pipe end portion of a preceding spiral pipe portion formed in advance of the strip member, the pipe end portion being provided on a forefront side in an extending direction along a pipe axis of the preceding spiral pipe portion, the apparatus frame having a propelling longitudinal direction being along a winding direction of the preceding spiral pipe portion; a driving part provided in the apparatus frame and joining the preceding spiral pipe portion with a following strip portion of the strip member following the preceding spiral pipe portion, the driving part obtaining a propelling force by pressing the following strip portion toward the preceding spiral pipe portion; a non-circular guide portion provided so as to be rotatable with respect to the apparatus frame around a rotary axis directed in a machine-width direction orthogonal to the propelling longitudinal direction, the non-circular guide portion being applied to a peripheral surface on a side of the preceding spiral pipe portion facing the existing pipe; and an acting portion acting such that the guide portion follows the peripheral surface of the existing pipe or the preceding spiral pipe portion, wherein the pipe-forming apparatus performs pipe-forming in a state where a part of the pipe end portion other than the partial part is released from the pipe-forming apparatus.

Preferably, the second aspect of the invention relates to a pipe-forming apparatus forming a spiral pipe by joining edges of a strip member adjacent with a difference of one lap with each other while spirally winding the strip member along a peripheral surface of an existing pipe, and the pipe-forming apparatus includes an apparatus frame disposed with a propelling longitudinal direction along a winding direction of a preceding spiral pipe portion on a partial part in a circumferential direction of a pipe end portion on a forefront side in an extending direction along a pipe axis of the preceding spiral pipe portion formed in advance in the strip member, a driving part provided in the apparatus frame and joining a following strip portion with the preceding spiral pipe portion and obtaining a propelling force by pressing the following strip portion following the preceding spiral pipe portion of the strip member toward the preceding spiral pipe portion, a non-circular guide portion provided so as to be rotatable around a rotary axis facing a machine-width direction orthogonal to a propelling direction with respect to the apparatus frame and directed to a peripheral surface on a side of the preceding spiral pipe portion facing the existing pipe, and an acting portion acting such that the guide portion follows the peripheral surface of the existing pipe or the preceding spiral pipe portion. Preferably, the pipe-forming apparatus is a pipe end release-type pipe-forming apparatus that performs pipe forming in a state where a part other than the partial part of the pipe end portion is released from the pipe-forming apparatus.

According to the pipe-forming apparatus of the second aspect, the edges adjacent to each other can be joined together by the following strip portion being fed to the preceding spiral pipe portion and a propelling force can be obtained by the cooperative action of the driving part and the guide portion. As a result, it is possible to form the spiral pipe even without an inner periphery restriction body. By the inner periphery restriction body being omitted, the spiral pipe can be easily formed along the inner peripheral surface of the existing pipe even when the existing pipe has a non-circular cross section. The acting portion allows the guide portion to follow the peripheral surface of the existing pipe or the preceding spiral pipe portion even when the existing pipe changes in curvature or in angle along the propelling direction. As a result, it is possible to prevent the tip portion of the guide portion from colliding with the inner peripheral surface of the existing pipe, and pipe forming can be performed with the pipe-forming apparatus smoothly propelled along the peripheral surface of the existing pipe or the preceding spiral pipe portion.

Note, the pipe-forming apparatus according to the second aspect is applicable to a pipe-forming apparatus equipped with an inner periphery restriction body such as a link roller as well as a pipe end release-type pipe-forming apparatus.

In the pipe-forming apparatus according to the second aspect, it is preferable that the guide portion includes a flat-shaped receiving portion, and the acting portion acts such that the receiving portion follows the peripheral surface of the existing pipe or the preceding spiral pipe portion.

Preferably, the receiving portion has a thickness direction directed in the machine-height direction along the inward-outward direction of the existing pipe.

Preferably, the thickness of the receiving portion is smaller than the dimensions of the receiving portion along the propelling direction and the width direction.

As a result, the separation amount of the preceding spiral pipe portion from the inner peripheral surface of the existing pipe that is required for the receiving portion to be disposed on the outer periphery of the preceding spiral pipe portion (between the inner peripheral surface of the existing pipe and the preceding spiral pipe portion) can be reduced. The acting portion allows the flat-shaped receiving portion to follow the peripheral surface of the existing pipe or the preceding spiral pipe portion, and thus a collision between the tip portion of the guide portion and the inner peripheral surface of the existing pipe can be reliably prevented even when the existing pipe changes in curvature or angle along the propelling direction.

Preferably, the acting portion includes a leading roller disposed on a propelling-direction front side of the guide portion and the leading roller is capable of coming into contact with the peripheral surface of the existing pipe or the preceding spiral pipe portion.

The leading roller comes into contact with the peripheral surface of the existing pipe or the preceding spiral pipe portion prior to the guide portion, and thus the guide portion is capable of reliably following the peripheral surface of the existing pipe or the preceding spiral pipe portion even when the existing pipe changes in curvature or angle along the propelling direction.

Preferably, the leading roller and the guide portion are connected so as to be integrally rotatable with each other around the rotary axis.

As a result, it is possible to cause the guide portion to reliably follow the peripheral surface of the existing pipe or the preceding spiral pipe portion with a simple structure.

Preferably, the acting portion includes a biasing device that rotationally biases the guide portion around the rotary axis such that a propelling-direction front end portion of the guide portion faces a face side opposite to an existing pipe side.

As a result, the guide portion is capable of reliably following the preceding spiral pipe portion even when the existing pipe changes in curvature or angle along the propelling direction.

In the pipe-forming apparatus according to the second aspect, it is preferable that the rotary axis is disposed on a face side opposite to the guide portion across the preceding spiral pipe portion.

As a result, a rotation mechanism of the guide portion can be disposed with a margin on the inner periphery side of the preceding spiral pipe portion. In other words, a rotation mechanism of the guide portion does not have to be disposed between the preceding spiral pipe portion and the existing pipe, and the guide portion can be sufficiently flat.

Preferably, the pipe-forming apparatus according to the second aspect includes a plurality of guide units separated from each other in the propelling longitudinal direction and each of the guide units includes the guide portion and the acting portion.

As a result, the pipe-forming apparatus can be stably engaged in the preceding spiral pipe portion, and each guide portion is capable of following the peripheral surface of the existing pipe or the preceding spiral pipe portion regardless of the curvature of the existing pipe even when the existing pipe is not circular. Accordingly, pipe forming can be stably performed.

The rotation mechanism of the guide portion in the pipe-forming apparatus according to the second aspect is applicable to a pipe end-constrained pipe-forming apparatus having an inner periphery restriction body such as a link roller as well as a pipe end release-type pipe-forming apparatus.

In order to achieve the third object described above, the invention provides a pipe-forming apparatus forming a spiral pipe by fitting edges of a strip member adjacent with a difference of one lap with each other while spirally winding the strip member. The pipe-forming apparatus includes an apparatus frame disposed on a partial part in a circumferential direction of a pipe end portion of a preceding spiral pipe portion formed in advance of the strip member, the pipe end portion being provided on a forefront side in an extending direction along a pipe axis of the preceding spiral pipe portion, the apparatus frame having a propelling longitudinal direction being along a winding direction of the preceding spiral pipe portion; a driving part provided in the apparatus frame and pressing an unformed following strip portion of the strip member following the preceding spiral pipe portion obliquely with respect to a machine-height direction of the apparatus frame toward the partial part or a vicinity thereof in the preceding spiral pipe portion, the machine-height direction being along an inward-outward direction of the preceding spiral pipe portion; a reverse side guide portion provided away to a propulsion rear side from the driving part in the apparatus frame and engaged with the pipe end portion from a reverse side in the machine-height direction; and a face side guide portion shifted to the propulsion rear side beyond the reverse side guide portion in the apparatus frame and engaged with the pipe end portion from a face side opposite to the reverse side in the machine-height direction. According to the third aspect, a position of the driving part with respect to the apparatus frame is set such that the following strip portion is extruded from the driving part toward an inter-guide clearance between the reverse side guide portion and the face side guide portion, and the pipe-forming apparatus performs pipe-forming in a state where a part of the pipe end portion other than the partial part is released from the pipe-forming apparatus.

According to the pipe-forming apparatus of the third aspect, when it is desired to form a large-diameter pipe, the force with which the following strip portion is pressed to the pipe end portion by the driving part is strengthened. Then, the preceding spiral pipe portion and the following strip portion are fitted in the inter-guide clearance or near the inter-guide clearance while being displaced to the outer periphery side without being hindered by the reverse side guide portion. Accordingly, a large-diameter rehabilitation pipe can be formed. When a large-diameter pipe is formed, fitting and pipe forming can be stably performed by a strong pressing force.

When it is desired to form a small-diameter pipe, the pressing force of the following strip portion by the driving part is weakened. Then, the following strip portion and the preceding spiral pipe portion in the inter-guide clearance are displaced to the inner periphery side and pressed against the face side guide portion owing to the diameter reduction properties at a time of pipe forming of the strip member. Accordingly, fitting can be stably performed during the forming of a small-diameter pipe as well. As a result, diameter expansion and contraction control and fitting stabilization at a time of pipe forming can be achieved at the same time.

In the third aspect described above, the "pipe end portion" refers to approximately one lap part at the front end in the direction (extending direction) in which the preceding spiral pipe portion extends along the pipe axis. The front in the extending direction is referred to as an "extension front side", and the rear in the extending direction is referred to as an "extension rear side".

Substantially, the machine-height direction is directed in the pipe inward-outward direction of the spiral pipe. The base portion side in the machine-height direction is directed to the outer periphery side of the spiral pipe, and the top portion side in the machine-height direction is directed to the inner periphery side of the spiral pipe.

The extrusion direction is directed from the driving part to the propulsion rear side and the base portion side in the machine-height direction.

The position of the driving part with respect to the apparatus frame is not limited to the position of the driving part in the machine-height direction and the position of the driving part in the propelling longitudinal direction but includes the angle of the driving part around an axis along the machine-width direction.

The middle portion of the reverse side guide portion in the propelling longitudinal direction and the middle portion of the face side guide portion in the propelling longitudinal direction may be misaligned with respect to each other in the propelling longitudinal direction, and the propulsion rear side part of the reverse side guide portion and the propulsion front side part of the face side guide portion may be disposed so as to overlap in the propelling longitudinal direction. Alternatively, the entire face side guide portion may be apart from the reverse side guide portion to the propulsion rear side without any overlapping part.

The pipe-forming apparatus is a pipe end release-type pipe-forming apparatus that performs pipe forming in a state where a part other than the partial part of the pipe end portion is released from the pipe-forming apparatus. Accordingly, the pipe-forming apparatus has a non-inner periphery restriction structure that does not have an inner periphery restriction body which restricts the cross section (shape, circumferential length, and diameter) of the pipe end portion of the preceding spiral pipe portion from the inner periphery side.

"Diameter reduction" in the present specification is not limited to the diameter of the spiral pipe decreasing when the spiral pipe has a circular cross section but includes the circumferential length of the spiral pipe decreasing (circumferential length reduction) when the spiral pipe has any cross section.

"Diameter expansion" in the present specification is not limited to the diameter of the spiral pipe increasing when the spiral pipe has a circular cross section but includes the circumferential length of the spiral pipe increasing (circumferential length expansion) when the spiral pipe has any cross section.

In the pipe-forming apparatus according to the third aspect, it is preferable that the driving part is position-adjustably attached to the reverse side guide portion or the face side guide portion or the apparatus frame via a position adjustment mechanism. Preferably, the position adjustment mechanism is capable of holding the position of the driving part after adjustment.

The extrusion direction of the following strip portion can be adjusted by driving part position adjustment. The pressing force of the following strip portion to the pipe end portion can be adjusted by extrusion direction adjustment. As a result, large- and small-diameter rehabilitation pipes can be reliably formed.

In the pipe-forming apparatus according to the third aspect, it is preferable that the position adjustment mechanism includes an angle adjustment mechanism capable of adjusting an angle of the driving part around a rotation axis along a width direction of the apparatus frame. Preferably, the position adjustment mechanism is capable of holding the angle of the driving part after adjustment.

The extrusion direction (extrusion angle) of the following strip portion can be reliably adjusted by driving part angle adjustment and the pressing force of the following strip portion can be reliably adjusted. For example, the pressing force of the following strip portion increases when the extrusion angle of the following strip portion with respect to the propelling longitudinal direction increases. As a result, a large-diameter rehabilitation pipe can be formed. The pressing force of the following strip portion decreases when the extrusion angle decreases. As a result, a small-diameter rehabilitation pipe can be formed.

In the pipe-forming apparatus according to the third aspect, it is preferable that a clamping guide portion is provided on a propulsion front side beyond the reverse side guide portion in the apparatus frame. The clamping guide portion is capable of pinching the pipe end portion from outer and inner periphery sides.

By the pinching force (resistance force) of the preceding spiral pipe portion being adjusted by the clamping guide portion, the pressing force of the following strip portion can be increased and decreased and expansion and contraction control can be performed on the rehabilitation pipe. In other words, when the pinching force is increased, the pressing force of the following strip portion increases and a large-diameter pipe can be formed against the diameter reduction properties of the strip member. When the pinching force is decreased, the pressing force of the following strip portion decreases and a small-diameter pipe can be formed by means of the diameter reduction properties of the strip member.

A strip member according to the invention is a strip member becoming a spiral pipe by being spirally wound. The strip member includes: a first fitting portion formed in an edge portion on one side in a strip-width direction; a second fitting portion formed in an edge portion on the other side in the strip-width direction and fitting with a part of the first fitting portion adjacent with a difference of one lap from one side of the spiral pipe in an inward-outward direction; and a ridge portion provided between the first fitting portion and the second fitting portion in the strip-width direction. The ridge portion is protruded to the other side in the inward-outward direction beyond the first and second fitting portions.

As a result, a pipe end guide can be inserted into a gap resulting from the height difference between the ridge portion and the fitting portion.

In a case where a rehabilitation pipe (spiral pipe) is built along the inner wall of an existing pipe, it is possible to insert the pipe end guide between the inner wall of the existing pipe and the preceding spiral pipe portion even without separating the preceding spiral pipe portion from the inner wall of the existing pipe. Accordingly, it is possible to reduce the load that is applied to the pipe end guide and damage to the pipe end guide can be suppressed or prevented.

Advantageous Effects of the Invention

With the pipe-forming apparatus of the invention, a spiral pipe can be formed using a simple configuration without an inner periphery restriction body. In a case where a water pipe such as an existing sewer pipe is rehabilitated by lining with a spiral rehabilitation pipe (spiral pipe), water flow inhibition during construction and the like can be mitigated by the inner periphery restriction body being omitted.

BRIEF DESCRIPTION OF THE DRAWINGS

FIG. 1($b$) is a cross-sectional view illustrating a rehabilitation-completed existing pipe with the scale of the pipe reduced from FIG. 1($a$).

FIG. 8($b$) is an enlarged view of the circle portion VIIIb in FIG. 8($a$). FIG. 8($c$) is an enlarged view of the circle portion VIIIc in FIG. 8($a$).

FIG. 16($b$) is an explanatory side view illustrating the pipe-forming apparatus according to the eighth embodiment in an intermediate state between the deployed state and a stored state and with the machine-height direction directed upwards and downwards. FIG. 16($c$) is an explanatory side view illustrating the pipe-forming apparatus according to the eighth embodiment in the stored state and with the machine-height direction directed upwards and downwards.

FIG. 26($b$) is a plan cross-sectional view taken along line XXVIb-XXVIb of FIG. 26($a$).

MODE FOR CARRYING OUT THE INVENTION

Hereinafter, embodiments of the invention will be described with reference to accompanying drawings.

First Embodiment

Figure 1A:
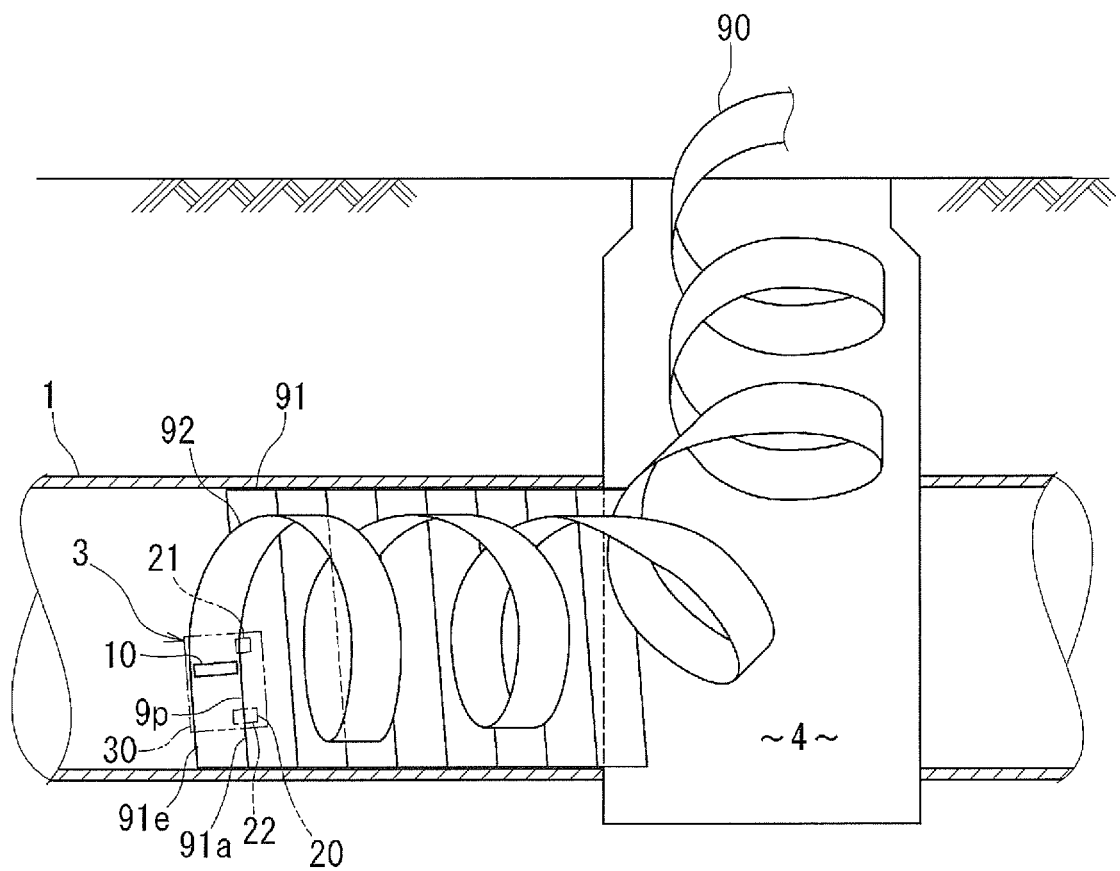
FIG. 1($a$) is a cross-sectional view illustrating how to rehabilitate an existing pipe with a pipe-forming apparatus according to a first embodiment of the invention.
Figure 1B:
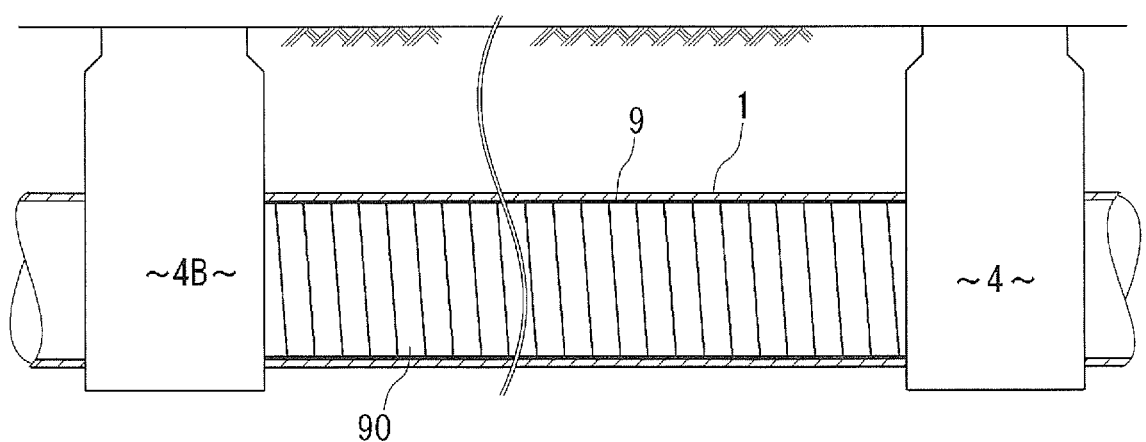

FIG. 1(a) illustrates how to rehabilitate an old existing pipe 1. Examples of the existing pipe 1 include a sewer pipe, a water supply pipe, an agricultural water pipe, and a gas pipe. A rehabilitation pipe 9 (spiral pipe) is lined on the inner wall of the existing pipe 1. As illustrated in FIG. 1(b), the rehabilitation pipe 9 is provided over the entire length of the existing pipe 1 between a starting manhole 4 and an arrival manhole 4B. The rehabilitation pipe 9 is constituted by one long strip member 90 and has a spiral pipe shape. The strip member 90 is spirally wound, and edges adjacent with a difference of one lap are joined to each other.

Figure 2:
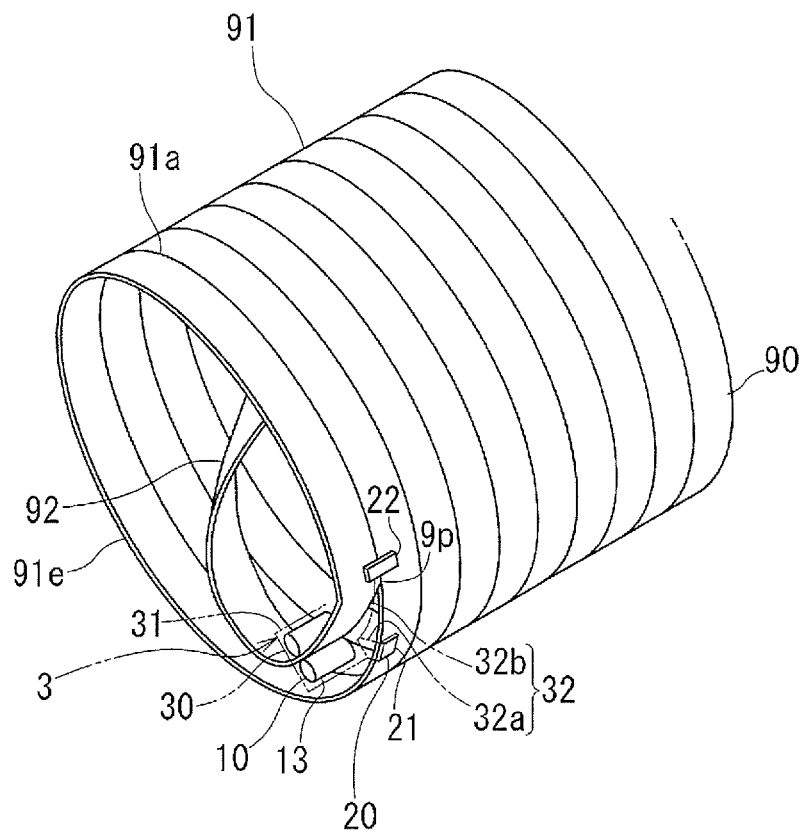
FIG. 2 is a perspective view of a mid-construction rehabilitation pipe (spiral pipe) according to the first embodiment.

As illustrated in FIG. 1(a), the strip member 90 in the course of pipe forming includes a preceding spiral pipe portion 91 and a following strip portion 92. As illustrated in FIG. 2, the strip member 90 is wound in, for example, the clockwise winding direction in FIG. 2. As a result, the spiral pipe-shaped preceding spiral pipe portion 91 is formed. As illustrated in FIG. 1(a), the preceding spiral pipe portion 91 is disposed along the inner wall of the existing pipe 1 from the end portion of the existing pipe 1 on the starting manhole 4 side (right side in FIG. 1(a)).

The unformed following strip portion 92 continues in the winding-direction from the forefront portion of the preceding spiral pipe portion 91. The following strip portion 92 is passed through the inside of the preceding spiral pipe portion 91 and the inside of the starting manhole 4.

Figure 4:
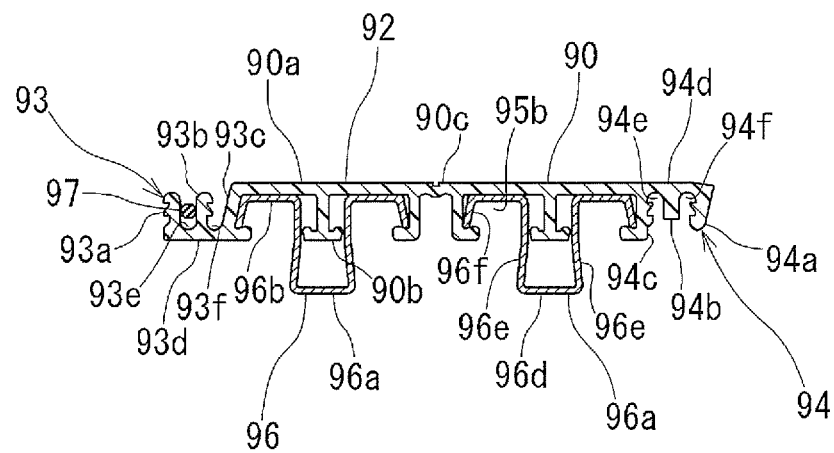
FIG. 4 is a cross-sectional view of a strip member constituting the rehabilitation pipe, which is taken along line IV-IV of FIG. 3.

As illustrated in FIG. 4, the strip member 90 has a constant cross section and extends in a direction orthogonal to the paper surface of FIG. 4. The face side surface (inside surface) of the strip member 90 is directed to the inner periphery side of the preceding spiral pipe portion 91, eventually the rehabilitation pipe 9 (upper side in FIG. 4). The reverse side surface (outside surface) of the strip member 90 is directed to the outer periphery side of the preceding spiral pipe portion 91, eventually the rehabilitation pipe 9 (lower side in FIG. 4).

As illustrated in FIG. 4, the strip member 90 is provided with a strip main body 90a and a reinforcing strip member 96. The material of the strip main body 90a is, for example, a synthetic resin such as polyvinyl chloride. The strip main body 90a includes a flat strip plate portion 90c, a plurality of ribs 90b, and a pair of fitting portions 93 and 94 and extends in a direction orthogonal to the paper surface of FIG. 4. The plurality of ribs 90b are provided on the reverse side surface (outside surface) of the strip plate portion 90c.

As illustrated in FIG. 4, the first fitting portion 93 is formed in the edge portion of the strip plate portion 90c that is on one width-direction side (left side in FIG. 4). The first fitting portion 93 has an uneven cross section protruding to the face side (inner periphery side, upper side in FIG. 4) or open to the face side from a position recessed to the reverse side (outer periphery side, lower side in FIG. 4) beyond the strip plate portion 90c. Specifically, the first fitting portion 93 has three (a plurality of) wall portions 93a, 93b, and 93c and a base portion 93d. The three wall portions 93a, 93b, and 93c are spaced apart from each other by a predetermined distance in the strip-width direction of the strip member 90 (left-right direction in FIG. 4), and each of the three wall portions 93a, 93b, and 93c extends along the extending direction of the strip member 90 (direction orthogonal to the paper surface in FIG. 4). The base portion 93*d* is disposed on the reverse side beyond the strip plate portion 90*c* (lower side in FIG. 4) and connects the three wall portions 93*a*, 93*b*, and 93*c*. Fitting recessed portions 93*e* and 93*f* are formed between the adjacent wall portions 93*a*, 93*b*, and 93*c*. Although the two fitting recessed portions 93*e* and 93*f* are formed by the three wall portions 93*a*, 93*b*, and 93*c*, the invention is not limited thereto, and one fitting recessed portion may be formed by two wall portions or three or more fitting recessed portions may be formed by four or more wall portions. Each of the fitting recessed portions 93*e* and 93*f* is open to the face side (upwards in FIG. 4). A seal member 97 is provided in the fitting recessed portion 93*e*.

The second fitting portion 94 is formed in the edge portion of the strip plate portion 90*c* that is on the other width-direction side (right side in FIG. 4). The second fitting portion 94 has an uneven cross section protruding to the reverse side (outer periphery side, lower side in FIG. 4) or open to the reverse side from a position substantially flush with the strip plate portion 90*c*. Specifically, the second fitting portion 94 has three (a plurality of) wall portions 94*a*, 94*b*, and 94*c* and a base portion 94*d*. The three wall portions 94*a*, 94*b*, and 94*c* are spaced apart from each other by a predetermined distance in the strip-width direction of the strip member 90 (left-right direction in FIG. 4), and each of the three wall portions 94*a*, 94*b*, and 94*c* extends along the extending direction of the strip member 90 (direction orthogonal to the paper surface in FIG. 4). The base portion 94*d* is continuous with the strip plate portion 90*c* without a step and connects the three wall portions 94*a*, 94*b*, and 94*c*. Fitting recessed portions 94*e* and 94*f* are formed between the adjacent wall portions 94*a*, 94*b*, and 94*c*. Although the two fitting recessed portions 94*e* and 94*f* are formed by the three wall portions 94*a*, 94*b*, and 94*c*, one fitting recessed portion may be formed by two wall portions or three or more fitting recessed portions may be formed by four or more wall portions as in the case of the first fitting portion 93. Each of the fitting recessed portions 94*e* and 94*f* is open to the reverse side (downwards in FIG. 4).

Figure 5:
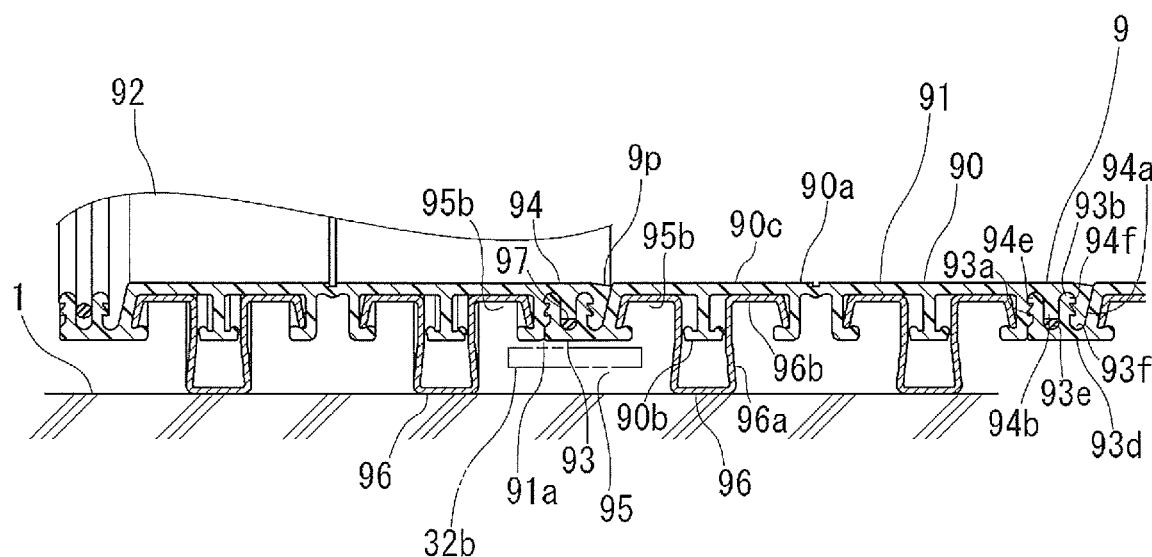
FIG. 5 is a cross-sectional view of a fitting position between a preceding spiral pipe portion and a following strip portion of the rehabilitation pipe, which is taken along line V-V of FIG. 3.

As illustrated in FIG. 5, the fitting portions 93 and 94 adjacent with a difference of one lap in the preceding spiral pipe portion 91, eventually the rehabilitation pipe 9 (FIG. 1(*b*)), are unevenly fitted. The second fitting portion 94 fits into the part of the first fitting portion 93 adjacent with a difference of one lap from the face side (one side, upper side in FIG. 5) of the preceding spiral pipe portion 91, eventually the rehabilitation pipe 9 (spiral pipe), in the inward-outward direction (upward-downward direction in FIG. 5). The first fitting portion 93 is positioned on the reverse side beyond the second fitting portion 94 (the other side in the inward-outward direction, lower side in FIG. 5). Specifically, the wall portion 94*b* fits into the fitting recessed portion 93*e*, and the wall portion 94*a* fits into the fitting recessed portion 93*f*. In addition, the wall portion 93*a* fits into the fitting recessed portion 94*e*, and the wall portion 93*b* fits into the fitting recessed portion 94*f*.

As illustrated in FIGS. 2 and 5, a spiral seam 91*a* resulting from the uneven fitting of the fitting portions 93 and 94 is formed in the preceding spiral pipe portion 91.

As illustrated in FIG. 4, a pair of the reinforcing strip materials 96 are provided on the reverse side of the strip main body 90*a* (lower side in FIG. 4). A metal plate such as a steel plate constitutes the reinforcing strip member 96. The reinforcing strip member 96 has a ridge portion 96*a* and a pair of fixing plate portions 96*b* and extends in a direction orthogonal to the paper surface of FIG. 4 along the strip main body 90*a*. The ridge portion 96*a* is provided between the first fitting portion 93 and the second fitting portion 94 in the strip-width direction (left-right direction in FIG. 4).

The ridge portion 96*a* has a base portion 96*d* and a pair of arm portions 96*e* and 96*e* and has a U-shaped cross section. The pair of arm portions 96*e* and 96*e* are slightly bent in the intermediate portion in the strip thickness direction (upward-downward direction in FIG. 4), and the distance between the pair of arm portions 96*e* and 96*e* increases toward the reverse side (lower side in FIG. 4). Accordingly, the ridge portion 96*a* has the shape of a spreading hem. The base portion 96*d* has a flat plate shape and connects the reverse side end portions of the pair of arm portions 96*e* and 96*e* to each other.

Load resistance enhancement can be achieved by the ridge portion 96*a* having the shape of a spreading hem. In addition, when a back-filling material is filled between the existing pipe 1 and the rehabilitation pipe 9 after pipe forming for the rehabilitation pipe 9, it is possible to enhance the fixing force of the back-filling material to the ridge portion 96*a*.

The ridge portion 96*a* covers the outside of the rib 90*b*. In addition, the ridge portion 96*a* protrudes to the reverse side in a machine-height direction HD (described later, downwards in FIGS. 4 and 5) beyond the strip main body 90*a*, eventually the fitting portions 93 and 94. Specifically, the base portion 96*d* of the ridge portion 96*a* is positioned to protrude to the reverse side (the other side in the inward-outward direction of the spiral pipe 9, lower side in FIG. 4) beyond the base portion 93*d* of the first fitting portion 93. A protrusion amount $H_{96}$ (FIG. 6) of the ridge portion 96*a* from the fitting portion 93 is preferably 3 mm to 10 mm or more and more preferably approximately 10 mm.

The fixing plate portion 96*b* protrudes outwards in the strip-width direction (left-right direction in FIG. 4) from both end portions of the ridge portion 96*a*. The fixing plate portion 96*b* is fixed along the reverse side surface of the strip plate portion 90*c*. An end rib 96*f* is formed in the outer end portion of the fixing plate portion 96*b*. The end rib 96*f* slightly obliquely protrudes outwards in the strip-width direction toward the reverse side of the fixing plate portion 96*b* (lower side in FIG. 4). The end rib 96*f* of the reinforcing strip member 96 on the first fitting portion 93 side (left side in FIG. 4) that is on the first fitting portion 93 side is along the wall portion 93*c*. The end rib 96*f* of the reinforcing strip member 96 on the second fitting portion 94 side (right side in FIG. 4) that is on the second fitting portion 94 side is along the wall portion 94*c*.

As illustrated in FIG. 4, a plurality of groove portions are formed in the reverse side portion (outside portion) of the strip member 90 by the fitting portions 93 and 94 and the ridge portion 96*a* and the rib 90*b* adjacent to each other. For example, an engaging groove portion 95*b* is formed between each of the fitting portions 93 and 94 and the ridge portion 96*a* next to each of the fitting portions 93 and 94. Specifically, the engaging groove portion 95*b* is formed between the arm portion 96*e* of the ridge portion 96*a* and the end rib 96*f* along each of the wall portions 93*c* and 94*c* of the fitting portions 93 and 94. The engaging groove portion 95*b* extends along the extending direction of the strip member 90 (direction orthogonal to the paper surface of FIG. 4).

The engaging groove portion 95*b* has a groove opening that is directed to the outer periphery side of the preceding spiral pipe portion 91 (reverse side in the machine-height direction BD (described later), lower side in FIG. 4).

As illustrated in FIG. 5, a seam outer peripheral groove 95 is formed between the ridge portions 96*a* on both sides (left and right sides in FIG. 5) across the spiral seam 91*a* in the preceding spiral pipe portion 91. The engaging groove portion 95b is integrally connected to each of both width-direction side portions of the seam outer peripheral groove 95.

In FIGS. 1 and 2, illustration of the fitting portions 93 and 94, the rib 90b, the reinforcing strip member 96, the seam outer peripheral groove 95, the engaging groove portion 95b, and so on in the strip member 90 is omitted.

As illustrated in FIGS. 1(*a*) and 2, approximately one lap part of the forefront (left end in FIG. 1(*a*)) of the preceding spiral pipe portion 91 in an extending direction ED extending along the axis of the pipe will be referred to as a "pipe end portion 91e". A pipe-forming apparatus 3 is disposed on a partial part in a circumferential direction of the pipe end portion 91e. The rehabilitation pipe 9 is formed from the strip member 90 during forward propulsion (self-traveling) of the pipe-forming apparatus 3.

A fitting position 9p is set in the pipe-forming apparatus 3. The uneven fitting (joining) of the first fitting portion 93 of the preceding spiral pipe portion 91 and the second fitting portion 94 of the following strip portion 92 is performed at the fitting position 9p.

The fitting position 9p can fluctuate in the propelling longitudinal direction of the pipe-forming apparatus 3 with, for example, a pipe forming curvature and the rigidity of the strip member 90.

Figure 3:
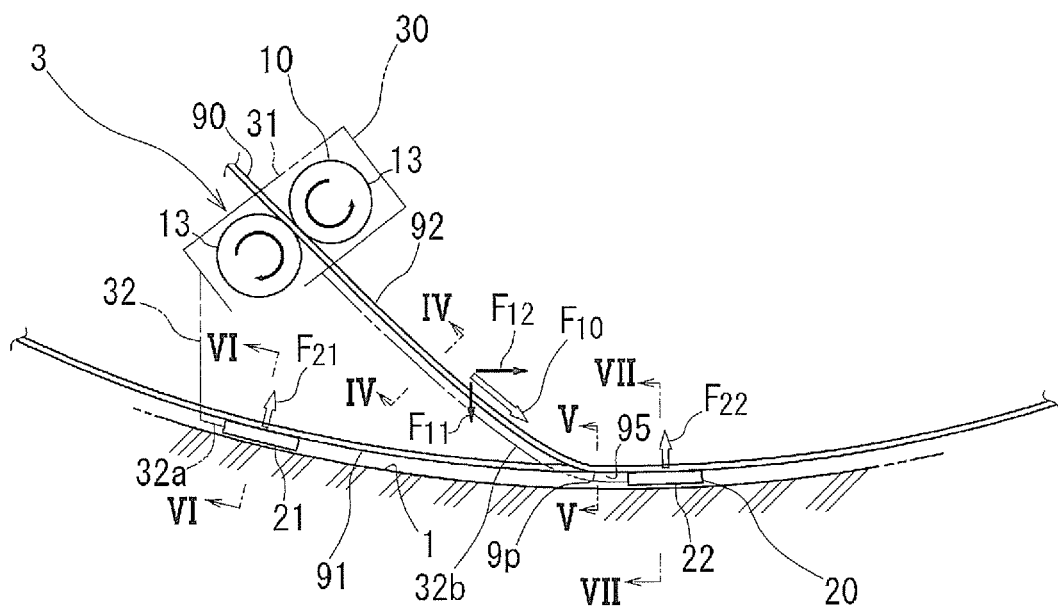
FIG. 3 is a side view schematically illustrating the pipe-forming apparatus in pipe forming according to the first embodiment.

As illustrated in FIG. 3, the pipe-forming apparatus 3 is provided with a driving part 10, a pipe end guide 20, and an apparatus frame 30 schematically indicated by a two-dot chain line.

A propelling longitudinal direction LD of the apparatus frame 30, eventually the pipe-forming apparatus 3, crosses the extending direction ED and is directed so as to be along the winding direction of the preceding spiral pipe portion 91 (clockwise in FIG. 2). A machine-width direction WD of the apparatus frame 30, eventually the pipe-forming apparatus 3, orthogonal to the propelling longitudinal direction LD is inclined by the lead angle of the preceding spiral pipe portion 91 with respect to the axis of the existing pipe 1. The machine-height direction HD of the apparatus frame 30, eventually the pipe-forming apparatus 3, orthogonal to the propelling longitudinal direction LD and the machine-width direction WD is directed in the inward-outward direction or the radial direction of the existing pipe 1 and the preceding spiral pipe portion 91.

As illustrated in FIGS. 2 and 3, the apparatus frame 30 is provided with a housing 31 and a guide connecting portion 32. The housing 31 is provided at the head portion side (inner periphery side or face side, upper side in FIG. 3) and propulsion front side (left side in FIG. 3) part of the apparatus frame 30 in the machine-height direction BD. The guide connecting portion 32 includes a front side connecting arm 32a and a rear side connecting arm 32b. The front side connecting arm 32a extends from the housing 31 to the reverse side in the machine-height direction BD (outer periphery side or back side, downwards in FIG. 3).

The rear side connecting arm 32b obliquely extends from the housing 31 to the propulsion rear side and the reverse side in the machine-height direction HD. The following strip portion 92 is attached to the face side (upper side in FIG. 3) of the rear side connecting arm 32b. As illustrated in FIGS. 3 and 5, a part near the tip of the rear side connecting arm 32b is inserted into the seam outer peripheral groove 95 from the outer periphery side or the reverse side (lower side in FIGS. 3 and 5) of the fitting position 9p.

The driving part 10 and the pipe end guide 20 are provided in the apparatus frame 30. The relative positions between the driving part 10 and guide portions 21 and 22 are fixed by the apparatus frame 30.

The driving part 10 is accommodated in the housing 31. The driving part 10 is disposed apart from the fitting position 9p to the propulsion front side (left side in FIG. 3) and the inner periphery side of the preceding spiral pipe portion 91 (upper side in FIG. 3).

The driving part 10 includes a pair of driving rollers 13 and 13. The axis of the driving roller 13 is directed in the machine-width direction WD of the pipe-forming apparatus 3 (direction orthogonal to the paper surface in FIG. 3). By the pair of driving rollers 13 and 13, the following strip portion 92 is pinched from the inner periphery side (face side) and the outer periphery side (reverse side). A rotary drive mechanism (not illustrated) such as a motor is connected to at least one driving roller 13. The driving roller 13 is rotationally driven around its own axis by the rotary drive mechanism. The rotation direction of the driving roller 13 is set to a direction in which the following strip portion 92 is obliquely pressed with respect to the radial direction (machine-height direction HD) of the preceding spiral pipe portion 91 from the inner periphery side of the preceding spiral pipe portion 91 toward the fitting position 9p.

As illustrated in FIG. 3, the pipe end guide 20 is provided in the reverse portion of the apparatus frame 30 in the machine-height direction HD (on the lower side in FIG. 3). The pipe end guide 20 is disposed away from the driving part 10 to the reverse side (outer periphery side) in the machine-height direction HD. The pipe end guide 20 is constrained in the machine-width direction WD with respect to the pipe end portion 91e of the preceding spiral pipe portion 91 and is engaged so as to be slidable in the propelling longitudinal direction LD.

As illustrated in FIGS. 2 and 3, the pipe end guide 20 includes the two (plurality of) guide portions 21 and 22 that are separated from each other in the propelling longitudinal direction LD. The front side guide portion 21 is connected to and supported by the tip portion of the front side connecting arm 32a. The front side guide portion 21 is disposed on the propulsion front side (left side in FIG. 3) beyond the fitting position 9p.

Figure 6:
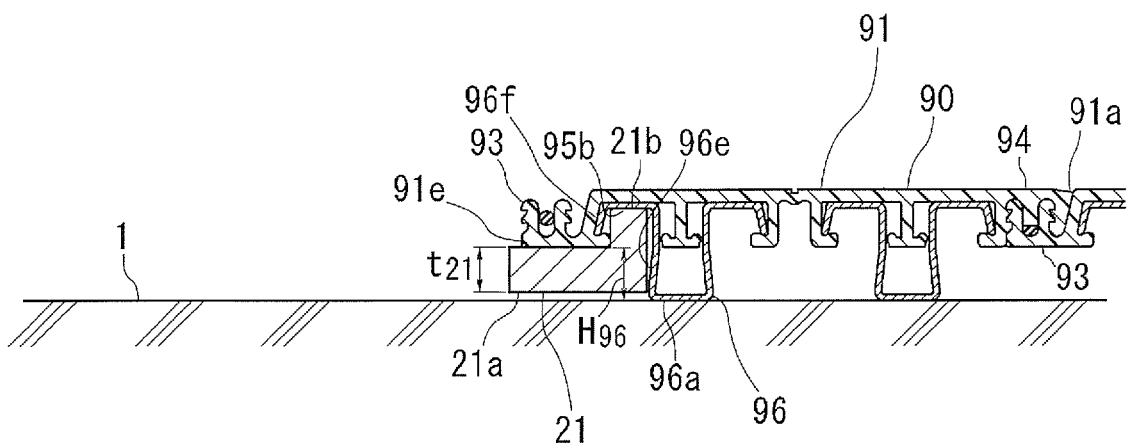
FIG. 6 is a cross-sectional view of a front side guide portion of the pipe-forming apparatus, which is taken along line VI-VI of FIG. 3.

As illustrated in FIG. 6, the front side guide portion 21 has a receiving portion 21a and an engaging portion 21b. The receiving portion 21a has a flat shape along the outer periphery of the preceding spiral pipe portion 91. A thickness $t_{21}$ of the receiving portion 21a is equal to or less than the protrusion amount $H_{96}$ of the ridge portion 96a from the fitting portion 93 ($t_{21} \leq H_{96}$). The engaging portion 21b is provided in one width-direction end portion of the receiving portion 21a (end portion facing the reverse side of the preceding spiral pipe portion 91, right end portion in FIG. 6). The engaging portion 21b protrudes from the receiving portion 21a to the inner periphery side (upper side in FIG. 6).

The receiving portion 21a receives the fitting portion 93 in the pipe end portion 91e (left end portion in FIG. 6) of the preceding spiral pipe portion 91 from the outer periphery side of the preceding spiral pipe portion 91 (reverse side in the machine-height direction HD). The engaging portion 21b is engaged to the engaging groove portion 95b from the outer periphery side of the preceding spiral pipe portion 91 (reverse side in the machine-height direction HD). As a result, the front side guide portion 21 is capable of sliding in the propelling longitudinal direction LD with respect to the preceding spiral pipe portion 91 and is restricted (constrained) in terms of movement in the machine-width direction WD with respect to the preceding spiral pipe portion 91.

The engaging portion 21b is fitted between the end rib 96f and the arm portion 96e on both sides of the engaging groove portion 95b.

As illustrated in FIG. 6, the reinforcing strip member 96 slightly protrudes to the outer periphery side (lower side in FIG. 6) beyond the front side guide portion 21. Alternatively, the outer periphery side end surfaces of the reinforcing strip member 96 and the receiving portion 21a (lower surfaces in FIG. 6) may be flush with each other.

As illustrated in FIG. 3, the rear side guide portion 22 is disposed away from the propulsion rear side of the front side guide portion 21. The rear side guide portion 22 is connected to and supported by the tip portion of the rear side connecting arm 32b.

As illustrated in FIGS. 2 and 3, the rear side guide portion 22 is disposed on the spiral seam 91a on the propulsion rear side beyond the fitting position 9p (right side in FIG. 3). The fitting position 9p is disposed between the front side guide portion 21 and the rear side guide portion 22. Preferably, the rear side guide portion 22 is disposed closer to the fitting position 9p than the front side guide portion 21. The distance from the fitting position 9p to the rear side guide portion 22 is smaller than the distance from the fitting position 9p to the front side guide portion 21.

Figure 7:
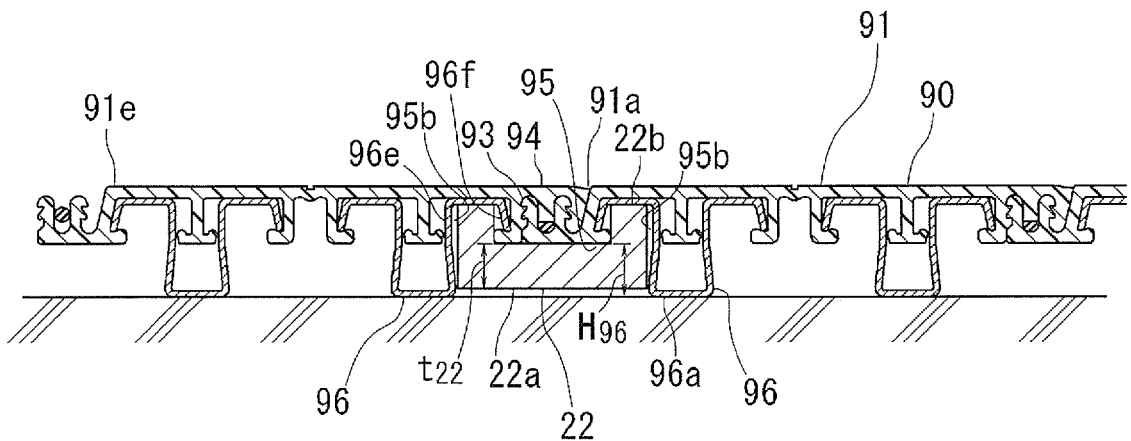
FIG. 7 is a cross-sectional view of a rear side guide portion of the pipe-forming apparatus, which is taken along line VII-VII of FIG. 3.

As illustrated in FIG. 7, the rear side guide portion 22 has a receiving portion 22a and an engaging portion 22b. The receiving portion 22a has a flat shape along the outer periphery of the preceding spiral pipe portion 91. A thickness $t_{22}$ of the receiving portion 22a is equal to or less than the protrusion amount $H_{96}$ of the ridge portion 96a ($t_{22} \leq H_{96}$). The engaging portion 22b is provided in each of both width-direction end portions of the receiving portion 22a. Each engaging portion 22b protrudes from the receiving portion 22a to the inner periphery side (upper side in FIG. 7).

The receiving portion 22a is accommodated in the seam outer peripheral groove 95. The receiving portion 22a receives the peripheral part of the spiral seam 91a of the preceding spiral pipe portion 91 from the outer periphery side (reverse side in the machine-height direction HD). Further, a pair of the engaging portions 22b are respectively engaged to the engaging groove portions 95b on both sides of the seam outer peripheral groove 95 from the outer periphery side (reverse side in the machine-height direction HD). As a result, the rear side guide portion 22 is capable of sliding in the propelling longitudinal direction LD with respect to the preceding spiral pipe portion 91 and is restricted (constrained) in terms of movement in the machine-width direction WD with respect to the preceding spiral pipe portion 91.

The engaging portion 22b is fitted between the end rib 96f and the arm portion 96e on both sides of the engaging groove portion 95b.

As illustrated in FIG. 7, the reinforcing strip member 96 slightly protrudes to the outer periphery side (lower side in FIG. 7) beyond the rear side guide portion 22. Alternatively, the outer periphery side end surfaces of the reinforcing strip member 96 and the receiving portion 22a (lower surfaces in FIG. 7) may be flush with each other.

The rehabilitation pipe 9 is formed by the pipe-forming apparatus 3 as follows.

As illustrated in FIG. 1(a), it is assumed that the preceding spiral pipe portion 91 is formed to some extent along the inner wall of the existing pipe 1.

The strip member 90 (following strip portion 92) is introduced from the starting manhole 4 through the inside of the preceding spiral pipe portion 91 to the pipe-forming apparatus 3 disposed in the pipe end portion 91e of the preceding spiral pipe portion 91.

As illustrated in FIG. 3, the following strip portion 92 is pressed toward the fitting position 9p by the driving roller 13 of the driving part 10 being driven to rotate. A pressing force $F_{10}$ is directed obliquely to the radial direction of the preceding spiral pipe portion 91. Along with this, the preceding spiral pipe portion 91 is pressed against the guide portions 21 and 22. As a result of the reaction, a normal force $F_{21}$ acts on the contact portion of the preceding spiral pipe portion 91 with the front side guide portion 21. A normal force $F_{22}$ acts on the contact portion of the preceding spiral pipe portion 91 with the rear side guide portion 22. By a radial component force $F_{11}$ of the pressing force $F_{10}$ and the normal forces $F_{21}$ and $F_{22}$, the second fitting portion 94 of the following strip portion 92 and the first fitting portion 93 of the preceding spiral pipe portion 91 are fitted together at the fitting position 9p (FIG. 5).

Further, the pipe-forming apparatus 3 is propelled forwards in the winding direction of the preceding spiral pipe portion 91 (in the leftward direction in FIG. 3) with a circumferential component force $F_{12}$ of the pressing force $F_{10}$ acting as a propulsion reaction force. As a result, the preceding spiral pipe portion 91 can be extended, and eventually the rehabilitation pipe 9 can be formed.

In this manner, pipe forming is performed in a state where the part other than the partial part at which the pipe-forming apparatus 3 is provided in the circumferential direction of the preceding spiral pipe portion 91 is released from the pipe-forming apparatus 3. According to the pipe-forming apparatus 3, no inner periphery restriction body is necessary. Even without an inner periphery restriction body, the rehabilitation pipe 9 can be formed by the cooperative action of the driving part 10 and the pipe end guide 20. The configuration of the pipe-forming apparatus 3 can be simplified by the inner periphery restriction body being omitted. As a result of the absence of the inner periphery restriction body, it is possible to mitigate water flow inhibition in the existing pipe 1. Even when the existing pipe 1 has a non-circular cross section, pipe forming can be performed such that the rehabilitation pipe 9 reliably follows the cross-sectional shape of the existing pipe 1.

Even in the presence of a member protruding to the reverse side beyond the fitting portions 93 and 94 of the strip member 90, the reinforcing strip member 96 to be specific, the fitting portions 93 and 94 are bent to the reverse side (outer periphery side) by the pressing force $F_{10}$ and it is possible to prevent the fitting from becoming insufficient.

The engaging portions 21b and 22b are engaged in the engaging groove portion 95b. As a result, the pipe end guide 20 can be smoothly slid in the extending direction of the strip member 90 (circumferential direction or winding direction of the preceding spiral pipe portion 91) while being constrained in the width direction of the strip member 90 (axial direction of the preceding spiral pipe portion 91). Since the pipe end guide 20 is constrained in the width direction of the strip member 90, the posture of the pipe-forming apparatus 3 can be stabilized. The pipe-forming apparatus 3 can be fastened to the strip member 90 in a total of three places, that is, the driving part 10 and the two guide portions 21 and 22, and the posture of the pipe-forming apparatus 3 can be further stabilized.

The engaging portions 21b and 22b are engaged between the end rib 96f and the arm portion 96e of the metallic reinforcing strip member 96, and thus positioning in the machine-width direction WD can be firmly performed.

Since the guide portions 21 and 22 avoid the fitting position 9p in disposition, it is possible to allow the preceding spiral pipe portion 91 at the fitting position 9p to be displaced in the diameter-expanding direction by the action of the pressing force $F_{10}$. As a result, the preceding spiral pipe portion 91 can be pressed against the inner wall of the existing pipe 1, and pipe forming can be performed such that no clearance is formed between the rehabilitation pipe 9 and the existing pipe 1.

Further, by the thicknesses $t_{21}$ and $t_{22}$ of the flat thin plate-shaped receiving portions 21a and 22a being equal to or less than the protrusion amount $H_{96}$ of the ridge portion 96a ($t_{21} \leq H_{96}$, $t_{22} \leq H_{96}$), the guide portions 21 and 22 can be disposed between the inner wall of the existing pipe 1 and the preceding spiral pipe portion 91 even without separation of the preceding spiral pipe portion 91 from the inner wall of the existing pipe 1. In addition, damage to the guide portions 21 and 22 can be suppressed or prevented.

Next, other embodiments of the invention will be described. In the following embodiments, the same reference numerals are appropriately attached to the configurations that overlap with those of the above-described embodiment, and description thereof is omitted.

Second Embodiment

Figure 8A:
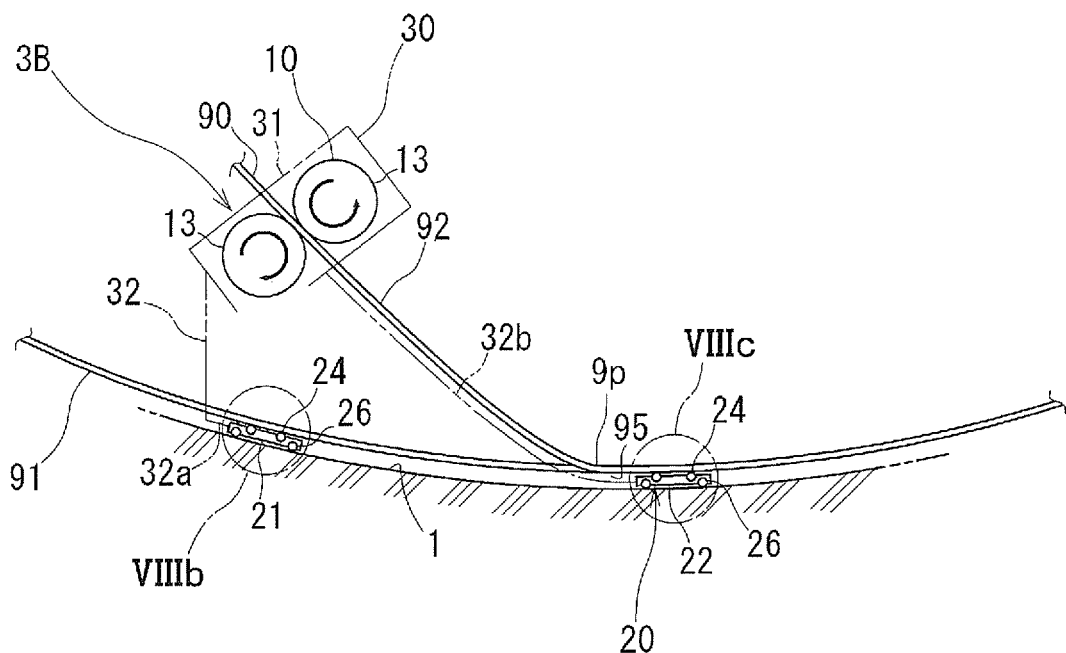
FIG. 8($a$) is a side view illustrating a second embodiment of the invention and schematically illustrating a pipe-forming apparatus in pipe forming.

FIG. 8 illustrates a pipe-forming apparatus 3B according to a second embodiment of the invention. As illustrated in FIG. 8(a), rolling bodies 24 and 26 are respectively provided in the receiving portions 21a and 22a of the guide portions 21 and 22 of the pipe-forming apparatus 3B so as to protrude in the machine-height direction HD. Each of the rolling bodies 24 and 26 is rotatable around its own axis.

Figure 8B:
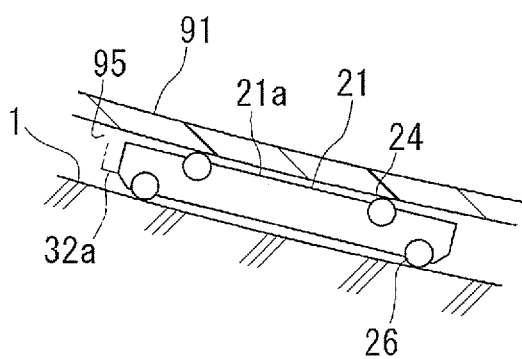
Figure 8C:
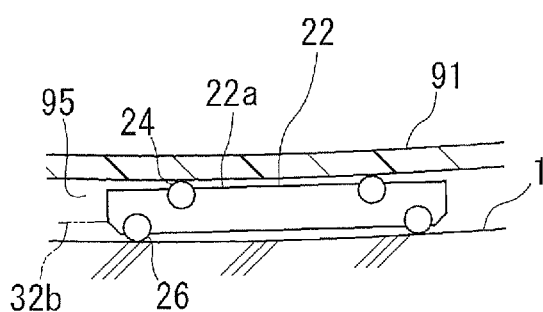

As illustrated in FIGS. 8(b) and 8(c), the inside rolling body 24 (rolling body) is disposed so as to slightly protrude from the inner peripheral surfaces of the receiving portions 21a and 22a (upper surfaces in FIG. 8). The axis of the inside rolling body 24 is directed parallel to the axis of the driving roller 13. The inside rolling body 24 is capable of rolling in contact with the outer peripheral surface of the preceding spiral pipe portion 91. The receiving portions 21a and 22a are not in contact with the preceding spiral pipe portion 91.

The outside rolling body 26 is disposed so as to slightly protrude from the outer peripheral surfaces of the receiving portions 21a and 22a (lower surfaces in FIG. 8). The axis of the outside rolling body 26 is directed parallel to the axis of the driving roller 13. The outside rolling body 26 is capable of rolling in contact with the inner peripheral surface (inner wall) of the existing pipe 1. The receiving portions 21a and 22a are not in contact with the existing pipe 1.

According to the second embodiment, during pipe forming for the rehabilitation pipe 9, the inside rolling body 24 rolls on the outer peripheral surface of the preceding spiral pipe portion 91 as the pipe-forming apparatus 3B is propelled. As a result, it is possible to sufficiently reduce the friction between the guide portions 21 and 22 and the preceding spiral pipe portion 91. The outside rolling body 26 rolls on the inner peripheral surface of the existing pipe 1. As a result, it is possible to sufficiently reduce the friction between the guide portions 21 and 22 and the existing pipe 1. As a result, the pipe-forming apparatus 3B can be smoothly propelled.

Third Embodiment

Figure 9:
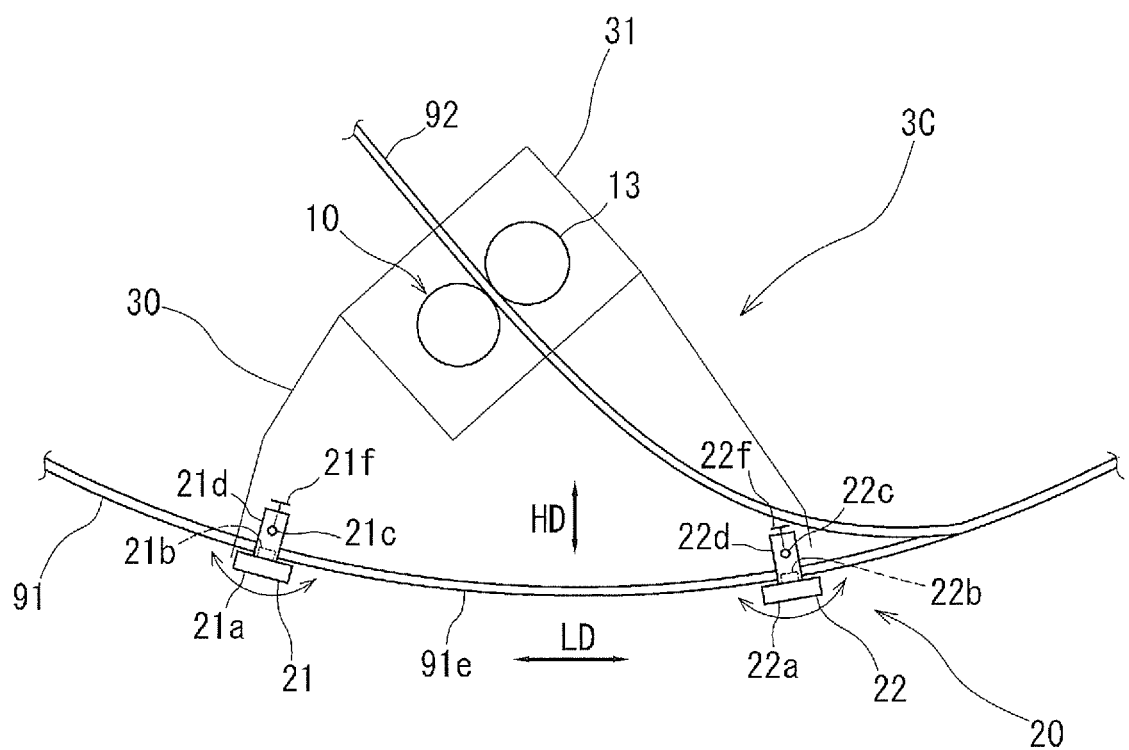
FIG. 9 is an explanatory side view of a pipe-forming apparatus according to a third embodiment of the invention.

FIG. 9 illustrates a pipe-forming apparatus 3C according to a third embodiment of the invention. In the pipe-forming apparatus 3C, the front side guide portion 21 is rotatably connected to the apparatus frame 30 via a rotary axis 21c along the machine-width direction WD orthogonal to the paper surface of FIG. 9. The front side guide portion 21, eventually the receiving portion 21a, is angle-adjustable (rotatable) around the rotary axis 21c with respect to the apparatus frame 30.

The rotary axis 21c is disposed on the inner periphery side beyond the preceding spiral pipe portion 91 (face side opposite to the reverse side, upper side in FIG. 9). The rotary axis 21c and the receiving portion 21a are connected by a connecting portion 21d.

The rotary axis 21c may be disposed in the middle portion of the receiving portion 21a or the like.

The front side guide portion 21 is provided with an angle holding portion 21f. The angle holding portion 21f includes, for example, a bolt. The angle holding portion 21f is tightened after the angle of the front side guide portion 21 is adjusted in a state where the angle holding portion 21f is loose. Then, the front side guide portion 21 can be held at a desired angle.

Likewise, the rear side guide portion 22 is rotatably connected to the apparatus frame 30 via a rotary axis 22c along the machine-width direction WD orthogonal to the paper surface of FIG. 9. The rear side guide portion 22, eventually the receiving portion 22a, is angle-adjustable (rotatable) around the rotary axis 22c with respect to the apparatus frame 30.

The rotary axis 22c is disposed on the inner periphery side beyond the preceding spiral pipe portion 91 (upper side in FIG. 9). The rotary axis 22c and the receiving portion 22a are connected by a connecting portion 22d.

The rotary axis 22c may be disposed in the middle portion of the receiving portion 22a or the like.

The rear side guide portion 22 is provided with an angle holding portion 22f. The angle holding portion 22f includes, for example, a bolt. The angle holding portion 22f is tightened after the angle of the rear side guide portion 22 is adjusted in a state where the angle holding portion 22f is loose. Then, the rear side guide portion 22 can be held at a desired angle.

In the pipe-forming apparatus 3C of the third embodiment, the angle of each of the guide portions 21 and 22 can be adjusted in accordance with the curvature of the inner periphery of the existing pipe 1 (see FIG. 1). As a result, even when the existing pipe 1 has a non-circular cross section, pipe forming can be performed such that the inner periphery is reliably followed. When the curvature is within a certain range, the angles of the guide portions 21 and 22 are kept constant by the angle holding portions 21f and 22f, and thus pipe forming can be stably performed.

Figure 10:
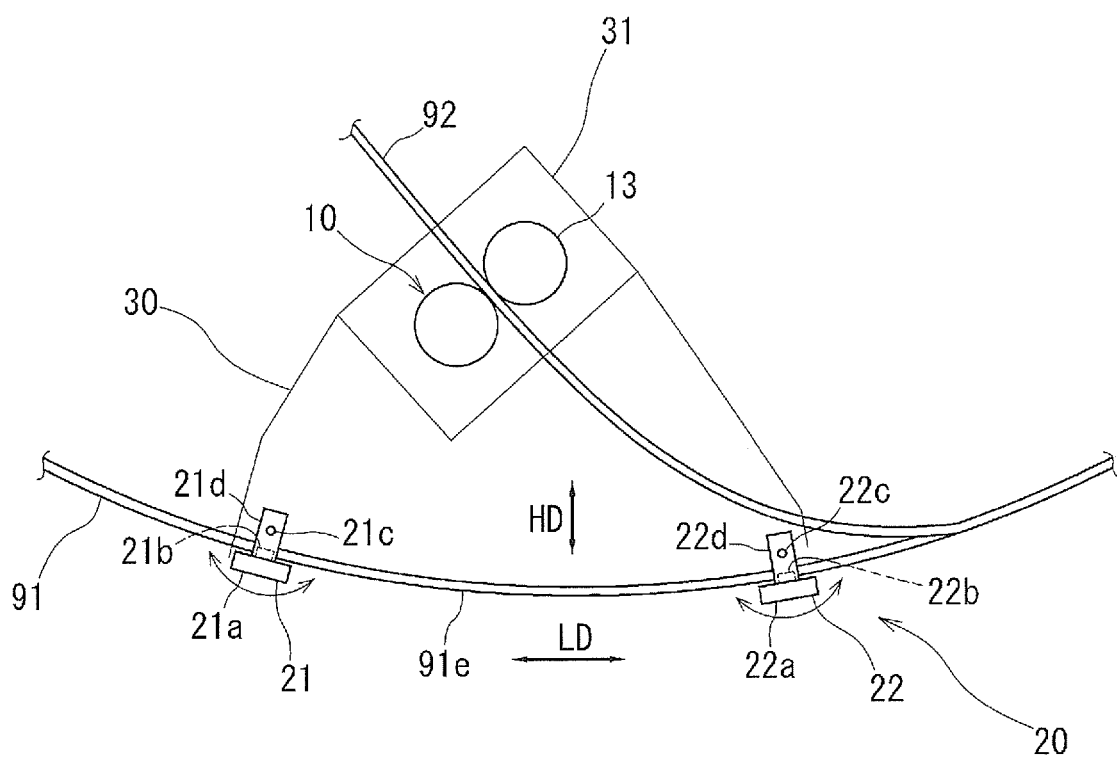
FIG. 10 is an explanatory side view of a pipe-forming apparatus according to a modification example of the third embodiment.

FIG. 10 relates to a modification example of the third embodiment. In the modification example, the angle holding portion 21f is not provided in the front side guide portion 21. The front side guide portion 21 freely rotates around the rotary axis 21c.

Likewise, the angle holding portion 22f is not provided in the rear side guide portion 22. The rear side guide portion 22 freely rotates around the rotary axis 22c.

According to this embodiment, the angles of the guide portions 21 and 22 are freely changed in response to a change in the curvature of the existing pipe 1 (see FIG. 1). As a result, pipe forming can be smoothly performed as it is unnecessary to adjust the angles of the guide portions 21 and 22 each time the curvature changes.

Fourth Embodiment

Figure 11:
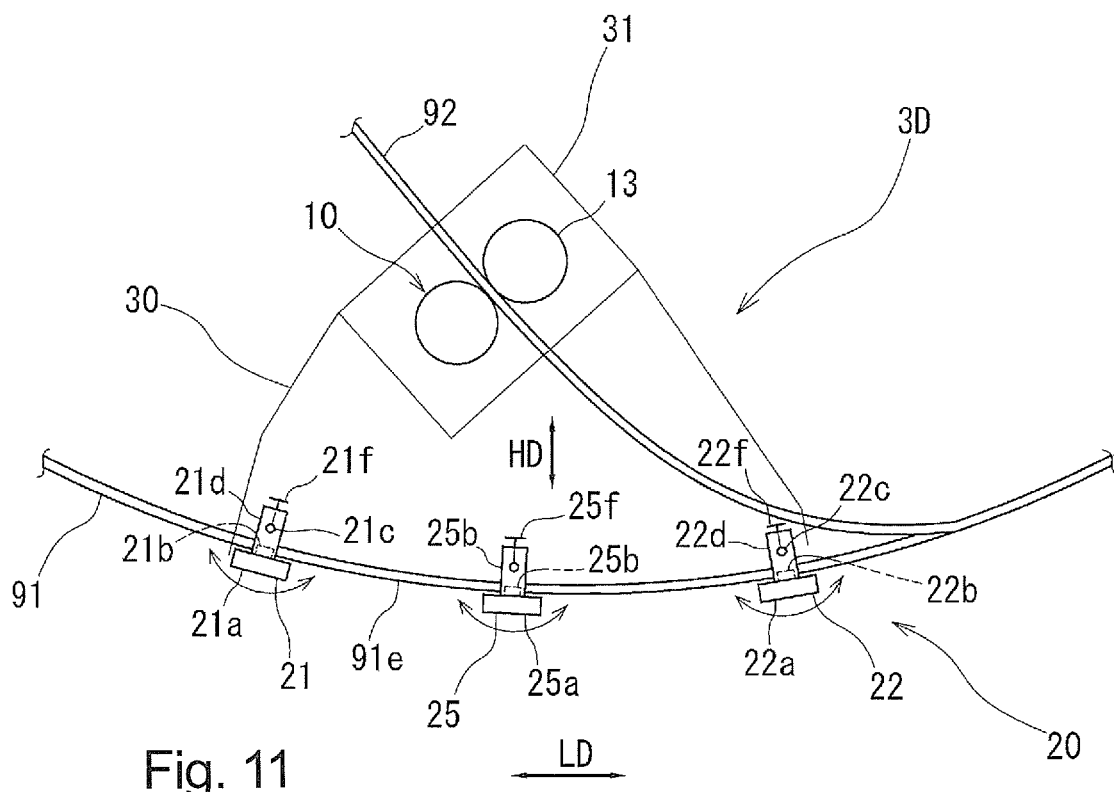
FIG. 11 is an explanatory side view of a pipe-forming apparatus according to a fourth embodiment of the invention.

FIG. 11 illustrates a pipe-forming apparatus 3D according to a fourth embodiment of the invention. In the pipe-forming apparatus 3D, the pipe end guide 20 is provided with three guide portions 21, 25, and 22. The guide portions 21, 25, and 22 are separated from each other in the propelling longitudinal direction LD. As in the case of the front and rear guide portions 21 and 22, the intermediate guide portion 25 has a receiving portion 25a, an engaging portion 25b, and an angle holding portion 25f.

According to the pipe-forming apparatus 3D, engaging to the pipe end portion 91e of the preceding spiral pipe portion 91 can be stably performed by the three guide portions 21, 25, and 22. A constant pipe forming curvature can be achieved by the angles of the three guide portions 21, 25, and 22 being adjusted to each other.

In the fourth embodiment, each of the guide portions 21, 25, and 22 of the pipe-forming apparatus 3D may be freely rotatable as in FIG. 10. Alternatively, the angle of each of the guide portions 21, 25, and 22 may be fixed as in the first embodiment.

The number of guide portions may be four or more. Four or more guide portions may be disposed apart from each other in the propelling longitudinal direction LD.

Fifth Embodiment

Figure 12:
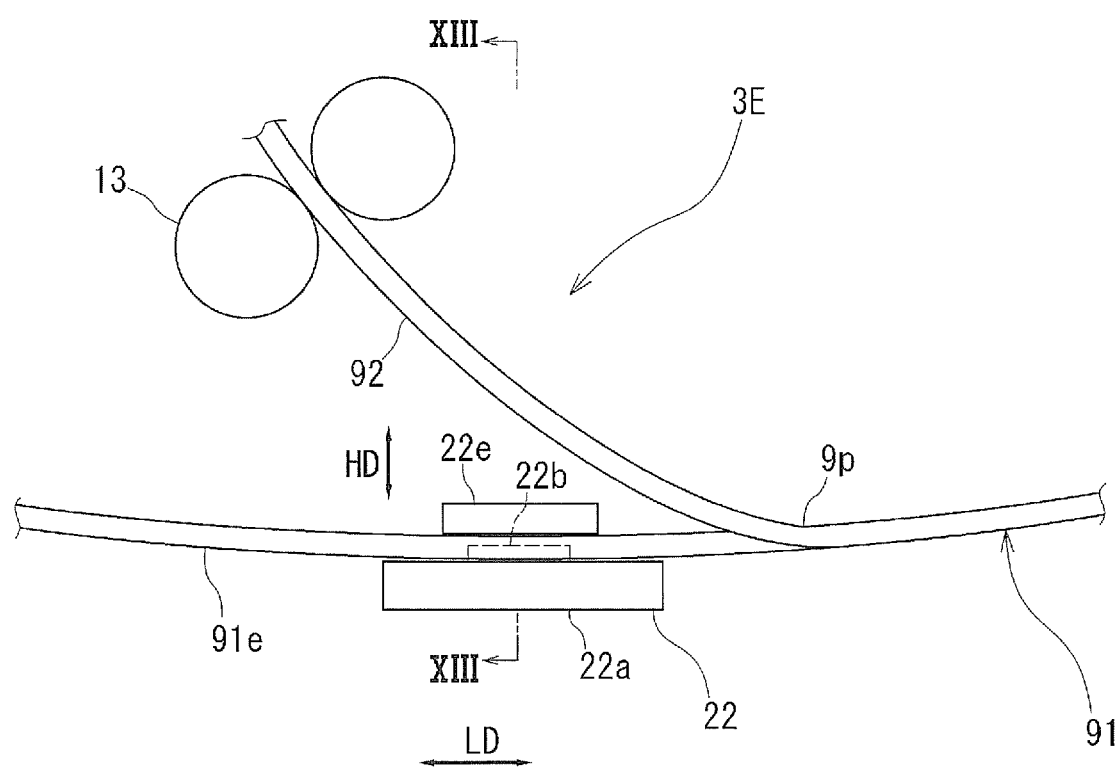
FIG. 12 is an explanatory side view illustrating a part of a pipe-forming apparatus according to a fifth embodiment of the invention.
Figure 13:
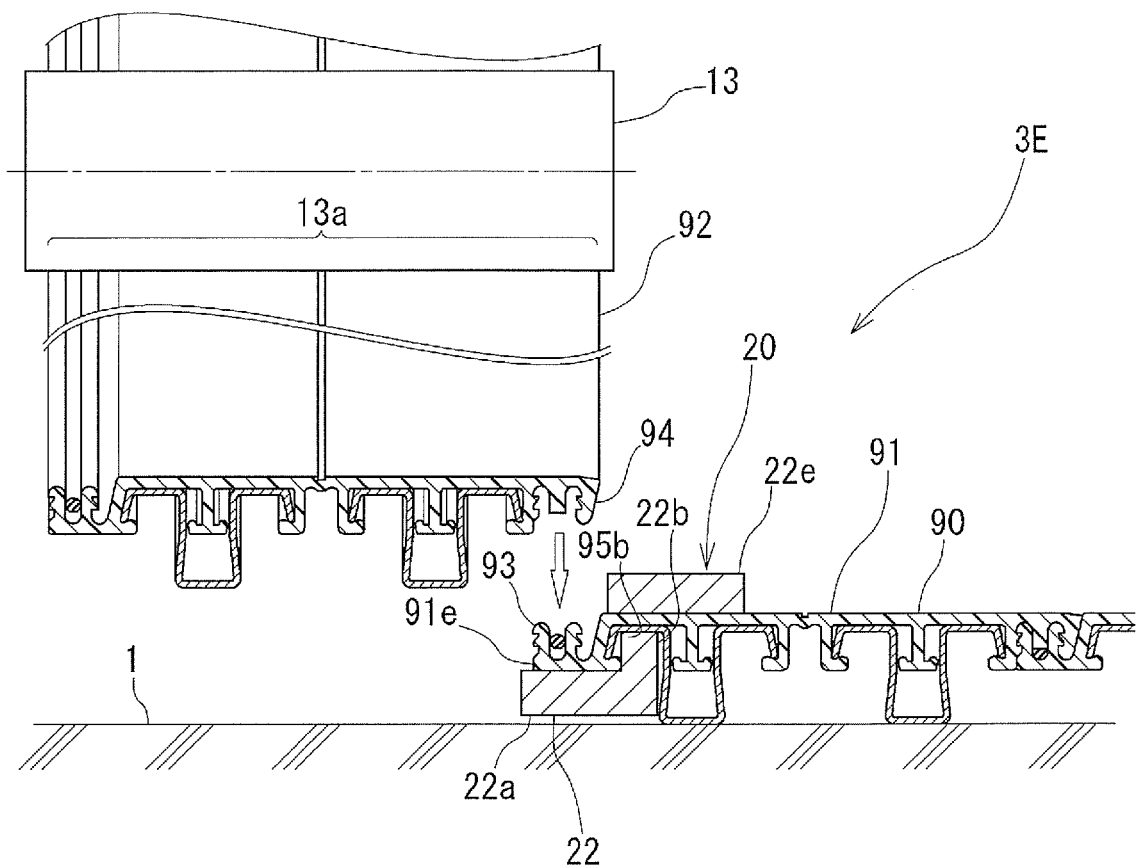
FIG. 13 is a cross-sectional view of a rear side guide portion of the pipe-forming apparatus according to the fifth embodiment, which is taken along line XIII-XIII of FIG. 12.

FIGS. 12 and 13 illustrate a pipe-forming apparatus 3E according to a fifth embodiment of the invention. As illustrated in FIG. 12, in the pipe-forming apparatus 3E, the rear side guide portion 22 near the fitting position 9p has a pressing portion 22e. The pressing portion 22e is formed in, for example, a flat plate shape and is disposed on the inner periphery side of the preceding spiral pipe portion 91 (upper side in FIG. 12). The pressing portion 22e and the receiving portion 22a face each other the machine-height direction HD across the pipe end portion 91e of the preceding spiral pipe portion 91.

The pressing portion 22e may be shifted in the propelling longitudinal direction LD with respect to the receiving portion 22a.

As illustrated in FIG. 13, the pressing portion 22e presses the pipe end portion 91e from the inner periphery side (face side opposite to the reverse side in the machine-height direction HD). The pipe end portion 91e is pinched by the pressing portion 22e and the receiving portion 22a.

As a result, it is possible to reliably prevent the engaging portion 22b from detaching from the engaging groove portion 95b and, in turn, it is possible to reliably prevent the guide portion 22 from detaching from the pipe end portion 91e. Further, it is possible to stably perform a fitting operation at the fitting position 9p near the guide portion 22.

As illustrated in FIG. 13, the pressing portion 22e is retracted to the extension rear side in the machine-width direction WD (right side in FIG. 13) beyond a contact portion 13a of the driving roller 13 with the following strip portion 92. Consequently, the pressing portion 22e is retracted to the extension rear side by the following strip portion 92 extruded from the driving roller 13.

Accordingly, the pressing portion 22e and the following strip portion 92 do not interfere with each other even when the following strip portion 92 between the driving part 10 and the fitting position 9p moves up and down in the machine-height direction HI) as the fitting position 9p fluctuates in the propelling longitudinal direction LD. In other words, the fitting position 9p can be allowed to fluctuate.

Sixth Embodiment

Figure 14:
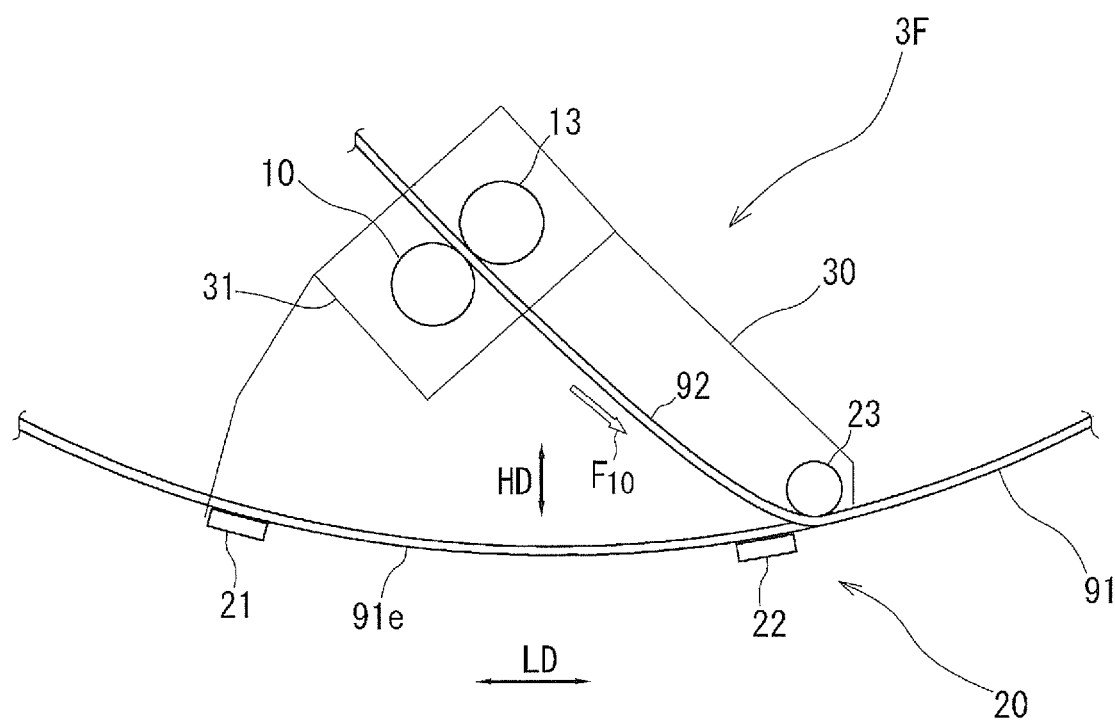
FIG. 14 is an explanatory side view of a pipe-forming apparatus according to a sixth embodiment of the invention.

FIG. 14 illustrates a pipe-forming apparatus 3F according to a sixth embodiment of the invention. In the pipe-forming apparatus 3F, the pipe end guide 20 includes a rear stage pressing portion 23 (pressing portion). The rear stage pressing portion 23 is constituted by a cylindrical roller. The axis of the roller-shaped rear stage pressing portion 23 is directed in the machine-width direction WD orthogonal to the paper surface of FIG. 14. The rear stage pressing portion 23 is rotatable around the axis.

The rear stage pressing portion 23 is disposed at the same position as the driving roller 13 in the machine-width direction WD (direction orthogonal to the paper surface of FIG. 14), on the propulsion rear side beyond the rear side guide portion 22 (right side in FIG. 14), and on the inner periphery side of the preceding spiral pipe portion 91 (upper side in FIG. 14). The rear stage pressing portion 23 is applied to the inner peripheral surface of the pipe end portion 91e.

According to the pipe-forming apparatus 3F, provisional fitting is performed between the fitting portions 93 and 94 (see FIG. 5) with the pressing force $F_{10}$ by the driving part 10, and then proper fitting can be performed by pressing by the rear stage pressing portion 23. Accordingly, fitting between the fitting portions 93 and 94 with the pressing force $F_{10}$ alone is unnecessary.

Seventh Embodiment

Figure 15:
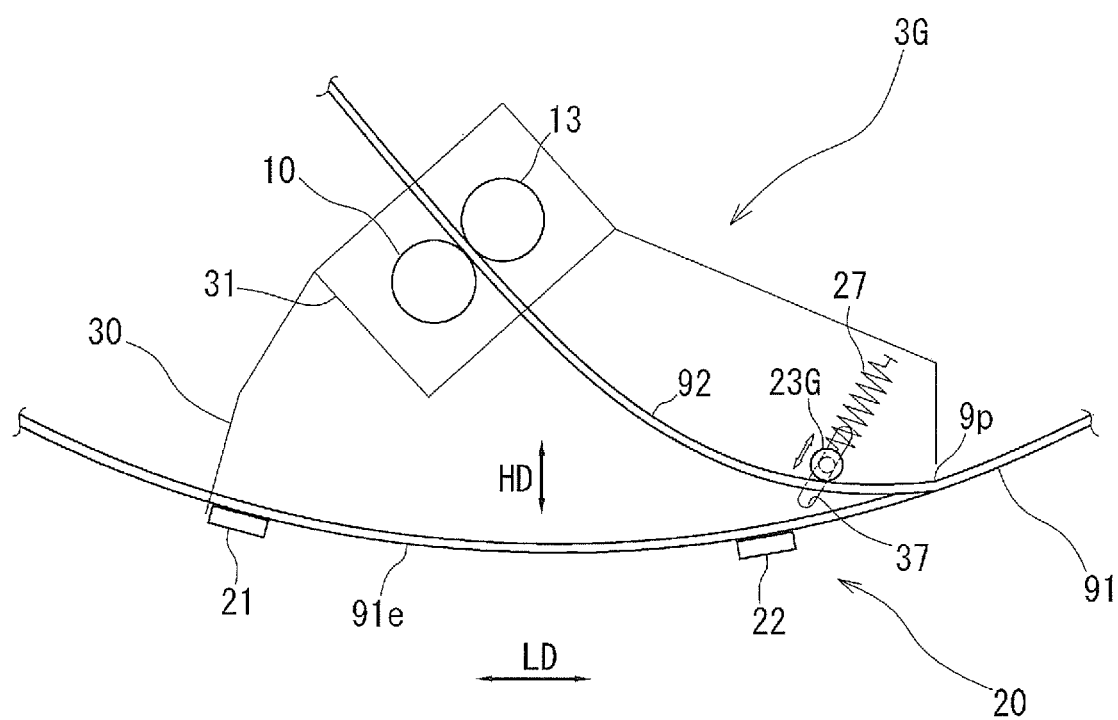
FIG. 15 is an explanatory side view of a pipe-forming apparatus according to a seventh embodiment of the invention.

FIG. 15 illustrates a pipe-forming apparatus 3G according to a seventh embodiment of the invention. In the pipe-forming apparatus 3G, a roller-shaped rear stage pressing portion 23G is movable. The movable pressing portion 23G is disposed on the propulsion rear side of the following strip portion 92 extruded from the driving part 10 (right side in FIG. 15) and on the inner periphery side of the pipe end portion 91e (face side opposite to the reverse side in the machine-height direction HD).

The apparatus frame 30 is provided with a guide rail 37. The guide rail 37 is inclined to the head portion side in the machine-height direction HD (upper side in FIG. 15) as the guide rail 37 becomes farther from the vicinity of the rear side guide portion 22 to the propulsion rear side (right side in FIG. 15).

The movable pressing portion 23G is movable along the guide rail 37 in a plane orthogonal to the machine-width direction WD.

As in the case of the third embodiment (FIG. 9), the guide portion 22 may be adjustable in angle and allowed to be held at a post-adjustment angle or may be freely rotatable as in FIG. 10.

The pipe end guide 20 is provided with a pressing portion biasing device 27. The pressing portion biasing device 27 is constituted by, for example, a coil spring and biases the movable pressing portion 23G to the rear side guide portion 22 side.

The fitting position 9p is disposed on the propulsion rear side (right side in FIG. 15) beyond the rear side guide portion 22. The fitting position 9p can be disposed on the propulsion rear side (right side in FIG. 15) beyond the movable pressing portion 23G.

According to the pipe-forming apparatus 3G of the seventh embodiment, the biasing force of the pressing portion biasing device 27 causes the movable pressing portion 23G to be pressed against the unfitted following strip portion 92 near the fitting position 9p and the following strip portion 92 to be pressed to the outer periphery side (lower side in FIG. 15). As a result, the following strip portion 92 can be reliably fitted with the preceding spiral pipe portion 91.

When the fitting position 9p fluctuates in the propelling longitudinal direction LD due to, for example, a change in the curvature of the inner peripheral surface of the existing pipe 1 (see FIG. 1), the following strip portion 92 near the fitting position 9p moves up and down in the machine-height direction BD. Then, the movable pressing portion 23G is displaced along the guide rail 37 by being pushed up by the following strip portion 92 or pushed down by the pressing portion biasing device 27. As a result, the following strip portion 92 is allowed to move up and down and, in turn, the fitting position 9p is allowed to fluctuate. The movable pressing portion 23G always presses the following strip portion 92 to the outer periphery side regardless of the displacement position, and thus fitting between the preceding spiral pipe portion 91 and the following strip portion 92 can be stably performed.

Eighth Embodiment

Figure 16:
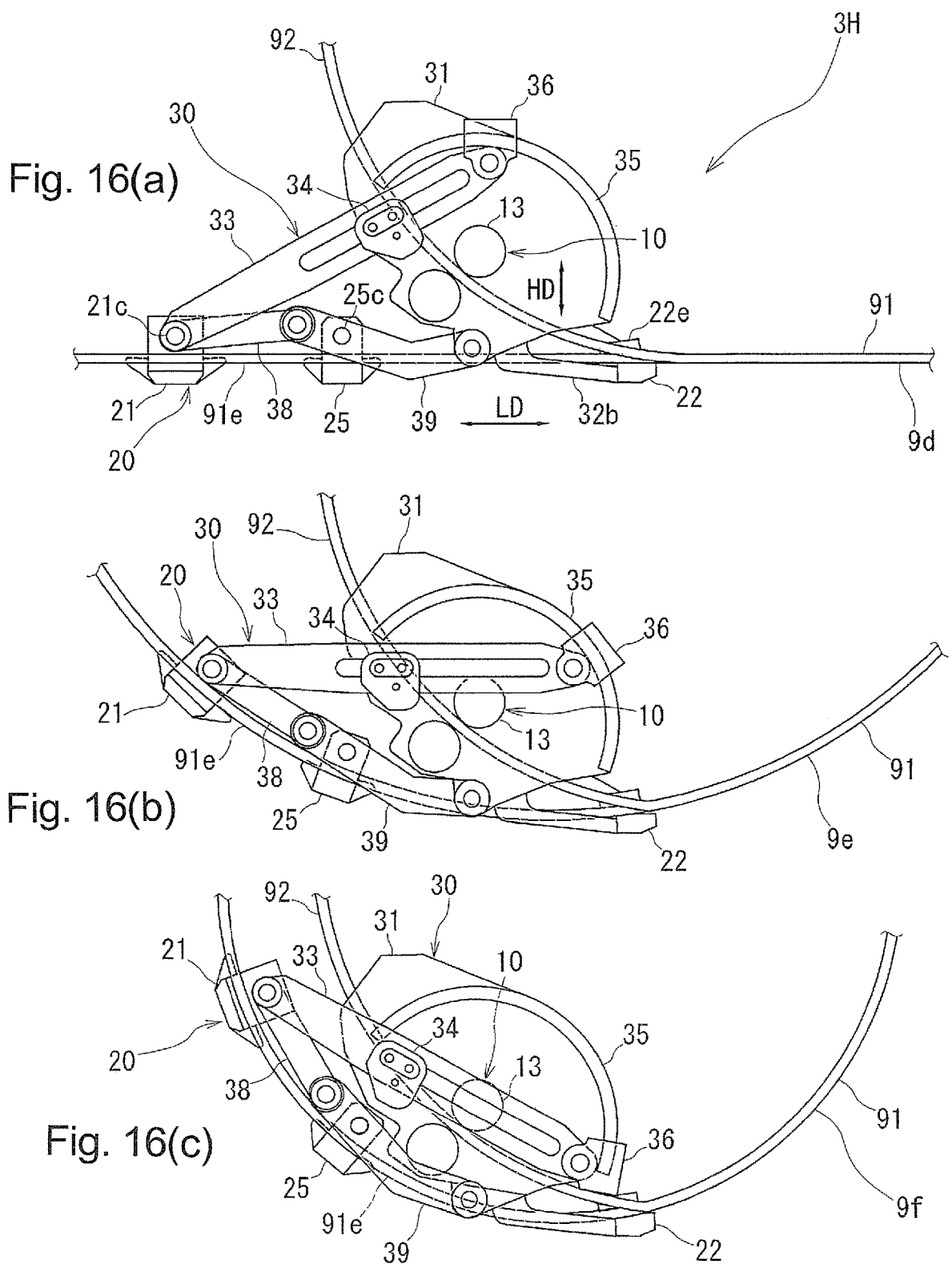
FIG. 16($a$) is an explanatory side view illustrating a pipe-forming apparatus according to an eighth embodiment of the invention in a deployed state and with a machine-height direction directed upwards and downwards.
Figure 17:
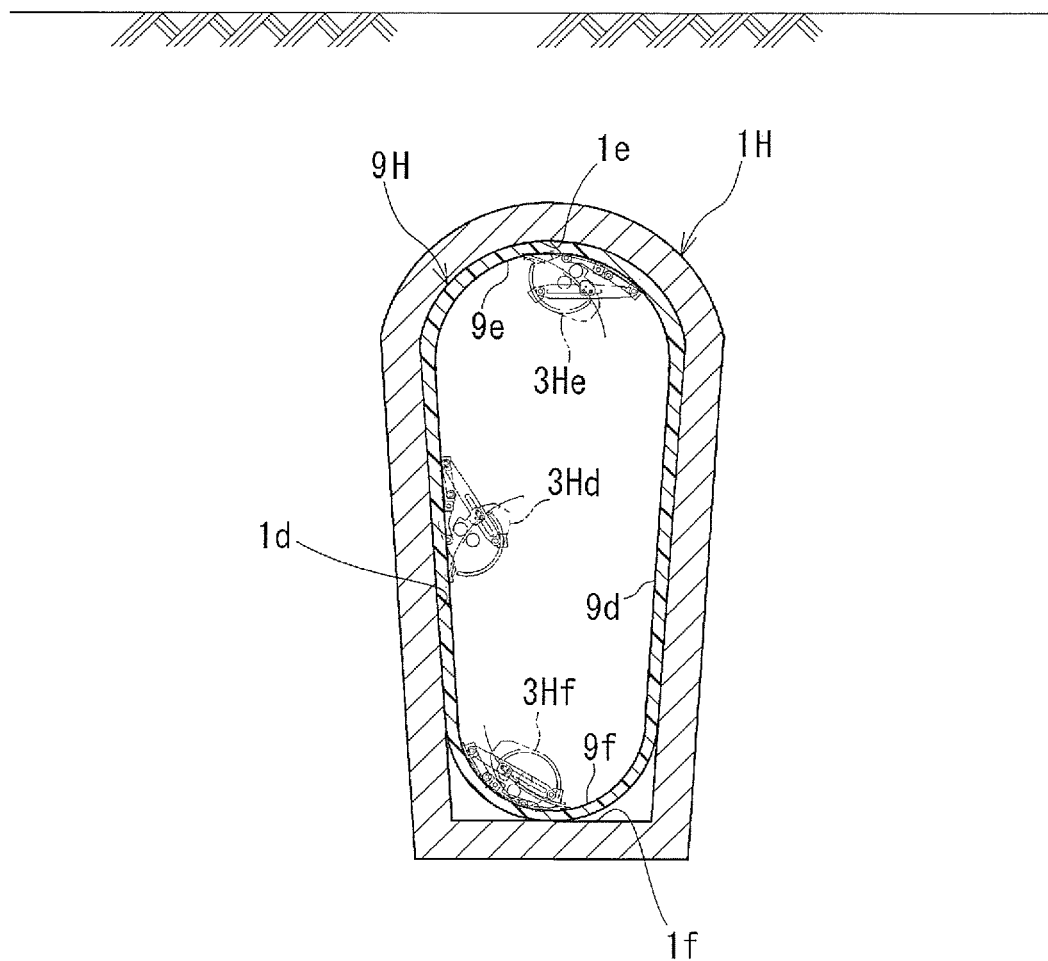
FIG. 17 is a cross-sectional view illustrating an example of a rehabilitation-completed existing pipe according to the eighth embodiment, in which the pipe-forming apparatus in pipe forming is indicated by an imaginary line at three circumferential positions.

FIGS. 16 and 17 illustrate an eighth embodiment of the invention. As illustrated in FIG. 16, in a pipe-forming apparatus 3H of the eighth embodiment, the apparatus frame 30 has an articulated link structure. As a result, the relative positions (including the relative angles) of the driving part 10 and the pipe end guide 20 in a plane orthogonal to the machine-width direction WD can be adjusted.

Specifically, the apparatus frame 30 of the pipe-forming apparatus 3H includes a rising frame member 33, a slide block 34, a circular track 35, a track block 36, a front side link 38, and an intermediate link 39.

The intermediate link 39 extends to the propulsion front side (left side in FIG. 16) from the reverse portion of the housing 31 in the machine-height direction BD. The rear end portion (right end in FIG. 16) of the intermediate link 39 is connected to the housing 31 so as to be rotatable around an axis along the machine-width direction WD (direction orthogonal to the paper surface of FIG. 16).

The intermediate guide portion 25 is provided at a part near the front end portion (left end portion in FIG. 16) of the intermediate link 39. The angle of the intermediate guide portion 25 may be fixed with respect to the intermediate link 39 or the intermediate guide portion 25 may be rotatable (angle-adjustable) around a rotary axis 25c with respect to the intermediate link 39, eventually the driving part 10. Further, the intermediate guide portion 25 may be freely rotatable or may be capable of holding a post-angle adjustment angle.

The front side link 38 is connected to the front end portion of the intermediate link 39 so as to be rotatable around an axis along the machine-width direction WD (direction orthogonal to the paper surface of FIG. 16). The front side link 38 extends from the intermediate link 39 to the propulsion front side (leftwards in FIG. 16).

The front side guide portion 21 is provided in the front end portion (left end portion in FIG. 16) of the front side link 38. The angle of the front side guide portion 21 may be fixed with respect to the front side link 38 or the front side guide portion 21 may be rotatable (angle-adjustable) around the rotary axis 21c with respect to the front side link 38, eventually the driving part 10. Further, the front side guide portion 21 may be freely rotatable or may be capable of holding a post-angle adjustment angle.

The rising frame member 33 is bridged between the front side link 38 and the housing 31. The rising frame member 33 extends obliquely with respect to the machine-height direction HD, and the front end portion of the rising frame member 33 is connected to the front side link 38 so as to be rotatable coaxially with the rotary axis 21c.

The track block 36 is rotatably provided in the rear end portion of the rising frame member 33.

The housing 31 is provided with the circular track 35. The circular track 35 has a substantially circular arc shape along the outer periphery of the housing 31. The track block 36 is movable along the circular track 35. The shape of the circular track 35 is not a true circular arc shape to be specific, and the shape of the circular track 35 is designed such that the rising frame member 33 smoothly moves in response to various changes in pipe forming curvature. In addition, the shape of the circular track 35 varies with, for example, the size of the pipe-forming apparatus 3H and the lengths of the links 38 and 39.

The slide block 34 is provided in the intermediate portion of the rising frame member 33. The slide block 34 is engaged to the rising frame member 33 so as to be slidable along the extending direction of the rising frame member 33. The slide block 34 is rotatably connected to the housing 31.

The rear side guide portion 22 is fixed in position with respect to the housing 31 of the apparatus frame 30 via the rear side connecting arm 32b and, in turn, fixed in position with respect to the driving part 10.

As illustrated in FIG. 17, the pipe-forming apparatus 3H of the eighth embodiment is suitable for forming a rehabilitation pipe 9H (spiral pipe) along the inner peripheral surface of an existing pipe 1H having a non-circular cross section. For example, the existing pipe 1H, which has a horseshoe-shaped cross section, has a pair of side wall surfaces 1d having a linear cross section, a ceiling surface 1e having a semicircular cross section, and a flat and narrow bottom surface 1f. The rehabilitation pipe 9H along the existing pipe 1H includes a linear cross section portion 9d along each side wall surface 1d, a circular cross section portion 9e along the ceiling surface 1e, and a small-diameter circular cross section portion 9f reaching the bottom portions of the pair of side wall surfaces 1d from the bottom surface 1f. The small-diameter circular cross section portion 9f is smaller in curvature radius than the circular cross section portion 9e.

As indicated by an imaginary line in FIG. 17, the pipe-forming apparatus 3H is deformed between a deployed state 3Hd and a stored state 3Hf in accordance with the curvature of the inner peripheral surface of the existing pipe 1H, eventually the pipe forming curvature of the rehabilitation pipe 9H.

During pipe forming for the linear cross section portion 9d on the side wall surface 1d of the existing pipe 1H, the pipe-forming apparatus 3H is in the deployed state 3Hd. As illustrated in FIG. 16(a), in the deployed state, the rising frame member 33 is pulled out to a large extent from the housing 31 to the propulsion front side and the reverse side (obliquely to the lower left side in FIG. 16(a)), and the front side guide portion 21 is pulled apart to a large extent to the propulsion front side of the housing 31 (leftwards in FIG. 16(a)). In addition, the housing 31 is raised to a relatively large angle with respect to the intermediate link 39. As a result, the front side guide portion 21, the intermediate guide portion 25, and the rear side guide portion 22 are aligned substantially on a straight line, and the rehabilitation pipe 9H can be linearly formed. The following strip portion 92 is pressed to the pipe end portion 91e at a relatively large angle.

As indicated by an imaginary line in FIG. 17, during pipe forming for the circular cross section portion 9e on the ceiling surface 1e of the existing pipe 1H, the pipe-forming apparatus 3H is in an intermediate state 311e between the deployed state and the stored state. As a result, the upper portion of the rising frame member 33 fits in the housing 31 more than in the deployed state 3Hd, the front side guide portion 21 approaches the front end portion of the housing 31, and the angle between the intermediate link 39 and the housing 31 decreases as illustrated in FIG. 16(b). As a result, the front side guide portion 21, the intermediate guide portion 25, and the rear side guide portion 22 are aligned on a circumference having a desired curvature, and the rehabilitation pipe 9H can be formed along the ceiling surface 1e. The pressing angle of the following strip portion 92 becomes smaller than when the pipe is linearly formed (FIG. 16(a)).

As indicated by an imaginary line in FIG. 17, when the small-diameter circular cross section portion 9f is formed from the bottom surface 1f of the existing pipe 1H to the bottom portions of the pair of side wall surfaces 1d, the pipe-forming apparatus 3H is brought closer to the stored state 3Hf than to the intermediate state 311e or is set in the stored state 3Hf. As illustrated in FIG. 16(c), in the stored state, the rising frame member 33 sufficiently fits in the housing 31 and the front side guide portion 21 sufficiently approaches the housing 31. In addition, the housing 31 sufficiently falls toward the intermediate link 39. As a result, the front side guide portion 21, the intermediate guide portion 25, and the rear side guide portion 22 are aligned on a circumference having a sufficiently small curvature radius, and pipe forming can be performed with a sufficiently small curvature radius. The pressing angle of the following strip portion 92 becomes sufficiently small.

By the pipe end guide 20 including the three guide portions 21, 25, and 22 being guided along the circumferential direction of the pipe end portion 91, the positional relationship between the guide portions 21, 25, and 22 naturally follows the curvature of the pipe end portion 91. Along with this, the apparatus frame 30 is deformed between the deployed state and the stored state, and the relative positions of the driving part 10 and the guide portions 21 and 25 are changed. In other words, the positional relationship between the guide portions 21, 25, and 22 is allowed to follow the curvature of the pipe end portion 91 as the apparatus frame 30 is deformable and the relative positions of the driving part 10 and the guide portions 21 and 25 can be changed.

As a result, it is possible to prevent the pipe end guide 20 from detaching from the pipe end portion 91 and the pipe end guide 20 and the pipe end portion 91 from being destroyed, and pipe forming can be stably performed.

Note, in a case where the resistance at a time of changing from the stored state to the deployed state is larger than the resistance at a time of changing from the deployed state to the stored state, biasing device such as a spring may be provided in the pipe-forming apparatus 3H and biasing toward the deployed state may be performed by the biasing device. When the magnitude relationship between the resistances is opposite, biasing may be performed toward the stored state.

Ninth Embodiment

Figure 18:
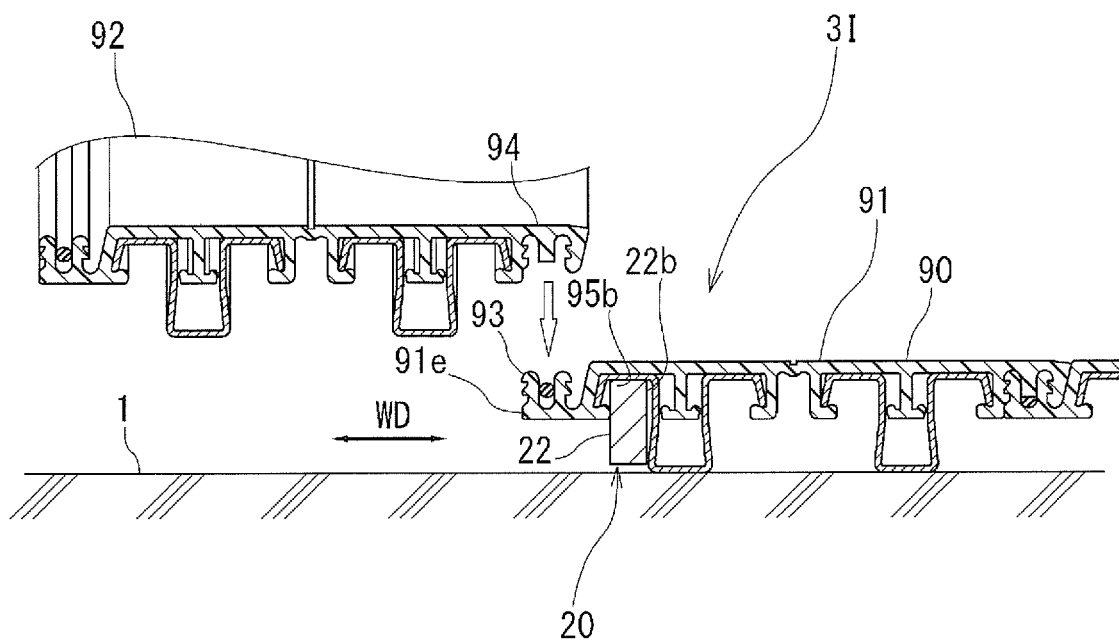
FIG. 18 is a cross-sectional view illustrating a ninth embodiment of the invention and a rear side guide portion of a pipe-forming apparatus.

FIG. 18 illustrates a pipe-forming apparatus 3I according to a ninth embodiment of the invention. In the pipe-forming apparatus 3I, the receiving portion 22a (see FIG. 6) of the guide portion 22 is omitted and the guide portion 22 is constituted by the engaging portion 22b alone.

When at least the engaging portion 22b is fitted in the engaging groove portion 95b, the pipe-forming apparatus 3I is constrained in the machine-width direction WD with respect to the preceding spiral pipe portion 91, and thus pipe forming can be performed without the pipe-forming apparatus 3I detaching from the preceding spiral pipe portion 91.

In a case where the rigidity of the strip member 90 is relatively high, drag against pressing of the following strip portion 92 can be developed with the strip member 90 alone even without the receiving portion 22a, and fitting can be reliably performed.

Tenth Embodiment

Figure 19:
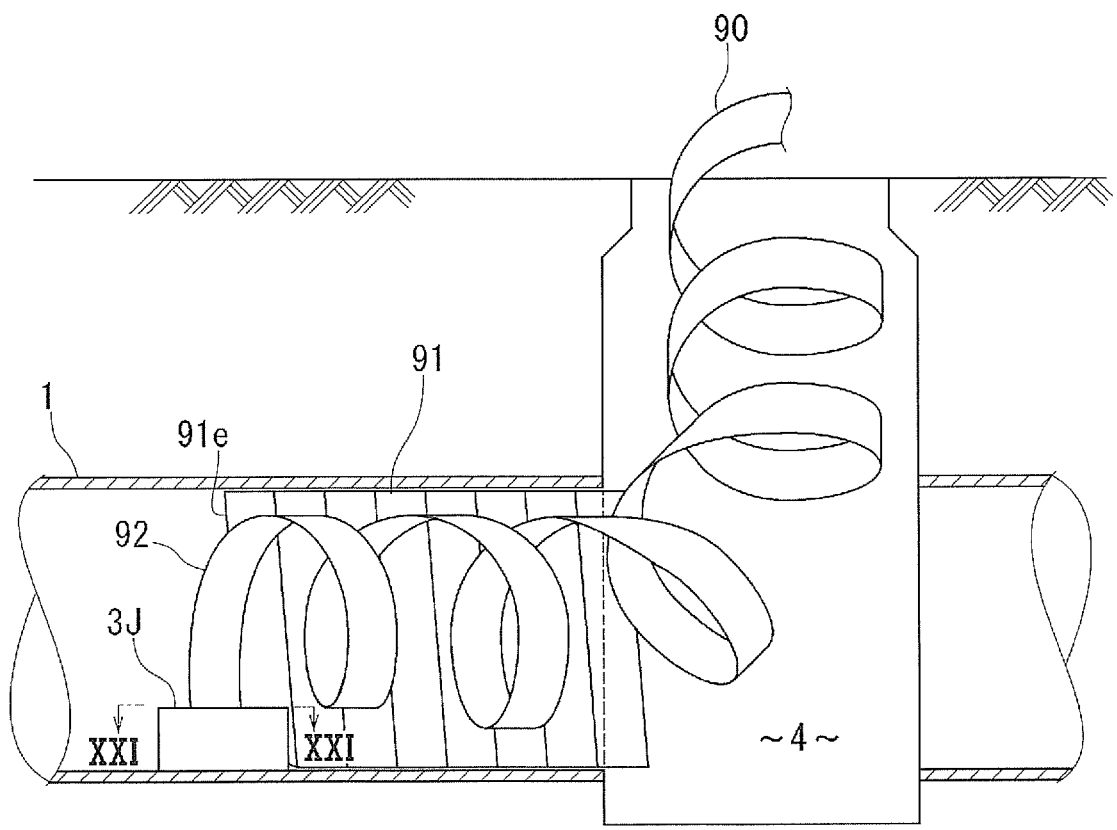
FIG. 19 is a side cross-sectional view illustrating how to rehabilitate an existing pipe with a pipe-forming apparatus according to a tenth embodiment of the invention.
Figure 26A:
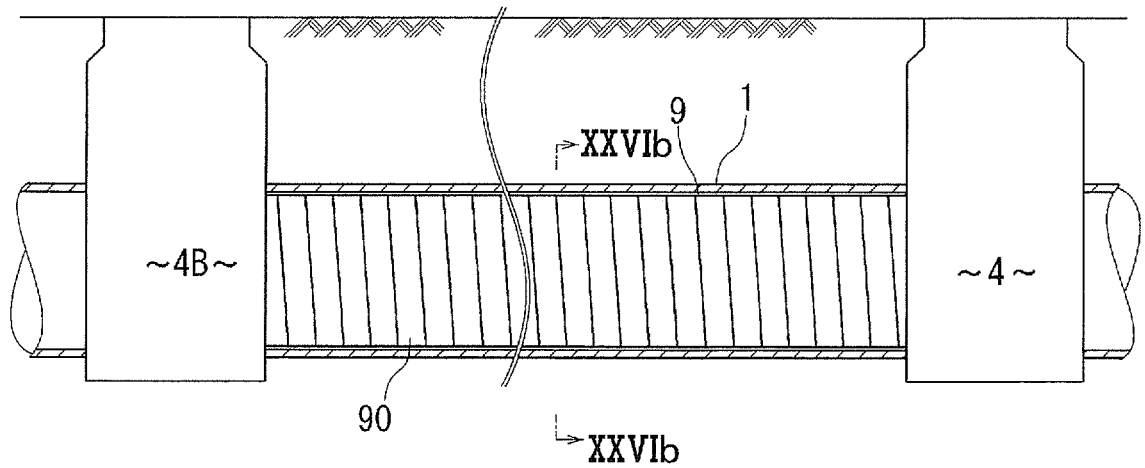
FIG. 26($a$) is a cross-sectional view illustrating a rehabilitation-completed existing pipe with the scale of the pipe reduced from FIG. 19.
Figure 26B:
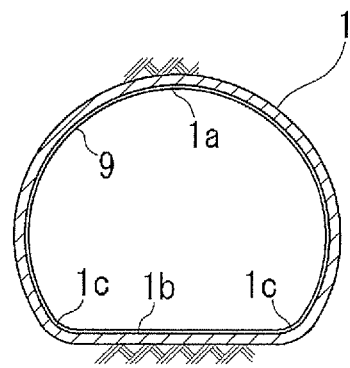

FIG. 19 illustrates how to rehabilitate an old existing pipe 1. Examples of the existing pipe 1 include a sewer pipe, a water supply pipe, an agricultural water pipe, and a gas pipe. As illustrated in FIG. 26(b), the existing pipe 1, which has a non-circular cross section (is not truly circular in cross section), has an upper side peripheral surface portion 1a that is, for example, arcuate, a substantially flat or relatively flat bottom side peripheral surface portion 1b, and a corner portion 1c (peripheral surface portion curved to a large extent) between the peripheral surface portions 1a and 1b. A rehabilitation pipe 9 (spiral pipe) is lined on the inner peripheral surface of the existing pipe 1. As illustrated in FIG. 19, the rehabilitation pipe 9 is constituted by one long strip member 90 and has a spiral pipe shape. As illustrated in FIG. 26(a), the rehabilitation pipe 9 is provided over the entire length of the existing pipe 1 between a starting manhole 4 and an arrival manhole 4B.

Figure 20:
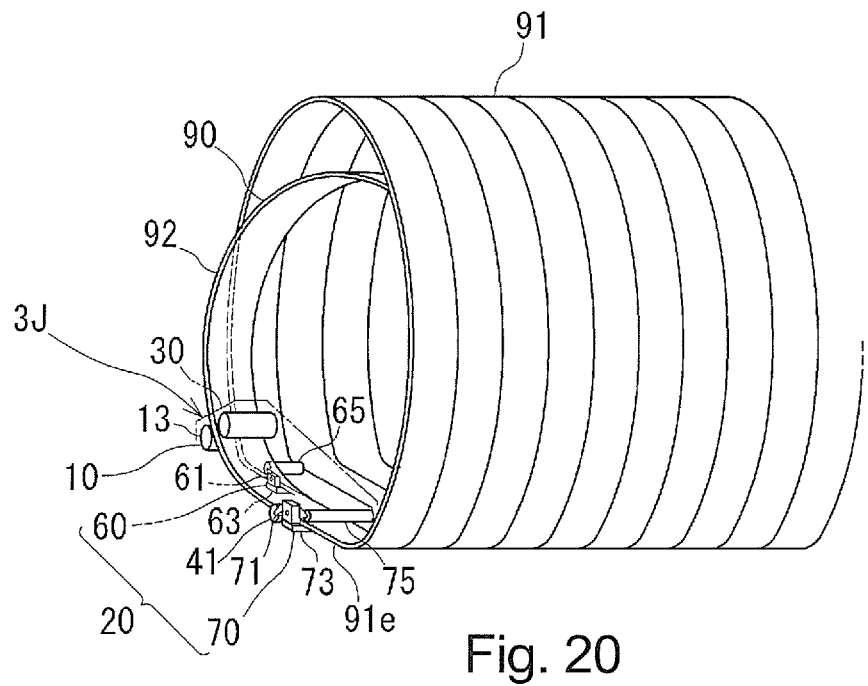
FIG. 20 is a perspective view of a mid-construction rehabilitation pipe (spiral pipe) according to the tenth embodiment.

As illustrated in FIG. 19, the strip member 90 in the course of pipe forming includes a preceding spiral pipe portion 91 and a following strip portion 92. As illustrated in FIG. 20, the strip member 90 is wound in, for example, the clockwise spiral winding direction in FIG. 20. As a result, the spiral pipe-shaped preceding spiral pipe portion 91 is formed. As illustrated in FIG. 19, the preceding spiral pipe portion 91 is disposed along the inner peripheral surface of the existing pipe 1 from the end portion of the existing pipe 1 on the starting manhole 4 side (right side in FIG. 19).

The unformed following strip portion 92 continues in the winding-direction from the forefront portion of the preceding spiral pipe portion 91. The following strip portion 92 is passed through the inside of the preceding spiral pipe portion 91 and the inside of the starting manhole 4.

Figure 23:
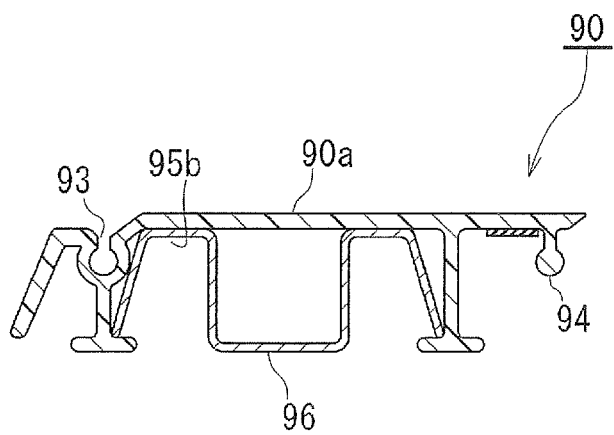
FIG. 23 is a cross-sectional view of a strip member constituting the rehabilitation pipe, which is taken along line XXIII-XXIII of FIG. 22.

As illustrated in FIG. 23, the strip member 90 has a constant cross section and extends in a direction orthogonal to the paper surface of FIG. 23. The material of a strip main body 90a of the strip member 90 is, for example, a synthetic resin such as polyvinyl chloride. A reinforcing strip member 96 is provided on the reverse side of the strip member 90 (outer periphery side, lower side in FIG. 23). A metal plate such as a steel plate constitutes the reinforcing strip member 96. Although the outer periphery side surfaces of the strip main body 90a and the reinforcing strip member 96 (lower surfaces in FIG. 23) are flush with each other, the reinforcing strip member 96 may protrude to the outer periphery side (lower side in FIG. 23) beyond the strip main body 90a.

The reinforcing strip member 96 may be omitted. A flat plate-shaped reinforcing band material may be embedded in the resinous strip main body 90a.

Figure 24:
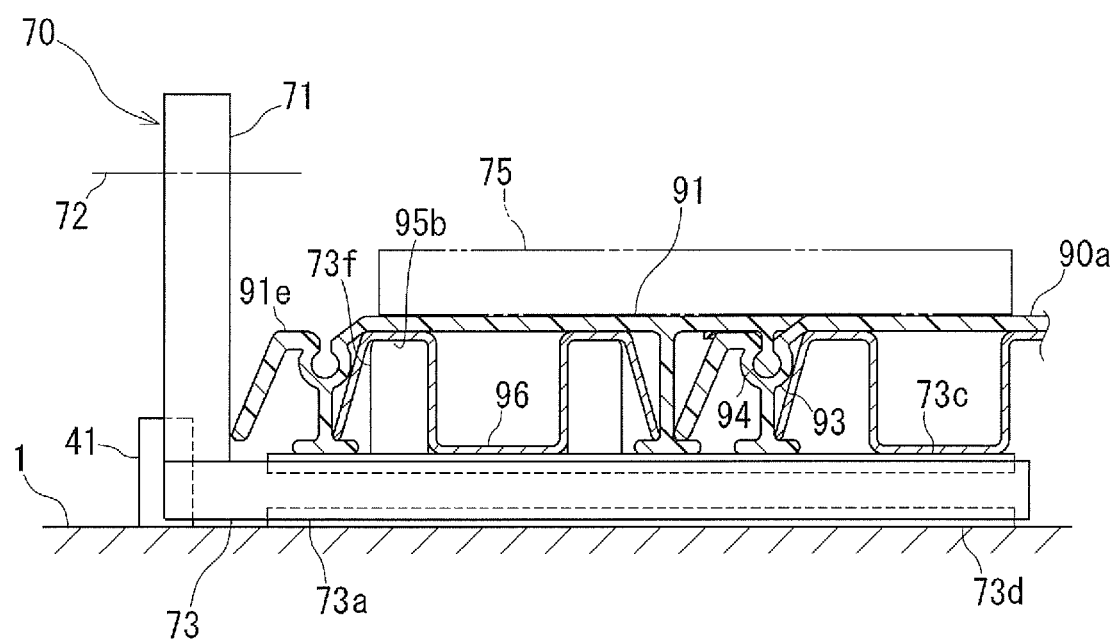
FIG. 24 is a cross-sectional view taken along line XXIV-XXIV of FIG. 22.

A recessed groove-shaped first fitting portion 93 is formed in the edge portion of the strip member 90 that is on one width-direction side (left side in FIG. 23). A projecting strip-shaped second fitting portion 94 is formed in the edge portion of the strip member 90 that is on the other width-direction side (right side in FIG. 23). As illustrated in FIG. 24, the fitting portions 93 and 94 at the edges adjacent with a difference of one lap in the preceding spiral pipe portion 91, eventually the rehabilitation pipe 9 (FIG. 26(*a*)), are joined to each other by uneven fitting.

Figure 21:
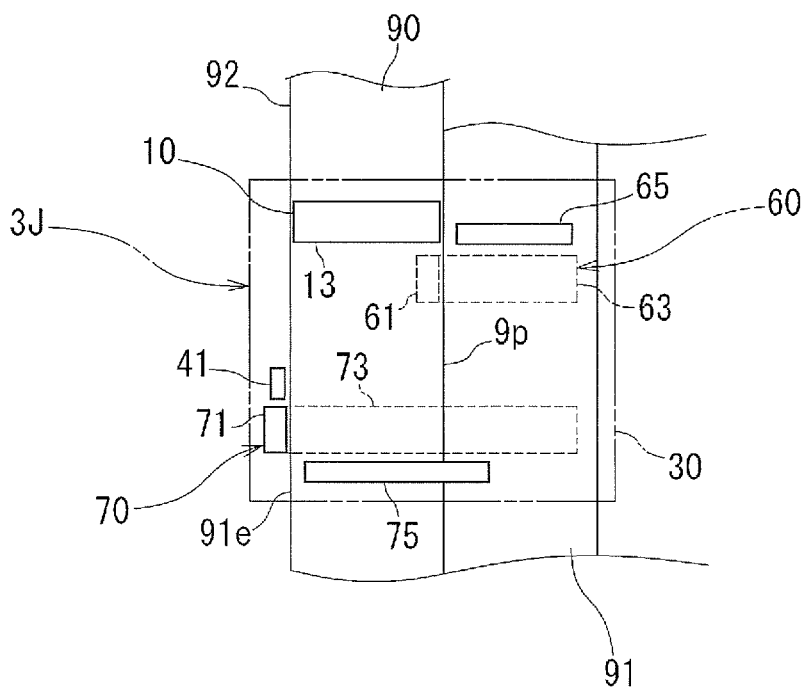
FIG. 21 is an explanatory plan view of the pipe-forming apparatus, which is taken along line XXI-XXI of FIG. 19.

As illustrated in FIGS. 19 and 20, a pipe-forming apparatus 3J is disposed in a forefront portion 91*e* (left end portion in FIG. 19) of the preceding spiral pipe portion 91 in an extending direction ED. The pipe-forming apparatus 3J is propelled (self-travels) along the winding direction of the preceding spiral pipe portion 91 (clockwise in FIG. 20). As illustrated in FIG. 21, a machine-width direction WD (left-right direction in FIG. 21) of the pipe-forming apparatus 3J orthogonal to a propelling longitudinal direction LD (upward direction in FIG. 21) is substantially along the pipe axis of the existing pipe 1, eventually the preceding spiral pipe portion 91. Strictly speaking, the machine-width direction WD is inclined by the lead angle of the preceding spiral pipe portion 91 with respect to the pipe axis. The rehabilitation pipe 9 is formed from the strip member 90 by the pipe-forming apparatus 3J.

A fitting position 9*p* is set in the pipe-forming apparatus 3J. The uneven fitting (joining) of the first fitting portion 93 of the preceding spiral pipe portion 91 and the second fitting portion 94 of the following strip portion 92 is performed at the fitting position 9*p*.

Figure 22:
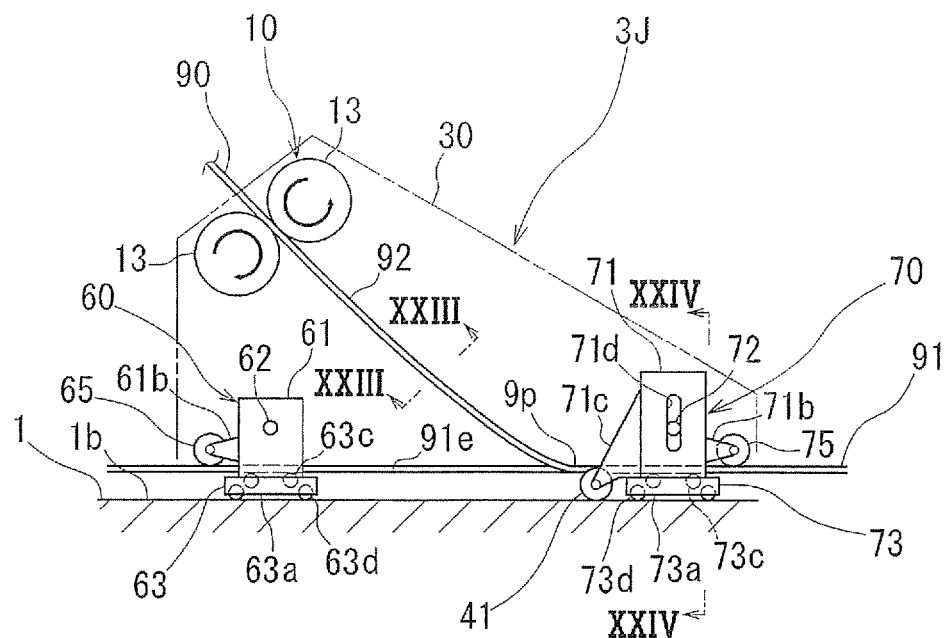
FIG. 22 is a front view schematically illustrating the pipe-forming apparatus in pipe forming viewed from the pipe axis direction of the existing pipe.

As illustrated in FIGS. 21 and 22, the pipe-forming apparatus 3J is provided with a driving part 10, a pipe end guide 20, and an apparatus frame 30 schematically indicated by a two-dot chain line. The driving part 10 and the pipe end guide 20 are supported by the apparatus frame 30.

The driving part 10 is disposed apart from the fitting position 9*p* to the propulsion front side of the pipe-forming apparatus 3J (left side in FIG. 22) and the head portion side in the machine-height direction BD (inner periphery side, upper side in FIG. 22). The driving part 10 includes a pair of driving rollers 13 and 13. The axis of the driving roller 13 is directed in the machine-width direction WD (direction orthogonal to the paper surface in FIG. 22). By the pair of driving rollers 13 and 13, the following strip portion 92 is pinched from the inner periphery side (face side) and the outer periphery side (reverse side). A rotary drive mechanism (not illustrated) such as a motor is connected to at least one driving roller 13. The driving roller 13 is rotationally driven around its own axis by the rotary drive mechanism. The rotation direction of the driving roller 13 is set to a direction in which the following strip portion 92 is obliquely pressed with respect to the radial direction of the preceding spiral pipe portion 91, eventually the machine-height direction HD, from the inside of the preceding spiral pipe portion 91 toward the fitting position 9*p* on the preceding spiral pipe portion 91.

As illustrated in FIG. 20, the pipe end guide 20 is provided on the reverse side (outer periphery side) in the machine-height direction HD beyond the driving part 10. The pipe end guide 20 includes two (a plurality of) guide units 60 and 70. The two guide units 60 and 70 are separated from each other in the propelling longitudinal direction LD. The fitting position 9*p* is set between the guide units 60 and 70.

The fitting position 9*p* may be set in any one of the guide units 60 and 70.

As illustrated in FIGS. 21 and 22, the front side guide unit 60 on the propulsion front side includes a support plate 61, a front side guide portion 63, and a front side inner roller 65. The support plate 61 is formed in a plate shape orthogonal to the machine-width direction WD (direction orthogonal to the paper surface of FIG. 22) and is disposed on the inner periphery side of the preceding spiral pipe portion 91 (upper side in FIG. 22) and on the forefront side in the extension-direction beyond the preceding spiral pipe portion 91 (left side in FIG. 21). A front side rotary axis 62 is provided in the middle portion of the support plate 61. The front side rotary axis 62 is directed in the machine-width direction WD (direction orthogonal to the paper surface of FIG. 22).

The front side guide portion 63 is connected to the end portion of the support plate 61 that is on the outer periphery side (lower side in FIG. 22). The front side guide portion 63 is applied to the preceding spiral pipe portion 91 from the outer periphery side (lower side in FIG. 22). The front side guide portion 63 and the support plate 61 are integrally formed so as to be rotatable around the front side rotary axis 62 with respect to the apparatus frame 30.

Specifically, the front side guide portion 63 has a front side guide main body 63*a* and rolling bodies 63*c* and 63*d*. The front side guide main body 63*a* has a flat shape. In other words, the thickness of the front side guide main body 63*a* (dimension in the upward-downward direction in FIG. 22) is smaller than the dimension in the longitudinal direction (left-right direction in FIG. 22) and is sufficiently smaller than the dimension in the width direction (direction orthogonal to the paper surface of FIG. 22). The flat front side guide main body 63*a* is disposed along the outer periphery of the preceding spiral pipe portion 91. Although not illustrated, an engaging portion is provided in the front side guide main body 63*a*, and the engaging portion is engaged to a groove portion 95*b* (FIG. 24) of the strip member 90.

The front side guide main body 63*a* is provided with the rolling bodies 63*c* and 63*d*. The inside rolling body 63*c* slightly protrudes from the front side guide main body 63*a* to the inner periphery side (upper side in FIG. 22) and is in contact with the outer peripheral surface of the preceding spiral pipe portion 91. The axis of the inside rolling body 63*c* is directed in the machine-width direction WD (direction orthogonal to the paper surface of FIG. 22). The inside rolling body 63*c* is capable of freely rotating around its own axis and, in turn, rolling along the outer peripheral surface of the preceding spiral pipe portion 91.

The outside rolling body 63*d* slightly protrudes from the front side guide main body 63*a* to the outer periphery side (lower side in FIG. 22) and is in contact with the inner peripheral surface of the existing pipe 1. The axis of the outside rolling body 63*d* is directed in the machine-width direction WD (direction orthogonal to the paper surface of FIG. 22). The outside rolling body 63*d* is capable of freely rotating around its own axis and, in turn, rolling along the inner peripheral surface of the existing pipe 1.

The front side guide main body 63*a* is in contact with neither the outer peripheral surface of the preceding spiral pipe portion 91 nor the inner peripheral surface of the existing pipe 1.

On the propulsion front side of the support plate 61 (left side in FIG. 22), the front side inner roller 65 is attached via a connecting member 61*b*. The front side inner roller 65 is applied from the inner periphery side (upper side in FIG. 22) to the preceding spiral pipe portion 91. The pipe end portion 91*e* of the preceding spiral pipe portion 91 is sandwiched between the front side guide portion 63 and the front side inner roller 65. The axis of the front side inner roller 65 is directed in the machine-width direction WD (direction orthogonal to the paper surface of FIG. 22). The front side inner roller 65 is capable of freely rotating around its own axis and, in turn, rolling along the inner peripheral surface of the preceding spiral pipe portion 91. Preferably, the front side inner roller 65 is position-adjustable along the inward-outward direction of the preceding spiral pipe portion 91 (upward-downward direction in FIG. 22).

As illustrated in FIGS. 21 and 22, the rear side guide unit 70 on the propulsion rear side includes a support plate 71, a rear side guide portion 73, and a rear side inner roller 75. The support plate 71 is formed in a plate shape orthogonal to the machine-width direction WD (direction orthogonal to the paper surface of FIG. 22) and is disposed on the inner periphery side of the preceding spiral pipe portion 91 (upper side in FIG. 22) and the forefront side in the extension-direction beyond the preceding spiral pipe portion 91 (left side in FIG. 21). A long hole 71d is formed in the middle portion of the support plate 71. The long hole 71d extends in the inward-outward direction of the preceding spiral pipe portion 91 or the radial direction of the preceding spiral pipe portion 91. A rear side rotary axis 72 (rotary axis) is passed through the long hole 71d. The rear side rotary axis 72 is directed in the machine-width direction WD (direction orthogonal to the paper surface of FIG. 22). The support plate 71 is supported by the apparatus frame 30 via the rear side rotary axis 72.

The rear side guide portion 73 is connected to the end portion of the support plate 71 that is on the outer periphery side (lower side in FIG. 22). The rear side guide portion 73 is applied to the preceding spiral pipe portion 91 from the outer periphery side. The rear side guide portion 73 and the support plate 71 are integrally formed so as to be rotatable around the rear side rotary axis 72 with respect to the apparatus frame 30. More preferably, the rear side guide portion 73 is position-adjustable in the longer direction of the long hole 71d with respect to the apparatus frame 30.

Specifically, the rear side guide portion 73 has a rear side guide main body 73a (guide main body) and rolling bodies 73c and 73d. The rear side guide main body 73a has a flat shape. In other words, the thickness of the rear side guide main body 73a (dimension in the upward-downward direction in FIG. 22) is smaller than the dimension in the longitudinal direction (left-right direction in FIG. 22) and is sufficiently smaller than the dimension in the width direction (direction orthogonal to the paper surface of FIG. 22). The flat rear side guide main body 73a is disposed along the outer periphery of the preceding spiral pipe portion 91. As illustrated in FIG. 24, an engaging portion 73f is provided in the rear side guide main body 73a. The engaging portion 73f is engaged to the groove portion 95b of the strip member 90. As a result, the engaging portion 73f is restricted in terms of movement in the width direction of the strip member 90 and is slidable in the extending direction of the strip member 90.

As illustrated in FIG. 22, the rear side guide main body 73a is provided with the rolling bodies 73c and 73d. The inside rolling body 73c slightly protrudes from the rear side guide main body 73a to the inner periphery side (upper side in FIG. 22) and is in contact with the outer peripheral surface of the preceding spiral pipe portion 91. The axis of the inside rolling body 73c is directed in the machine-width direction WD (direction orthogonal to the paper surface of FIG. 22). The inside rolling body 73c is capable of freely rotating around its own axis and, in turn, rolling along the outer peripheral surface of the preceding spiral pipe portion 91.

The outside rolling body 73d slightly protrudes from the rear side guide main body 73a to the outer periphery side (lower side in FIG. 22) and is in contact with the inner peripheral surface of the existing pipe 1. The axis of the outside rolling body 73d is directed in the machine-width direction WD (direction orthogonal to the paper surface of FIG. 22). The outside rolling body 73d is capable of freely rotating around its own axis and, in turn, rolling along the inner peripheral surface of the existing pipe 1.

The rear side guide main body 73a is in contact with neither the outer peripheral surface of the preceding spiral pipe portion 91 nor the inner peripheral surface of the existing pipe 1.

On the propulsion rear side of the support plate 71 (right side in FIG. 22), the rear side inner roller 75 is attached via a connecting member 71b. The rear side inner roller 75 is applied from the inner periphery side (upper side in FIG. 22) to the preceding spiral pipe portion 91. The pipe end portion 91e of the preceding spiral pipe portion 91 is sandwiched between the rear side guide portion 73 and the rear side inner roller 75. The axis of the rear side inner roller 75 is directed in the machine-width direction WD (direction orthogonal to the paper surface of FIG. 22). The rear side inner roller 75 is capable of freely rotating around its own axis and, in turn, rolling along the inner peripheral surface of the preceding spiral pipe portion 91. Preferably, the rear side inner roller 75 is position-adjustable along the inward-outward direction of the preceding spiral pipe portion 91 (upward-downward direction in FIG. 22).

As illustrated in FIGS. 21 and 22, a leading roller 41 (acting portion) is attached to the support plate 71 via a connecting member 71c. The leading roller 41 is disposed on the propelling-direction front side of the rear side guide portion 73 (left side in FIG. 22). The leading roller 41 is disposed to deviate to the forefront side (left side in FIG. 21) beyond the pipe end portion 91e along the pipe axis direction of the preceding spiral pipe portion 91. The leading roller 41 is capable of coming into contact with the inner peripheral surface of the existing pipe 1. The central axis of the leading roller 41 is directed in the machine-width direction WD (direction orthogonal to the paper surface of FIG. 22). The leading roller 41 is capable of freely rotating (self-rotating) around its own axis and, in turn, rolling along the inner peripheral surface of the existing pipe 1. Further, the leading roller 41 is capable of rotating (revolving) around the rear side rotary axis 72 with respect to the apparatus frame 30 integrally with the support plate 71 and the rear side guide portion 73.

The rehabilitation pipe 9 is formed by the pipe-forming apparatus 3J as follows.

As illustrated in FIG. 19, it is assumed that the preceding spiral pipe portion 91 is formed to some extent along the inner peripheral surface of the existing pipe 1.

The strip member 90 (following strip portion 92) is introduced from the starting manhole 4 through the inside of the preceding spiral pipe portion 91 to the pipe-forming apparatus 3J in the pipe end portion 91e of the preceding spiral pipe portion 91.

As illustrated in FIG. 22, the following strip portion 92 is pressed toward the fitting position 9p by the driving roller 13 of the driving part 10 being driven to rotate. The pressing direction is directed obliquely to the radial direction of the preceding spiral pipe portion 91. Along with this, the preceding spiral pipe portion 91 is pressed against the guide portions 63 and 73. As a result of the reaction, a normal force acts on each of the contact portions of the preceding spiral pipe portion 91 with the guide portions 63 and 73. By this normal force and the radial component force of the pressing, the second fitting portion 94 of the following strip portion 92 and the first fitting portion 93 of the preceding spiral pipe portion 91 are fitted together at the fitting position 9p (FIG. 24).

The preceding spiral pipe portion 91 is pressed from the inner periphery side (upper side in FIG. 22) by the inner rollers 65 and 75, and thus fitting between the fitting portions 93 and 94 can be stabilized.

The pipe-forming apparatus 3J is propelled forwards in the winding direction of the preceding spiral pipe portion 91 (in the leftward direction in FIG. 22) with the circumferential component force of the pressing acting as a propulsion reaction force. As a result, the preceding spiral pipe portion 91 can be extended, and eventually the rehabilitation pipe 9 can be formed.

By the guide portions 63 and 73 being flat and reduced in thickness, the amount by which the preceding spiral pipe portion 91 is separated from the inner peripheral surface of the existing pipe 1 can be reduced.

In this manner, according to the pipe-forming apparatus 3J, the rehabilitation pipe 9 can be formed by the cooperative action of the driving part 10 and the guide portions 63 and 73 even without an inner periphery restriction body. By the inner periphery restriction body being omitted, the rehabilitation pipe 9 can be easily formed along the inner peripheral surface of the existing pipe 1 even when the existing pipe 1 has a non-circular cross section. The preceding spiral pipe portion 91 is supported in at least three places, that is, the driving part 10, the front side guide portion 63, and the rear side guide portion 73. Accordingly, pipe forming can be stably performed.

Figure 25A:
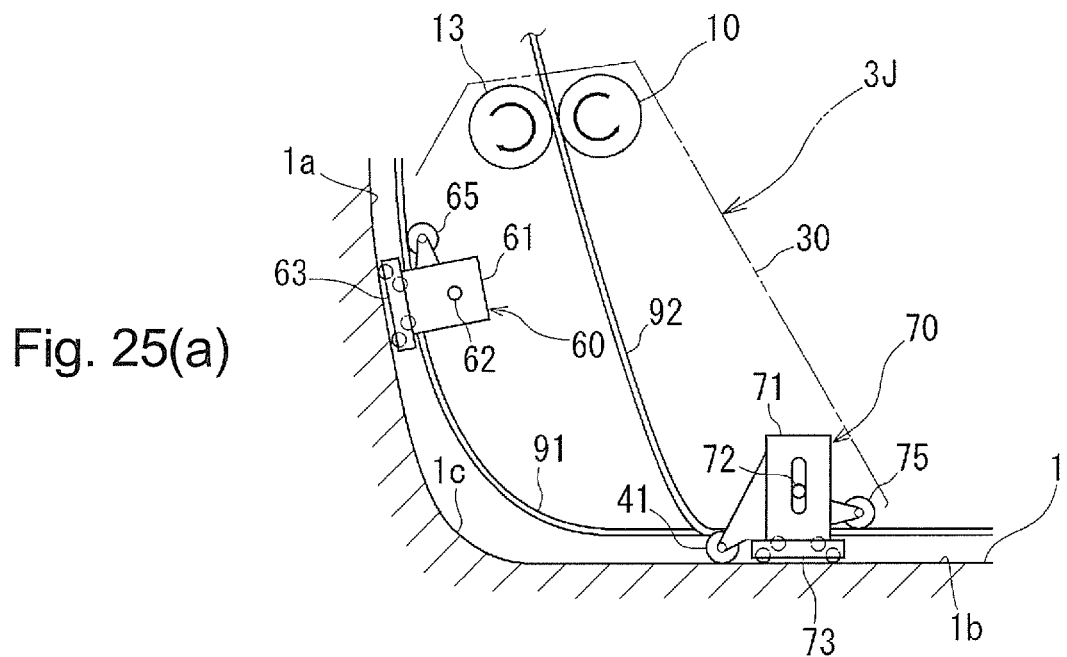
FIGS. 25($a$) to 25($d$) are front views sequentially illustrating how a pipe-forming apparatus performs pipe forming while moving in a peripheral surface portion including a corner portion of the existing pipe.

As illustrated in FIG. 25(a), during a transition of the pipe-forming apparatus 3J from the bottom side peripheral surface portion 1b to the upper side peripheral surface portion 1a, for example, the front side guide unit 60 first heads for the upper side peripheral surface portion 1a through the corner portion 1c. Subsequently, the rear side guide unit 70 enters the corner portion 1c from the bottom side peripheral surface portion 1b.

Figure 25B:
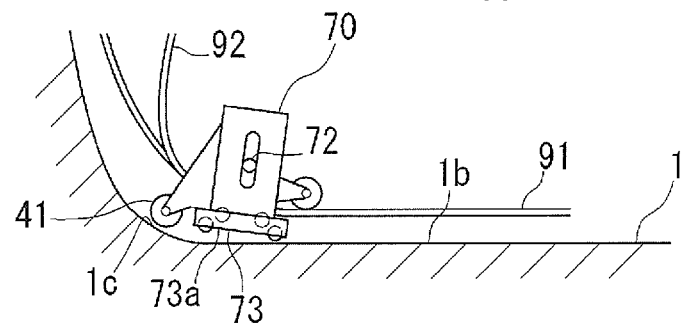

As illustrated in FIG. 25(b), the corner portion 1c is steeply bent, and thus the preceding spiral pipe portion 91 may be separated from the inner peripheral surface of the existing pipe 1. In this case, the rear side guide portion 73 floats up from the inner peripheral surface of the corner portion 1c.

Figure 25C:
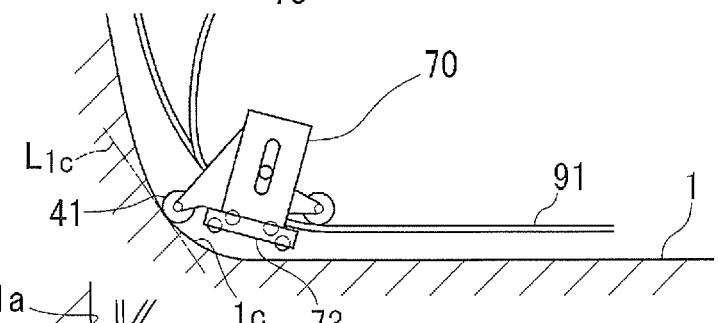

Eventually, as illustrated in FIG. 25(c), the leading roller 41 hits the inner peripheral surface of the upper side peripheral surface portion 1a or the corner portion 1c of the existing pipe 1. At this time, the longitudinal direction of the rear side guide portion 73 is oblique with respect to a tangent $L_{1c}$ of the inner peripheral surface of the existing pipe 1 in the contact portion with the leading roller 41.

Figure 25D:
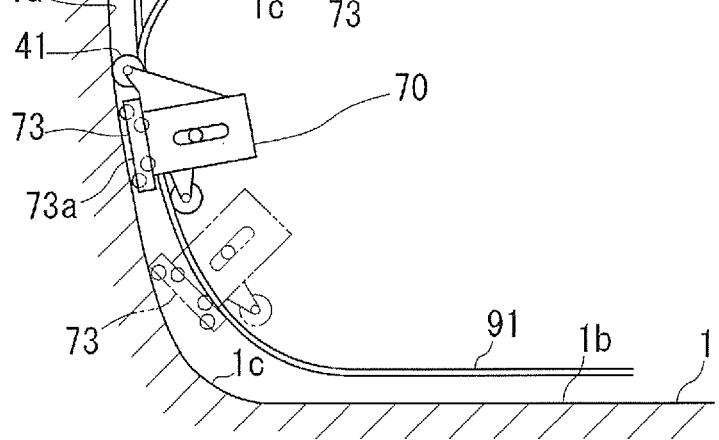

Subsequently, the leading roller 41 is guided along the inner peripheral surface of the upper side peripheral surface portion 1a as the pipe-forming apparatus 3J is propelled, and the longitudinal direction of the rear side guide portion 73 gradually approaches the tangential direction of the upper side peripheral surface portion 1a. Then, the rear side guide portion 73 is smoothly landed on the upper side peripheral surface portion 1a as indicated by a solid line in FIG. 25(d).

As described above, according to the pipe-forming apparatus 3J, the leading roller 41 is ahead of the rear side guide portion 73, and thus the rear side guide portion 73 is allowed to follow the inner peripheral surface of the existing pipe 1 in front. Accordingly, even when the existing pipe 1 changes in curvature or angle along the propelling direction, it is possible to prevent the rear side guide portion 73 from obliquely colliding with the peripheral surface portion on the downstream side in the propelling direction. In other words, it is possible to prevent the state that is indicated by a two-dot chain line in FIG. 25(d). As a result, the pipe-forming apparatus 3J can be smoothly propelled. Eventually, the rehabilitation pipe 9 can be smoothly formed.

By the rear side rotary axis 72 being disposed away from the inner periphery side of the preceding spiral pipe portion 91, the rotation mechanism of the rear side guide portion 73 can be disposed with a margin on the inner periphery side of the preceding spiral pipe portion 91. In other words, the rotation mechanism of the rear side guide portion 73 does not have to be disposed between the preceding spiral pipe portion 91 and the existing pipe 1, and the clearance between the preceding spiral pipe portion 91 and the existing pipe 1 can be sufficiently reduced.

Eleventh Embodiment

Figure 27:
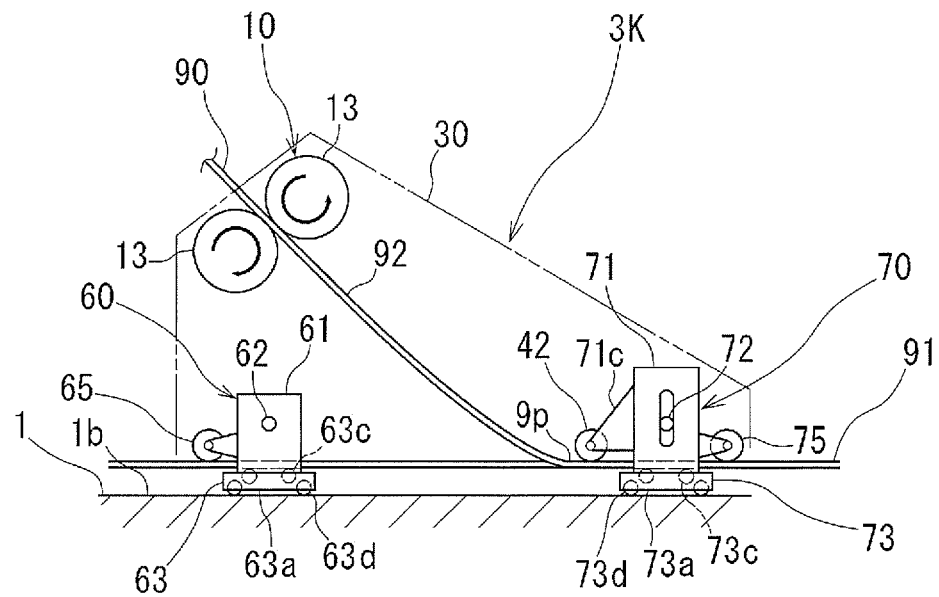
FIG. 27 is a front view schematically illustrating a pipe-forming apparatus according to an eleventh embodiment of the invention in a state where pipe forming is in progress.
Figure 28:
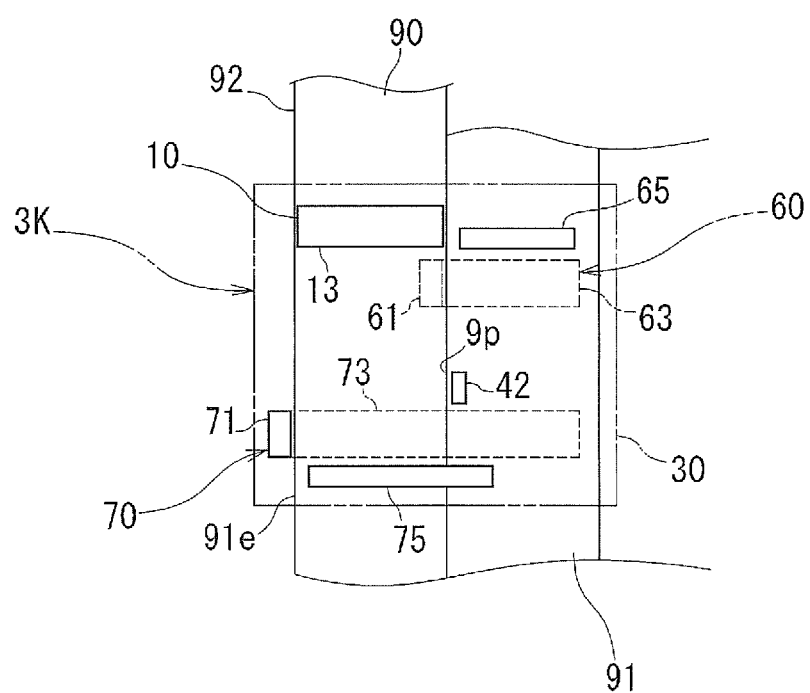
FIG. 28 is a plan view schematically illustrating the pipe-forming apparatus according to the eleventh embodiment.

FIGS. 27 to 29 illustrate an eleventh embodiment of the invention. As illustrated in FIGS. 27 and 28, in a pipe-forming apparatus 3K of the eleventh embodiment, a leading roller 42 (acting portion) is disposed on the inner periphery side (upper side in FIG. 27) beyond the preceding spiral pipe portion 91 and is capable of coming into contact with the inner peripheral surface of the preceding spiral pipe portion 91.

Figure 29A:
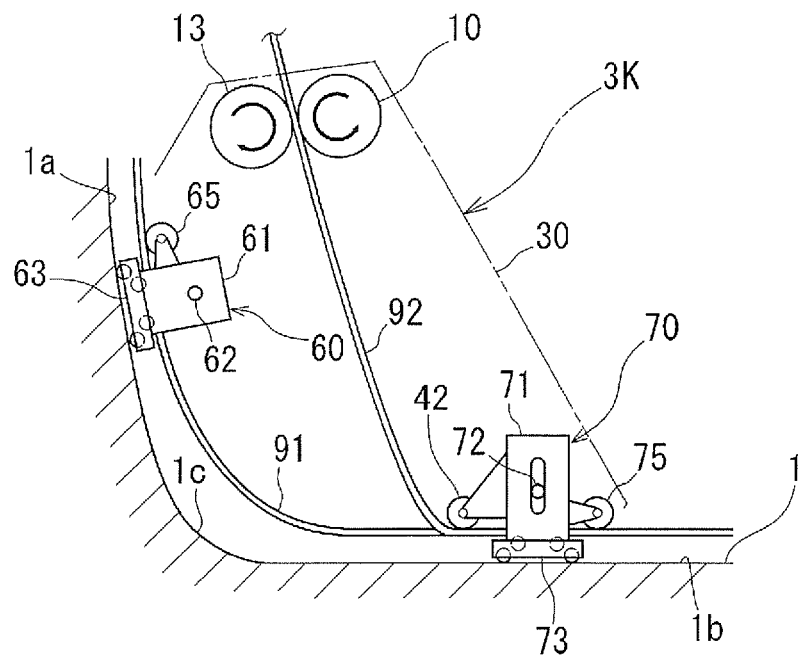
FIGS. 29(a) to 29(c) are front views sequentially illustrating how the pipe-forming apparatus according to the eleventh embodiment performs pipe forming while moving in a peripheral surface portion including a corner portion of the existing pipe.

As illustrated in FIG. 29(a), during a transition of the pipe-forming apparatus 3K from the bottom side peripheral surface portion 1b to the upper side peripheral surface portion 1a, for example, the front side guide unit 60 first heads for the upper side peripheral surface portion 1a through the corner portion 1c as in the tenth embodiment. Subsequently, the rear side guide unit 70 enters the corner portion 1c from the bottom side peripheral surface portion 1b. The leading roller 42 in the rear side guide unit 70 is guided along the inner peripheral surface of the preceding spiral pipe portion 91.

Figure 29B:
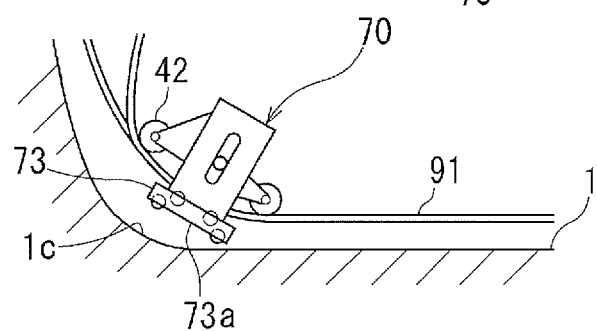

As illustrated in FIG. 29(b), the corner portion 1c is steeply bent, and thus the preceding spiral pipe portion 91 may be separated from the inner peripheral surface of the existing pipe 1. In this case, the rear side guide portion 73 floats up from the inner peripheral surface of the corner portion 1c. At this time, by the guide action of the leading roller 42, the rear side guide portion 73 is maintained in a posture substantially along the tangential direction of the preceding spiral pipe portion 91 in the corner portion 1c.

Figure 29C:
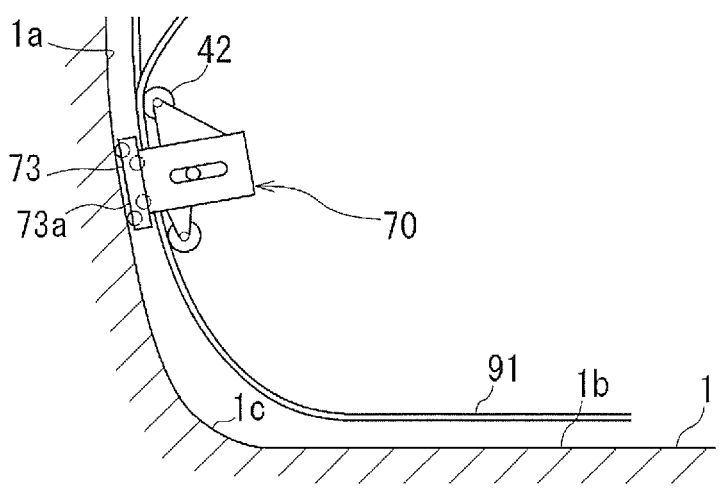

Further, as illustrated in FIG. 29(c), the rear side guide portion 73 gradually approaches the existing pipe 1 as the preceding spiral pipe portion 91 gradually approaches the existing pipe 1 with a transition of the rear side guide unit 70 from the corner portion 1c to the upper side peripheral surface portion 1a. The longitudinal direction of the rear side guide portion 73 gradually approaches the tangential direction of the inner peripheral surface of the existing pipe 1, led by the leading roller 42. As a result, the guide portion 73 is smoothly landed on the inner peripheral surface of the existing pipe 1.

Twelfth Embodiment

Figure 30:
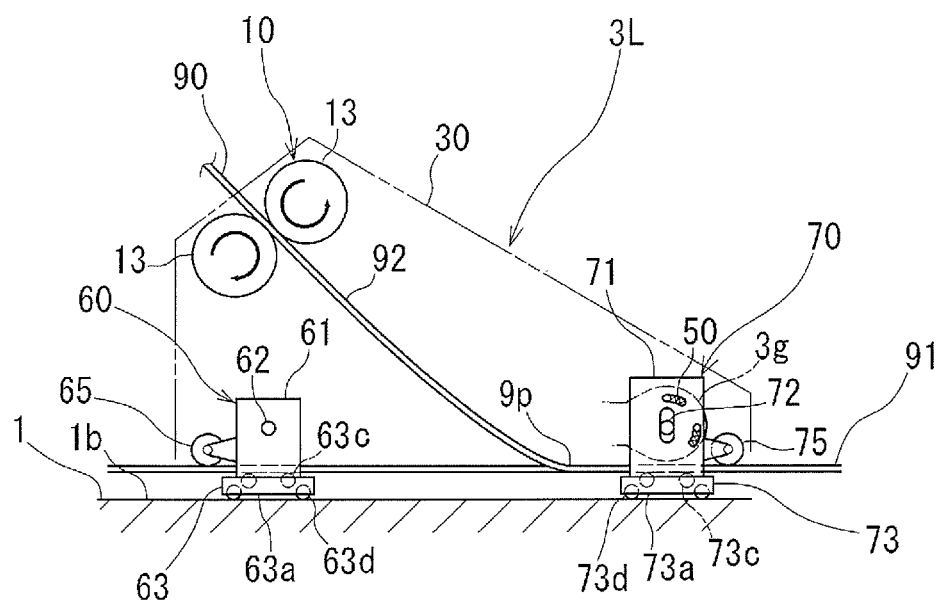
FIG. 30 is a front view schematically illustrating a pipe-forming apparatus according to a twelfth embodiment of the invention in a state where pipe forming is in progress.
Figure 31A:
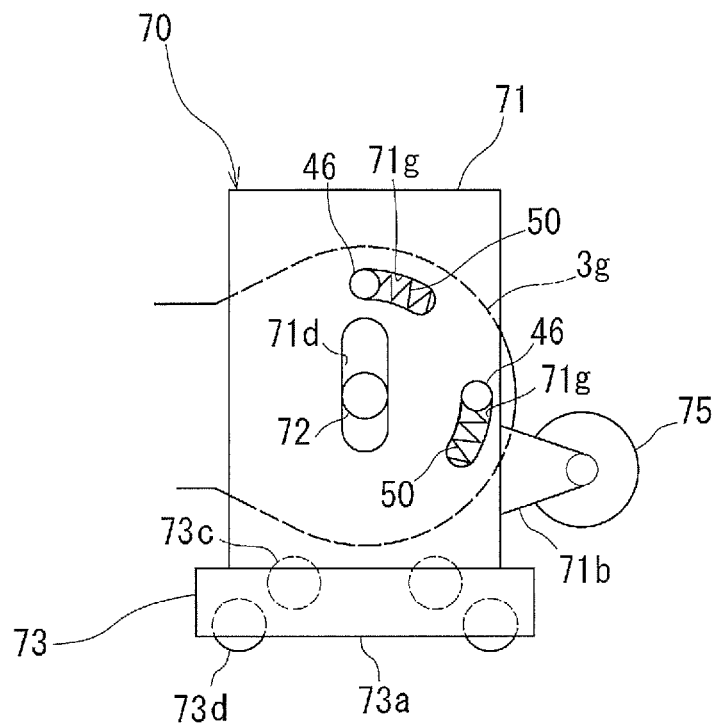
FIG. 31(a) is a front view of a rear side guide unit of the pipe-forming apparatus according to the twelfth embodiment.
Figure 31B:
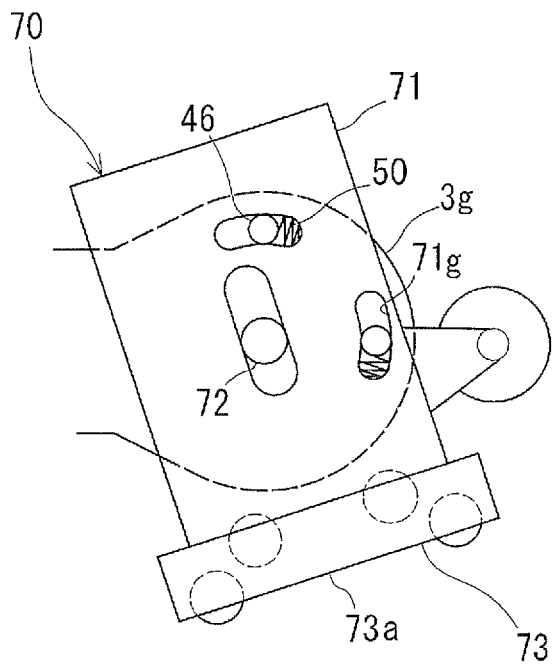
FIG. 31(b) is a front view illustrating a state where the rear side guide unit is inclined.
Figures 32A, 32B:
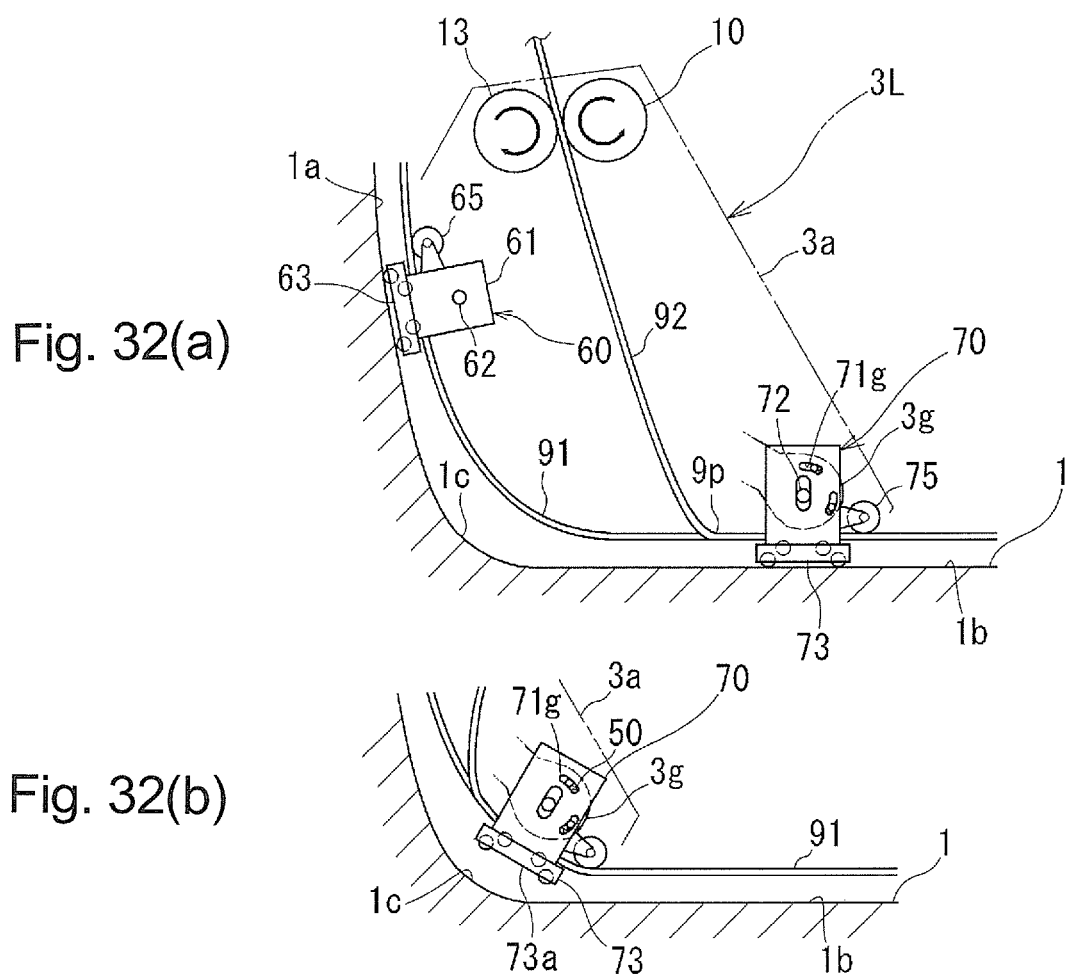
FIGS. 32(a) and 32(b) are front views sequentially illustrating how the pipe-forming apparatus according to the twelfth embodiment performs pipe forming while moving in a peripheral surface portion including a corner portion of the existing pipe.

FIGS. 30 to 32 illustrate a twelfth embodiment of the invention. As illustrated in FIG. 30, in a pipe-forming apparatus 3L of the twelfth embodiment, a compression coil spring 50 (biasing device) is used as an acting portion.

As illustrated in FIG. 31(a), a plurality of (two in the drawing) arcuate holes 71g are formed in the support plate 71. The arcuate holes 71g are disposed on a concentric circle about the rear side rotary axis 72. Each arcuate hole 71g is formed in an arc shape along the concentric circle. A shaft-shaped spring receiving member 46 is passed through each arcuate hole 71g. The spring receiving member 46 is fixed to a disk-shaped guide support portion 3g of the apparatus frame 30. The rear side rotary axis 72 is provided in the middle portion of the guide support portion 3g.

The compression coil spring 50 is accommodated in each arcuate hole 71g. One end portion of the coil spring 50 abuts against the edge of the arcuate hole 71g that is on one end side. The other end portion of the coil spring 50 abuts against the spring receiving member 46.

As illustrated in FIG. 31(*b*), when the propelling-direction front end portion (left end portion in the drawing) of the rear side guide portion 73 is inclined toward the outer periphery side (lower side in the drawing), the coil spring 50 is compressed by the spring receiving member 46 being relatively slid in the arcuate hole 71g. As a result, the coil spring 50 rotationally biases the support plate 71, eventually the rear side guide portion 73, in the clockwise direction in FIG. 31(*b*). In other words, the front end portion (left end portion in FIG. 31) of the rear side guide portion 73 is rotationally biased toward the inner periphery side (upper side in the drawing) about the rear side rotary axis 72.

As a result, separation of the front end portion of the rear side guide portion 73 from the preceding spiral pipe portion 91 can be prevented. Especially, separation of the front end portion of the rear side guide portion 73 from the preceding spiral pipe portion 91 can be reliably prevented even in the corner portion 1c that has a large curvature as illustrated in FIG. 32. Further, the rear side guide portion 73 is always capable of following the outer peripheral surface of the preceding spiral pipe portion 91. Therefore, it is possible to prevent the rear side guide portion 73 from obliquely colliding with the inner peripheral surface of the existing pipe 1, and the pipe-forming apparatus 3L can be smoothly propelled.

Thirteenth Embodiment

Figure 33A:
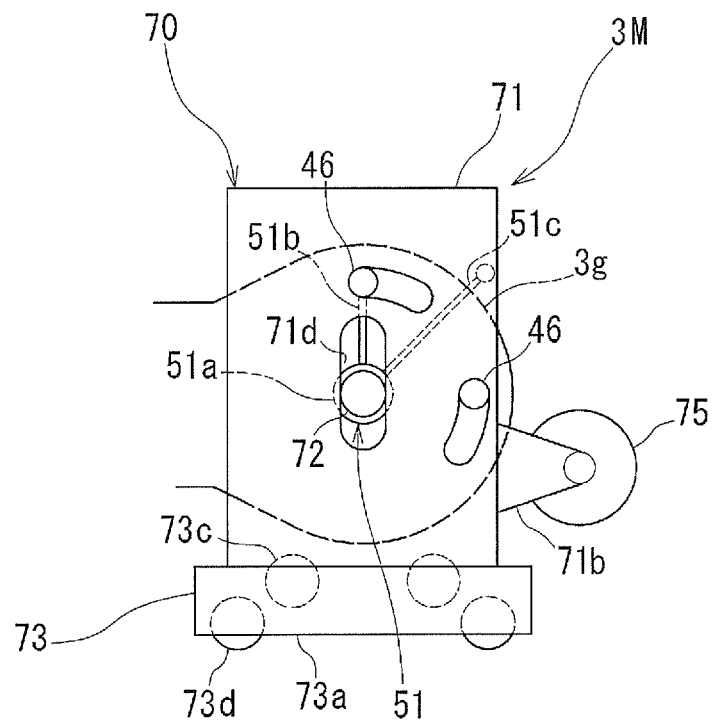
FIG. 33(a) is a front view of a rear side guide unit of a pipe-forming apparatus according to a thirteenth embodiment of the invention.
Figure 33B:
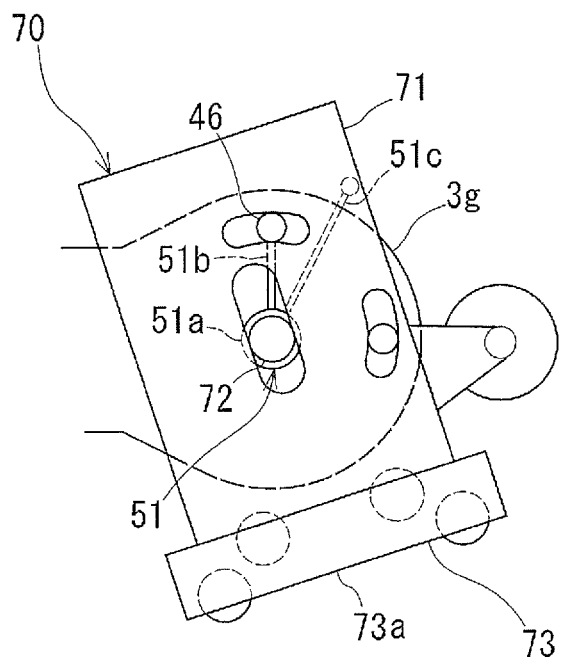
FIG. 33(b) is a front view illustrating a state where the rear side guide unit of the thirteenth embodiment is inclined.

FIG. 33 illustrates a thirteenth embodiment of the invention. In the thirteenth embodiment, a torsion spring 51 (biasing device) is used as an acting portion instead of the coil spring 50. The torsion spring 51 has a torsion spring portion 51a and a pair of spring ends 51b and 51c. The torsion spring portion 51a is wound around the rear side rotary axis 72. One spring end 51b is engaged to one spring receiving member 46 and, in turn, is engaged to the apparatus frame 30. The other spring end 51c is engaged to the support plate 71.

As illustrated in FIG. 33(*b*), when the propelling-direction front end portion (left end portion in the drawing) of the rear side guide portion 73 is inclined toward the outer periphery side (lower side in the drawing), the torsion spring portion 51a is twisted by the spring receiving member 46 being relatively slid in the arcuate hole 71g. As a result, the torsion spring 51 rotationally biases the support plate 71, eventually the rear side guide portion 73, in the clockwise direction in FIG. 33(*b*). In other words, the front end portion (left end portion in FIG. 33) of the rear side guide portion 73 is rotationally biased toward the inner periphery side (upper side in the drawing) about the rear side rotary axis 72.

As a result, separation of the front end portion of the rear side guide portion 73 from the preceding spiral pipe portion 91 can be prevented. Further, the rear side guide portion 73 is always capable of following the outer peripheral surface of the preceding spiral pipe portion 91. Therefore, it is possible to prevent the rear side guide portion 73 from obliquely colliding with the inner peripheral surface of the existing pipe 1, and a pipe-forming apparatus 3M can be smoothly propelled.

Fourteenth Embodiment

FIGS. 34 to 40 illustrate a fourteenth embodiment of the invention.

Figure 34:
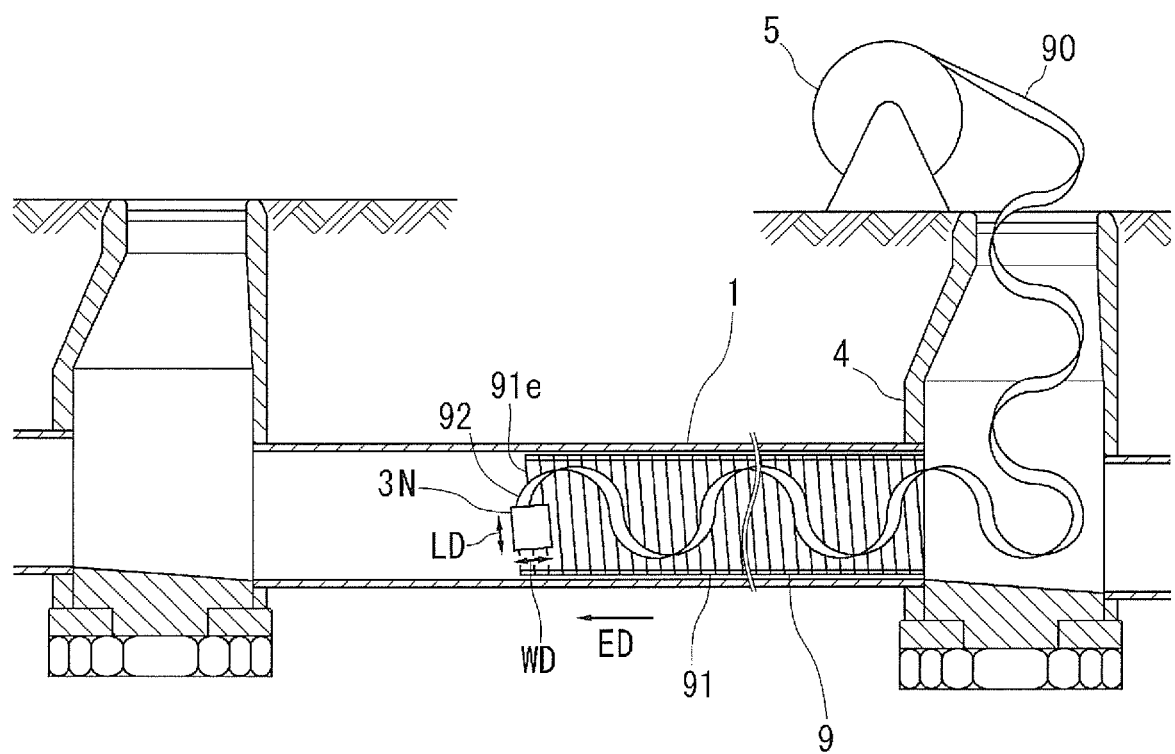
FIG. 34 is a cross-sectional view illustrating how to rehabilitate an existing pipe with a pipe-forming apparatus according to a fourteenth embodiment of the invention.

FIG. 34 illustrates how to rehabilitate an old existing pipe 1. Examples of the existing pipe 1 include a sewer pipe, a water supply pipe, an agricultural water pipe, a water pipe for hydroelectric power generation, and a gas pipe. A rehabilitation pipe 9 (spiral pipe) is lined on the inner wall of the existing pipe 1. The rehabilitation pipe 9 is constituted by a long strip member 90 and has a spiral pipe shape.

Figure 38:
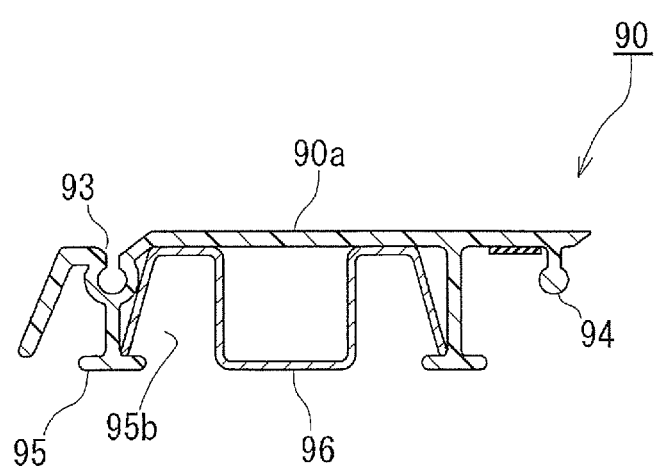
FIG. 38 is a cross-sectional view illustrating a strip member to become the rehabilitation pipe, which is taken along line XXXVIII-XXXVIII of FIG. 35.

As illustrated in FIG. 38, the strip member 90 has a constant cross section and extends in a direction substantially orthogonal to the paper surface of the drawing. The strip member 90 is provided with a strip main body 90a made of a synthetic resin such as polyvinyl chloride and a metallic reinforcing strip member 96 made of steel or the like.

The strip main body 90a has a flat face side surface (surface facing the inner periphery side when the rehabilitation pipe 9 is completed, upper surface in FIG. 38).

The reinforcing strip member 96 is provided in the reverse side portion of the strip main body 90a (side portion facing the outer periphery side when the rehabilitation pipe 9 is completed, lower side portion in FIG. 38). In the reverse side portion of the strip member 90, a guide groove 95b is formed by the reinforcing strip member 96 and a rib 95 of the strip main body 90a. The guide groove 95b extends along the longer direction of the strip member 90.

As illustrated in FIG. 38, a recessed first fitting portion 93 is formed in the edge portion of the strip member 90 that is on one width-direction side (left side in FIG. 38). A projecting second fitting portion 94 is formed in the edge portion of the strip member 90 that is on the other width-direction side (right side in FIG. 38).

Figure 40:
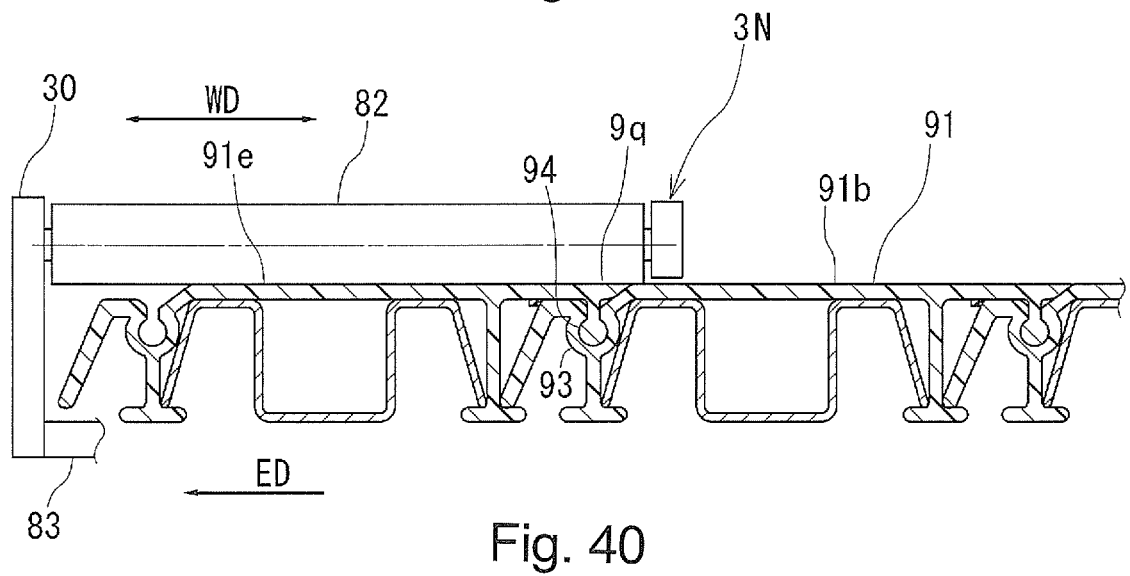
FIG. 40 is a cross-sectional view taken along line XL-XL of FIG. 35.

As illustrated in FIG. 34, the strip member 90 in the course of pipe forming includes a preceding spiral pipe portion 91 formed in advance and a following strip portion 92 of an unformed pipe that follows the preceding spiral pipe portion 91. As illustrated in FIG. 40, in the preceding spiral pipe portion 91, eventually the rehabilitation pipe 9, the strip member 90 is wound in a spiral winding direction along the inner periphery of the existing pipe 1 and the fitting portions 93 and 94 at the edges adjacent with a difference of one lap are joined by uneven fitting.

Approximately one lap part of the front end (left end in FIG. 34) of the preceding spiral pipe portion 91 in an extending direction ED extending along the axis of the pipe will be referred to as a "pipe end portion 91e". A pipe-forming apparatus 3N is disposed on the pipe end portion 91e of the preceding spiral pipe portion 91.

Figure 36:
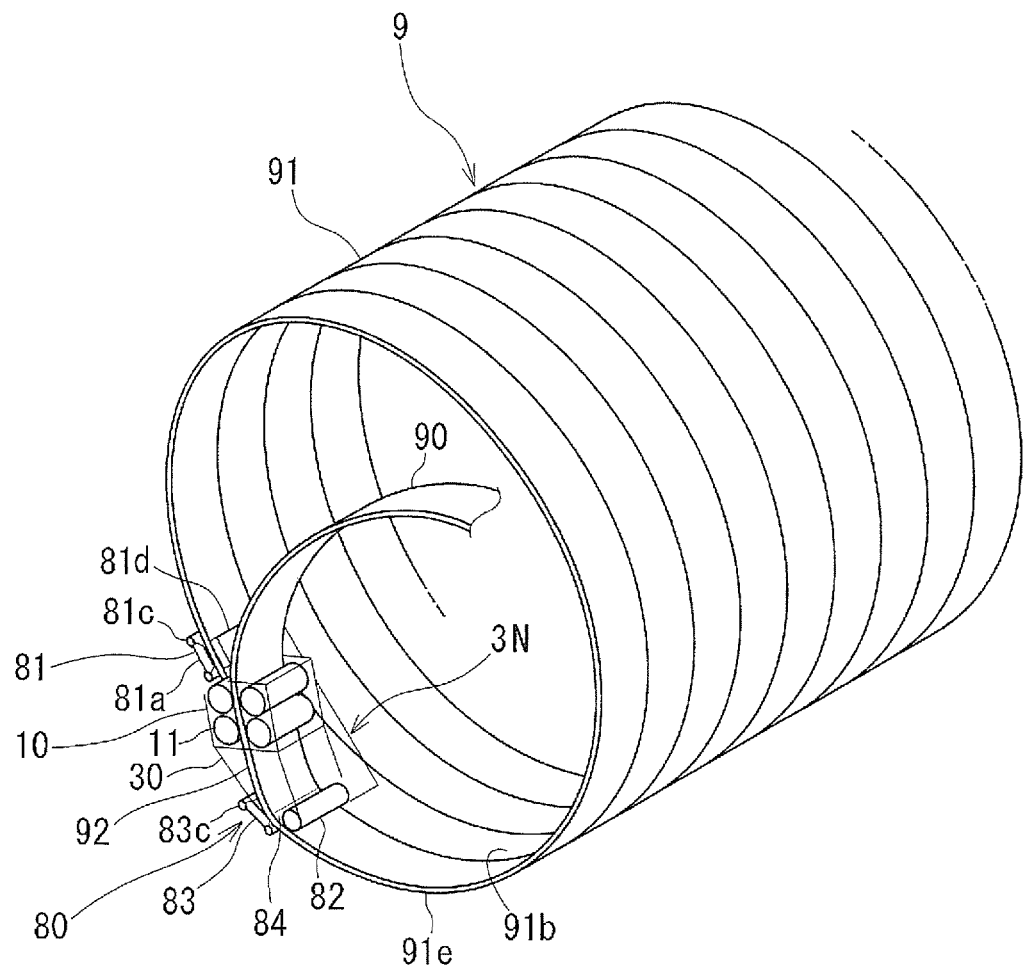
FIG. 36 is a perspective view of a rehabilitation pipe in the making by the pipe-forming apparatus.

As illustrated in FIG. 36, the following strip portion 92 is introduced into the pipe-forming apparatus 3N and continues with the circumferential endmost portion of the pipe end portion 91e.

Figure 39:
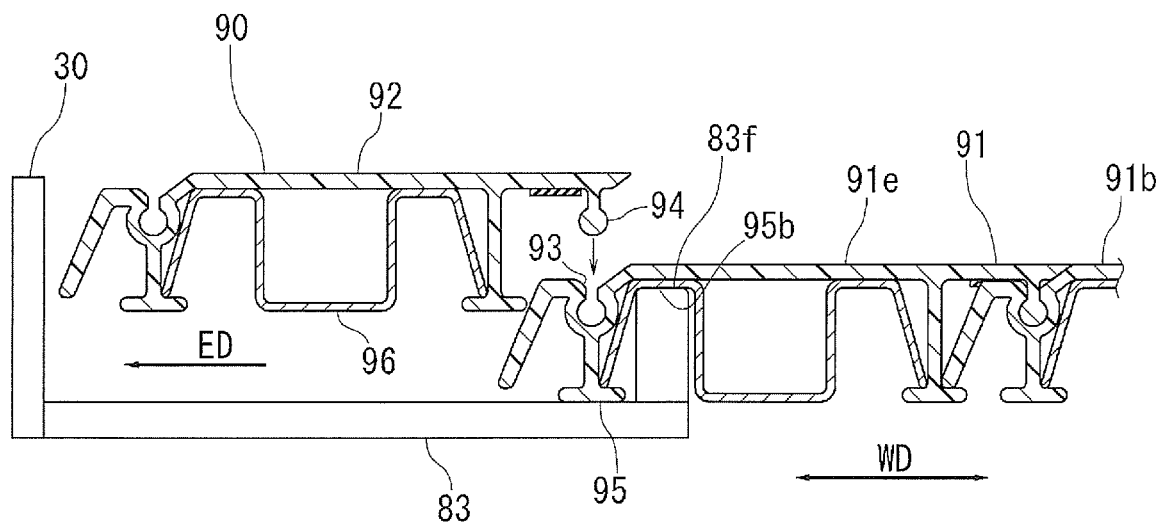
FIG. 39 is a cross-sectional view taken along line XXXIX-XXXIX of FIG. 35.

As illustrated in FIG. 39, each of the width direction of the continuous and closest following strip portion 92 and the width direction of the strip member 90 in the preceding spiral pipe portion 91 is substantially along the extending direction ED. The first fitting portion 93 is directed to the extension front side (left side in the drawing), and the second fitting portion 94 is directed to the extension rear side (right side in the drawing).

As illustrated in FIG. 36, the pipe-forming apparatus 3N is a pipe end release-type pipe-forming apparatus. In other words, the pipe-forming apparatus 3N performs pipe forming in a state where the part other than the partial part at which the pipe-forming apparatus 3N is provided in the circumferential direction of the pipe end portion 91e is released from the pipe-forming apparatus 3N. Accordingly, the pipe-forming apparatus 3N has a non-inner periphery restriction structure. In other words, the pipe-forming apparatus 3N does not have an inner periphery restriction body that restricts the cross section (shape, circumferential length, and diameter) of the pipe end portion 91e of the preceding spiral pipe portion 91 from the inner periphery side. Pipe forming is performed in a state where the pipe end portion 91e is released to the inner periphery side.

Figure 35:
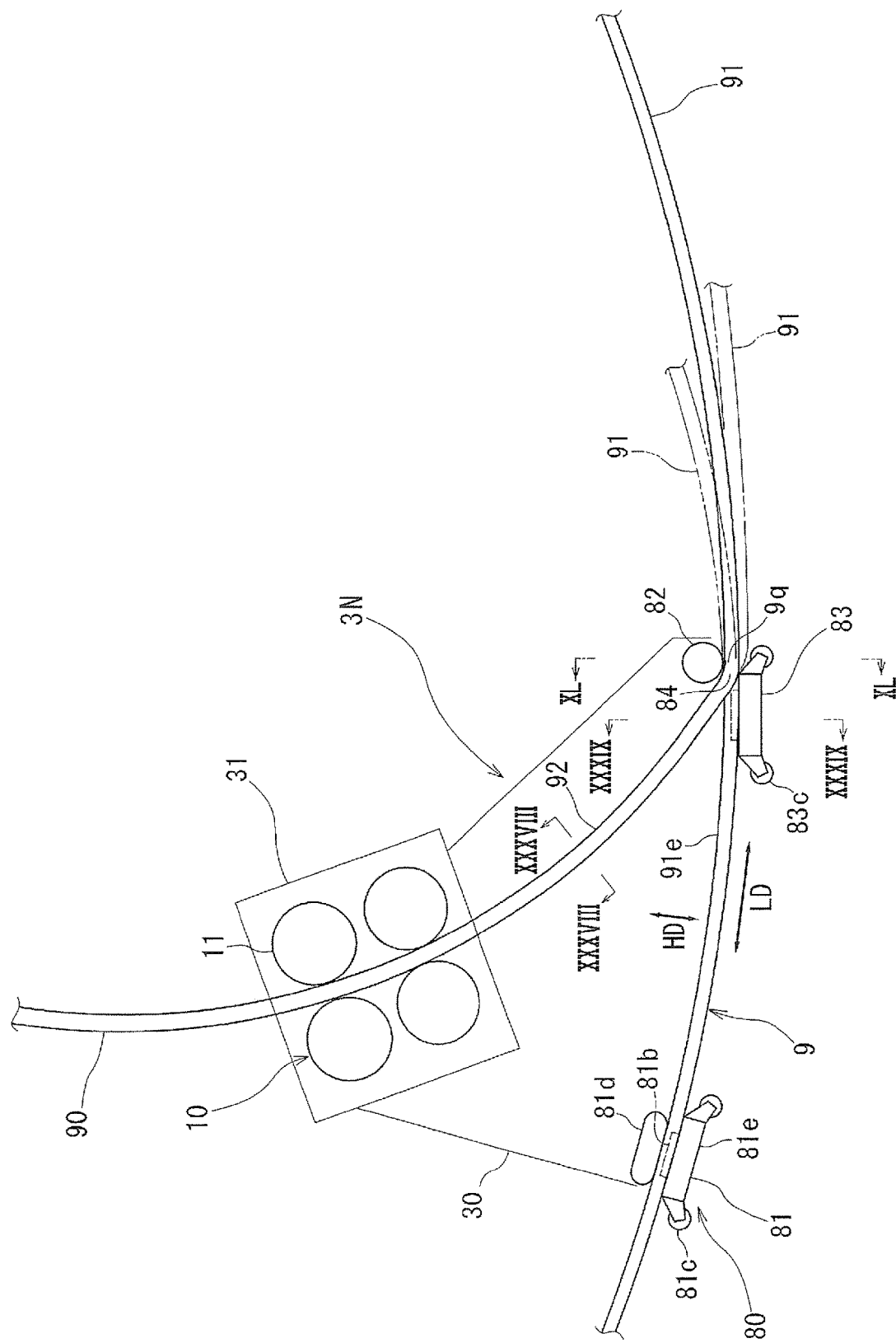
FIG. 35 is a side view schematically illustrating the pipe-forming apparatus in a state where rehabilitation pipe forming is in progress.
Figure 37:
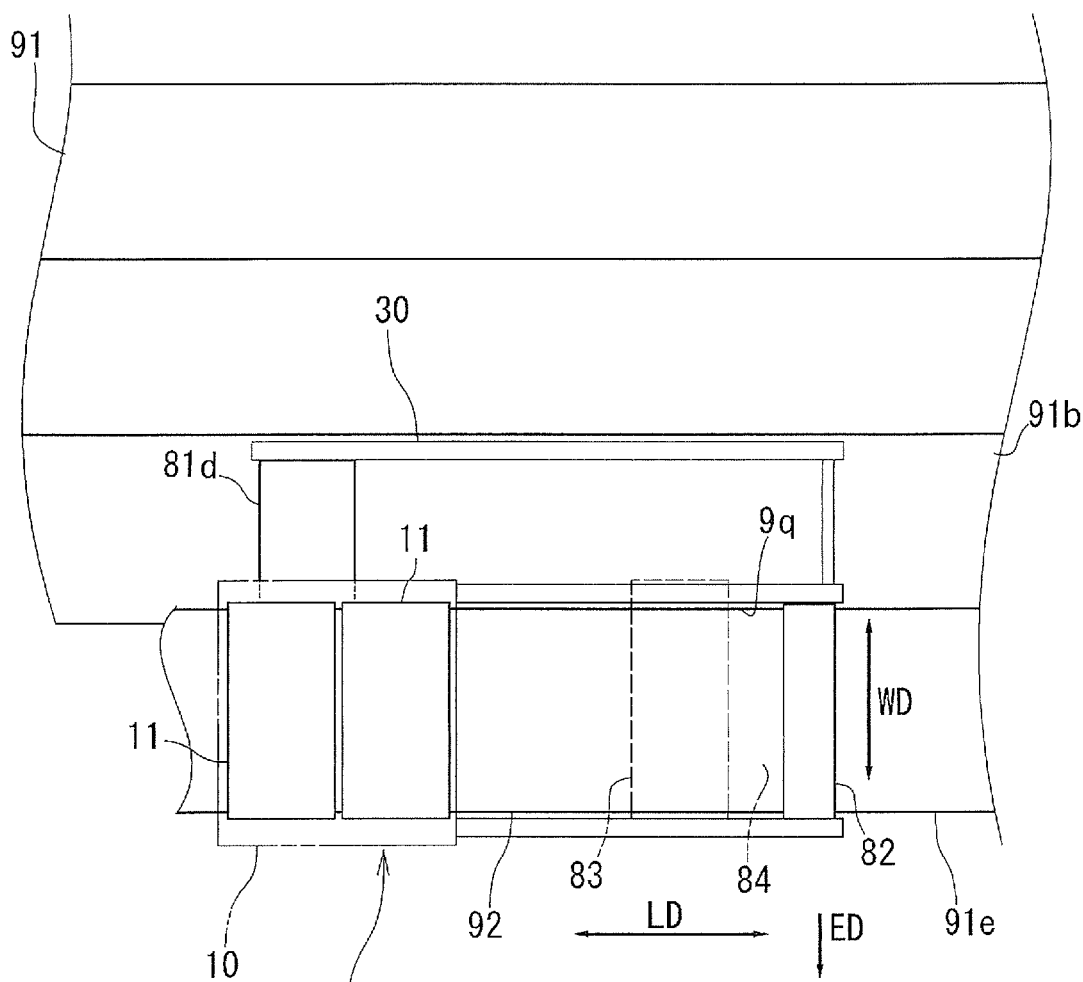
FIG. 37 is an explanatory plan view of the pipe-forming apparatus and the rehabilitation pipe in pipe forming.

Specifically, as illustrated in FIGS. 35 and 37, the pipe-forming apparatus 3N is provided with a driving part 10, a pipe end guide 80, and an apparatus frame 30 (schematically indicated by a two-dot chain line in FIG. 35). The apparatus frame 30 is disposed in the pipe end portion 91e.

As illustrated in FIGS. 34 and 37, the apparatus frame 30, eventually the pipe-forming apparatus 3N, has a propelling longitudinal direction LD along the spiral winding direction. The apparatus frame 30, eventually the pipe-forming apparatus 3N, has a width direction WD orthogonal to the winding direction and substantially along the pipe axis of the spiral pipe 9. As illustrated in FIG. 35, the apparatus frame 30, eventually the pipe-forming apparatus 3N, has a height direction BD orthogonal to the machine-width direction WD and the propelling longitudinal direction LD and directed in the pipe inward-outward direction (radial direction) of the spiral pipe 9.

As illustrated in FIG. 35, the driving part 10 is provided at the part of the apparatus frame 30 that is on the propulsion front side (left side in FIG. 35) and on the top portion side (upper side in FIG. 35) in the machine-height direction HD. Although not illustrated in detail, the driving part 10 includes a drive motor and a power transmission mechanism (such as a gear) in addition to two pairs of driving rollers 11.

The driving part 10 is accommodated in a housing 31 of the apparatus frame 30.

Alternatively, a pair of driving rollers 11 or three or more pairs of driving rollers 11 may be provided in place of the two pairs of driving rollers 11.

The axis of each driving roller 11 is directed in the machine-width direction WD (direction orthogonal to the paper surface of FIG. 35). A drive motor (not illustrated) is connected to each driving roller 11 via a power transmission mechanism such as a gear. The following strip portion 92 is sandwiched between the pair of driving rollers 11 and 11. The driving part 10 applies an extrusion force to the following strip portion 92 obliquely toward the propulsion rear side (right side in FIG. 35) and the base portion side in the machine-height direction BD (lower side in FIG. 35).

As illustrated in FIG. 35, the base portion of the apparatus frame 30 (lower side portion in FIG. 35) extends in the propelling longitudinal direction LD. A clamping guide portion 81 (front side guide portion) is provided at the part of the base portion of the apparatus frame 30 that is on the propulsion front side (left side in FIG. 35). As illustrated in FIG. 37, the clamping guide portion 81 is shifted by one pitch to the extension rear side (upwards in FIG. 37) with respect to the driving part 10.

As illustrated in FIG. 35, the clamping guide portion 81 includes a plate-shaped receiving portion 81a (receiving portion, outer periphery guide member) and a pressing member 81d (pressing portion, inner periphery guide member). The receiving portion 81a is engaged to the pipe end portion 91e of the preceding spiral pipe portion 91 from the outer periphery side (reverse side). An engaging portion engaged to the guide groove 95b of the strip member 90 is formed in the receiving portion 81a. The receiving portion 81a is capable of sliding (moving) in the circumferential direction of the preceding spiral pipe portion 91.

A roller 81c is provided in both front and rear side portions of the receiving portion 81a. The roller 81c is rolled in contact with the inner periphery of the existing pipe 1.

The pressing member 81d is disposed on the inner periphery side (face side) of the pipe end portion 91e and presses the pipe end portion 91e from the inner periphery side. The pressing member 81d faces the receiving portion 81a across the pipe end portion 91e. The pipe end portion 91e is sandwiched between the pressing member 81d and the receiving portion 81a. Eventually, the clamping guide portion 81 pinches the pipe end portion 91e from the outer periphery side and the inner periphery side.

As the pipe-forming apparatus 3N is propelled, frictional resistance is generated between the clamping guide portion 81 and the preceding spiral pipe portion 91.

As illustrated in FIGS. 35 and 37, a reverse side guide portion 83 is provided on the propulsion rear side (right side in FIG. 35) beyond the clamping guide portion 81 in the apparatus frame 30. The reverse side guide portion 83 is disposed apart from the driving part 10 to the reverse side (lower side portion in FIG. 35) in the machine-height direction BD and from the driving part 10 to the propulsion rear side (right side in FIG. 35).

As illustrated in FIG. 39, the plate-shaped reverse side guide portion 83 guides the pipe end portion 91e of the preceding spiral pipe portion 91 from the outer periphery side (lower side in FIG. 39). The reverse side guide portion 83 is provided with an engaging portion 83f. The engaging portion 83f is engaged from the outer periphery side to the guide groove 95b of the pipe end portion 91e. The engaging portion 83f is relatively slidable in the longer direction of the guide groove 95b (direction orthogonal to the paper surface of FIG. 39). Eventually, the reverse side guide portion 83 is relatively slidable in the circumferential direction of the pipe end portion 91e.

As illustrated in FIG. 35, a roller 83c is provided in both front and rear side portions of the reverse side guide portion 83. The roller 83c is rolled in contact with the inner periphery of the existing pipe 1.

As illustrated in FIG. 35, a face side guide portion 82 is provided on the propulsion rear side (right side in FIG. 35) beyond the reverse side guide portion 83 in the base portion of the apparatus frame 30 (lower side portion in FIG. 35). As illustrated in FIG. 36, a columnar roller constitutes the face side guide portion 82. As illustrated in FIG. 40, the axis of the face side guide portion 82 is directed in the machine-width direction WD. The face side guide portion 82 slightly straddles the pipe end portion 91e of the preceding spiral pipe portion 91 to a part 91b one lap ahead of the pipe end portion 91e and guides the preceding spiral pipe portion 91 from the inner periphery side (upper side in FIG. 40).

As illustrated in FIG. 35, the reverse side guide portion 83 and the face side guide portion 82 are slightly shifted in the propelling longitudinal direction LD. At least the middle portion of the reverse side guide portion 83 in the propelling longitudinal direction LD and the central portion of the face side guide portion 82 are shifted in the propelling longitudinal direction LD. An inter-guide clearance 84 is set between the reverse side guide portion 83 and the face side guide portion 82.

The position (including the angle) of the driving part 10 with respect to the apparatus frame 30 is adjusted such that the following strip portion 92 is extruded from the driving part 10 toward the inter-guide clearance 84.

The rehabilitation pipe 9 (spiral pipe) is formed by the pipe-forming apparatus 3N as follows and the existing pipe 1 is rehabilitated.

As illustrated in FIG. 34, it is assumed that the preceding spiral pipe portion 91 is formed to some extent in the existing pipe 1.

The following strip portion 92 of the strip member 90 is introduced into the driving part 10 of the pipe-forming apparatus 3N from a winding drum 5 on the ground through the manhole 4 and the inside of the preceding spiral pipe portion 91.

As illustrated in FIG. 35, by the driving roller 11 being driven to rotate, the following strip portion 92 is obliquely extruded from the driving part 10 toward the inter-guide clearance 84 (extrusion step).

As a result, at a fitting position 9q of the inter-guide clearance 84, the second fitting portion 94 at the edge of the following strip portion 92 and the first fitting portion 93 at the facing edge of the preceding spiral pipe portion 91 that is one lap ahead are fitted (fitting step) as illustrated in FIGS. 39 and 40. At this time, the front and rear receiving portions 81a and 83 receive the fitting force by holding the preceding spiral pipe portion 91 from the outer periphery side. In addition, the face side guide portion 82 presses the preceding spiral pipe portion 91 from the inner periphery side after the preceding spiral pipe portion 91 passes through the inter-guide clearance 84, and thus the fitting portions 93 and 94 can be further reliably fitted to each other and it is possible to prevent the fitting from becoming insufficient.

Further, a propulsion reaction force is generated by the fitting and the pipe-forming apparatus 3N is propelled clockwise in FIG. 36 along the spiral winding direction (propulsion step). As a result, the rehabilitation pipe 9 can be formed along the inner surface of the existing pipe 1 during self-traveling of the pipe-forming apparatus 3N.

The pipe end guide 80 is engaged so as to be slidable or rollable in the winding direction of the pipe end portion 91e of the preceding spiral pipe portion 91, and thus the pipe-forming apparatus 3N can be guided in the winding direction.

According to the pipe-forming apparatus 3N, the pressing force of the following strip portion 92 by the driving part 10 can be adjusted in response to, for example, a change in the cross section of the existing pipe 1, and thus it is possible to control expansion and contraction of the pipe diameter. The pressing force can be adjusted by the pinching force (resistance force) of the preceding spiral pipe portion 91 by the clamping guide portion 81.

For example, when it is desired to form a large-diameter pipe, the pinching force of the preceding spiral pipe portion 91 by the clamping guide portion 81 is strengthened. Then, the propulsion resistance of the pipe-forming apparatus 3N increases, and the propulsion amount of the pipe-forming apparatus 3N becomes smaller than the feeding amount of the following strip portion 92, which leads to an increase in the pressing force of the following strip portion 92 by the driving part 10. As a result of this pressing force, the pipe end portion 91e of the preceding spiral pipe portion 91 and the fitting portions 93 and 94 of the following strip portion 92 in the inter-guide clearance 84 are fitted. In addition, as indicated by a two-dot chain line in FIG. 35, in the inter-guide clearance 84, the following strip portion 92 and the pipe end portion 91e of the preceding spiral pipe portion 91 can be displaced to the outer periphery side without being hindered by the reverse side guide portion 83.

In other words, in the inter-guide clearance 84, the pipe end portion 91e of the preceding spiral pipe portion 91 and the fitting portions 93 and 94 of the following strip portion 92 are fitted while being displaced to the outer periphery side. As a result, the rehabilitation pipe 9 can be reliably formed with a large diameter. During the forming of the large-diameter pipe, fitting-based pipe forming can be stably performed by a strong pressing force.

When it is desired to form a small-diameter pipe, the pinching force of the preceding spiral pipe portion 91 by the clamping guide portion 81 is weakened. As a result, the propulsion resistance of the pipe-forming apparatus 3N decreases, and the pressing force of the following strip portion 92 by the driving part 10 decreases. Then, as indicated by a three-dot chain line in FIG. 35, the following strip portion 92 and the pipe end portion 91e of the preceding spiral pipe portion 91 in the inter-guide clearance 84 are displaced to the inner periphery side and pressed against the face side guide portion 82 owing to the diameter reduction properties at a time of pipe forming of the strip member 90 (characteristics to be reduced in diameter as a result of spiral winding). At this time, the pipe end portion 91e and the following strip portion 92 may be pinched by the propulsion rear side corner portion of the reverse side guide portion 83 and the face side guide portion 82. As a result, the fitting portions 93 and 94 can be stably fitted together and the rehabilitation pipe 9 can reliably formed with a small diameter.

As a result, diameter expansion and contraction control and fitting stabilization can be achieved at the same time.

Fifteenth Embodiment

Figure 41:
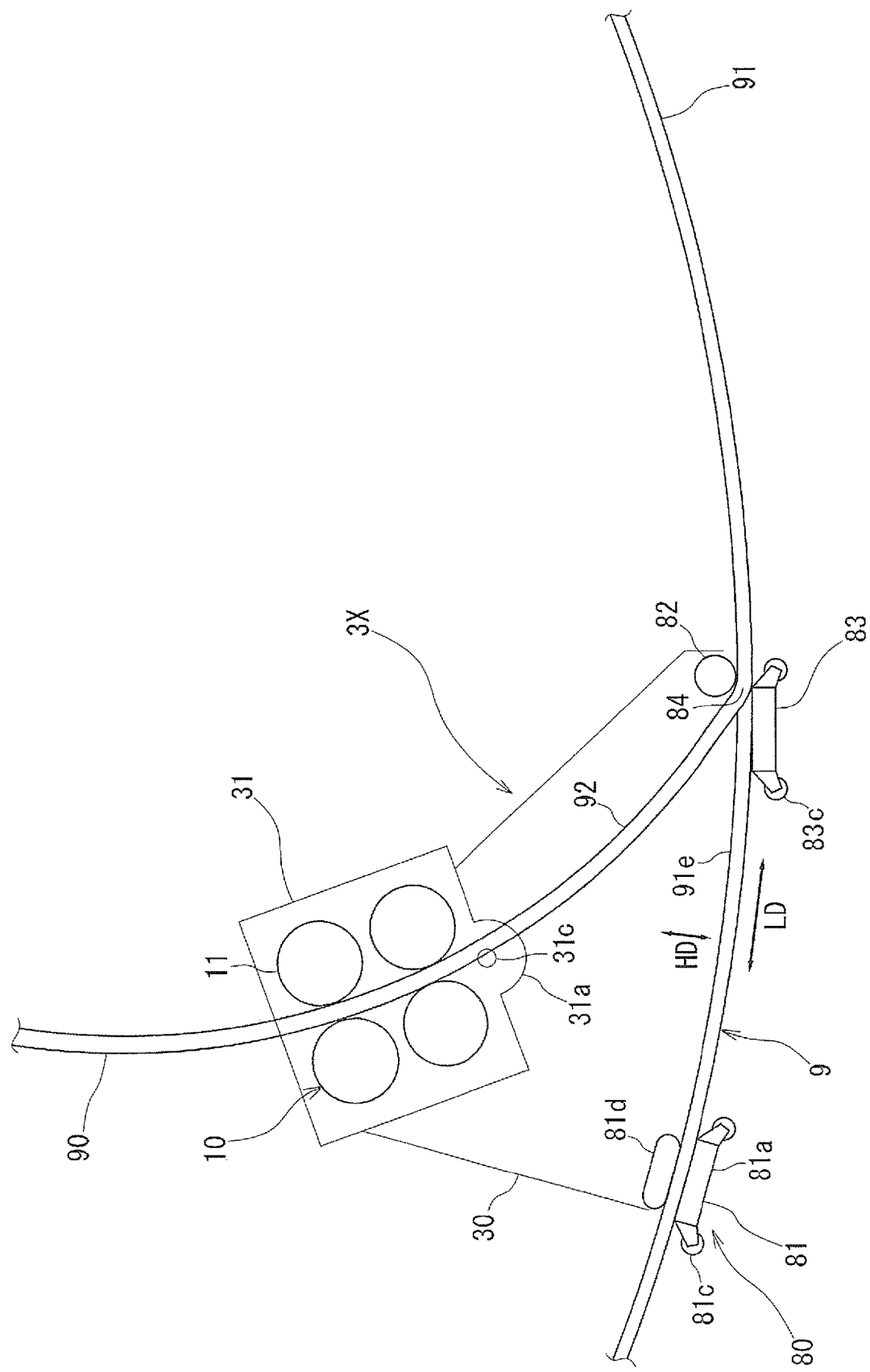
FIG. 41 is a side view schematically illustrating a pipe-forming apparatus according to a fifteenth embodiment of the invention in a state where rehabilitation pipe forming is in progress.
Figure 42:
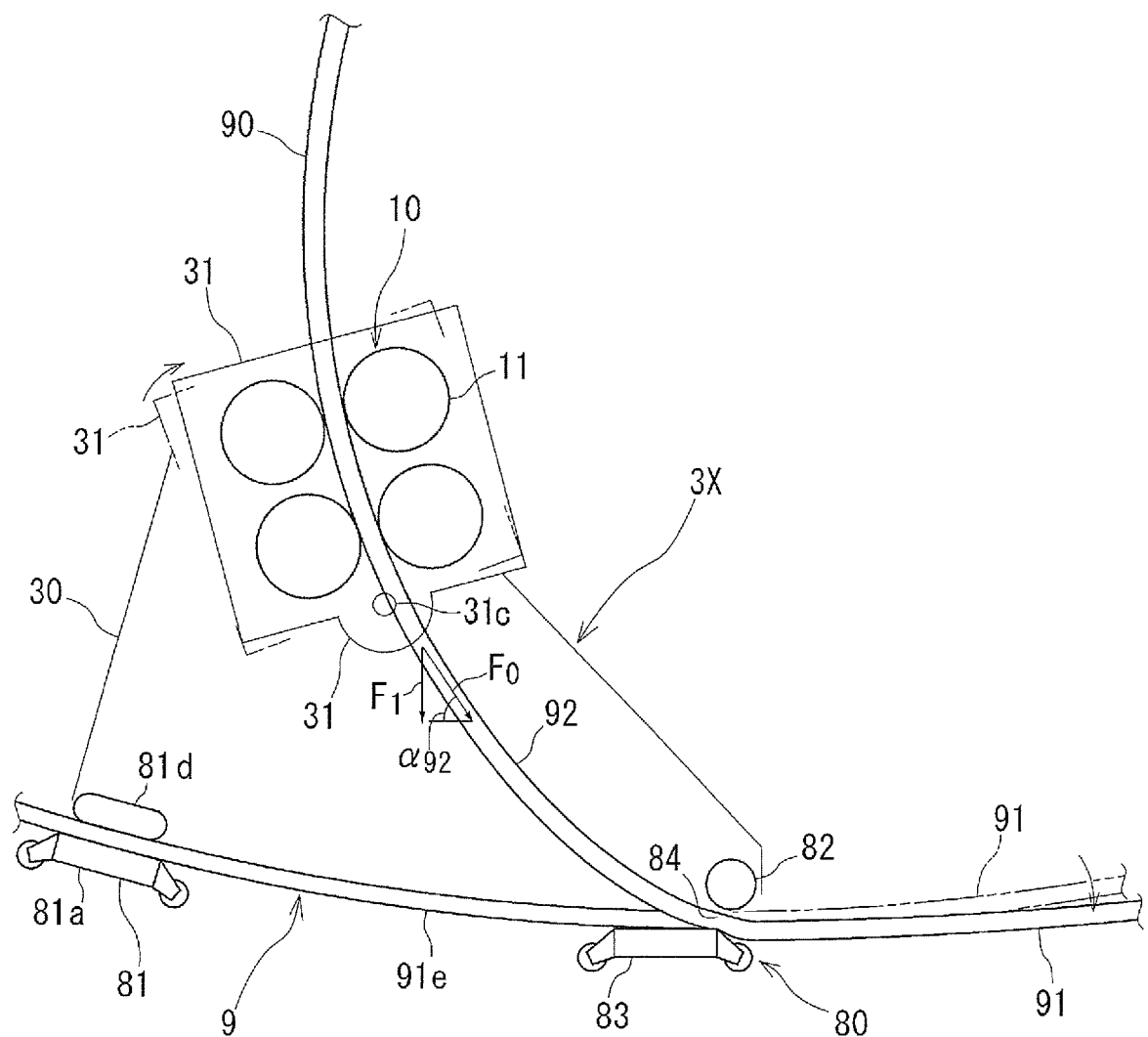
FIG. 42 is a side view illustrating a state at a time when a large-diameter pipe is formed by the pipe-forming apparatus according to the fifteenth embodiment.
Figure 43:
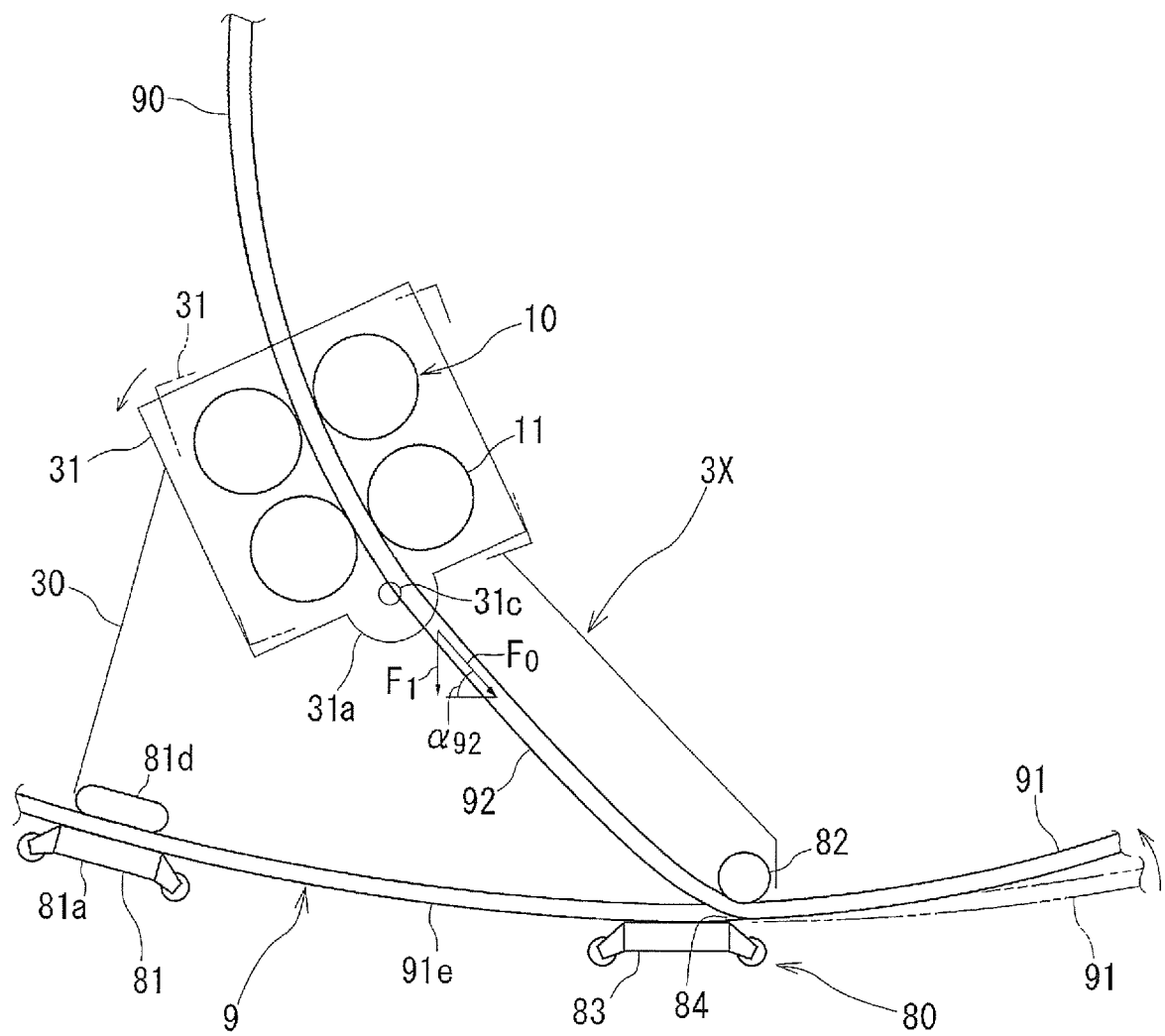
FIG. 43 is a side view illustrating a state at a time when a large-diameter pipe is formed by the pipe-forming apparatus according to the fifteenth embodiment.

FIGS. 41 to 43 illustrate a fifteenth embodiment of the invention.

As illustrated in FIG. 41, the driving part 10 of a pipe-forming apparatus 3X of the fifteenth embodiment is attached to the apparatus frame 30 via an angle adjustment mechanism 31a (position adjustment mechanism). As a result, the driving part 10 is angle-adjustable (position-adjustable) around a rotation axis 31c with respect to the apparatus frame 30 or the guide portions 83 and 82. The rotation axis 31c is along the machine-width direction WD (direction orthogonal to the paper surface in FIG. 41).

The rotation axis 31c is disposed in, for example, the side portion of the driving part 10 that faces the pipe end guide 80.

The rotation axis 31c may be disposed outside the driving part 10. For example, the rotation axis 31c may be disposed between the driving part 10 and the guide portions 82 and 83 or may be disposed near the guide portions 82 and 83 (see FIG. 46).

The angle adjustment mechanism 31a may include a bolt or a lock mechanism fixing the position of the driving part 10 to the apparatus frame 30 after angle adjustment.

As illustrated in FIGS. 42 and 43, according to the pipe-forming apparatus 3X, pipe diameter expansion and contraction can be controlled by the angle adjustment mechanism 31a performing angle adjustment (position adjustment) on the driving part 10.

For example, when it is desired to form a large-diameter pipe, the driving part 10 is adjusted in angle so as to be rotationally displaced in the clockwise direction in FIG. 42 as indicated by a solid line in FIG. 42. Then, an extrusion angle α92 of the following strip portion 92 increases. Therefore, a force component F1 to the outer periphery side (lower side in FIG. 42) of a force F0 applied from the driving part 10 to the following strip portion 92 increases. As a result, in the inter-guide clearance 84, the following strip portion 92 can be strongly pressed to the preceding spiral pipe portion 91. Owing to this strong pressing force, the fitting portions 93 and 94 of the preceding spiral pipe portion 91 and the following strip portion 92 can be stably fitted. In addition, the preceding spiral pipe portion 91 and the following strip portion 92 in the inter-guide clearance 84 can be displaced to the outer periphery side without being hindered by the reverse side guide portion 83. As a result, the rehabilitation pipe 9 can be formed with a large diameter.

The two-dot chain line in FIG. 42 illustrates a state where the driving part 10 is at a neutral angle (FIG. 41).

When it is desired to form a small-diameter pipe, the driving part 10 is adjusted in angle so as to be rotationally displaced in the counterclockwise direction in FIG. 43 as indicated by a solid line in FIG. 43. Then, the extrusion angle α92 of the following strip portion 92 decreases. Therefore, the force component F1 pressing the following strip portion 92 to the outer periphery side (lower side in FIG. 43) weakens and the following strip portion 92 is pressed against the face side guide portion 82 owing to the diameter reduction properties of the strip member 90. As a result, the fitting portions 93 and 94 of the preceding spiral pipe portion 91 and the following strip portion 92 can be fitted and the rehabilitation pipe 9 can be stably formed with a small diameter.

The two-dot chain line in FIG. 43 illustrates a state where the driving part 10 is at a neutral angle (FIG. 41).

Sixteenth Embodiment

Figure 44:
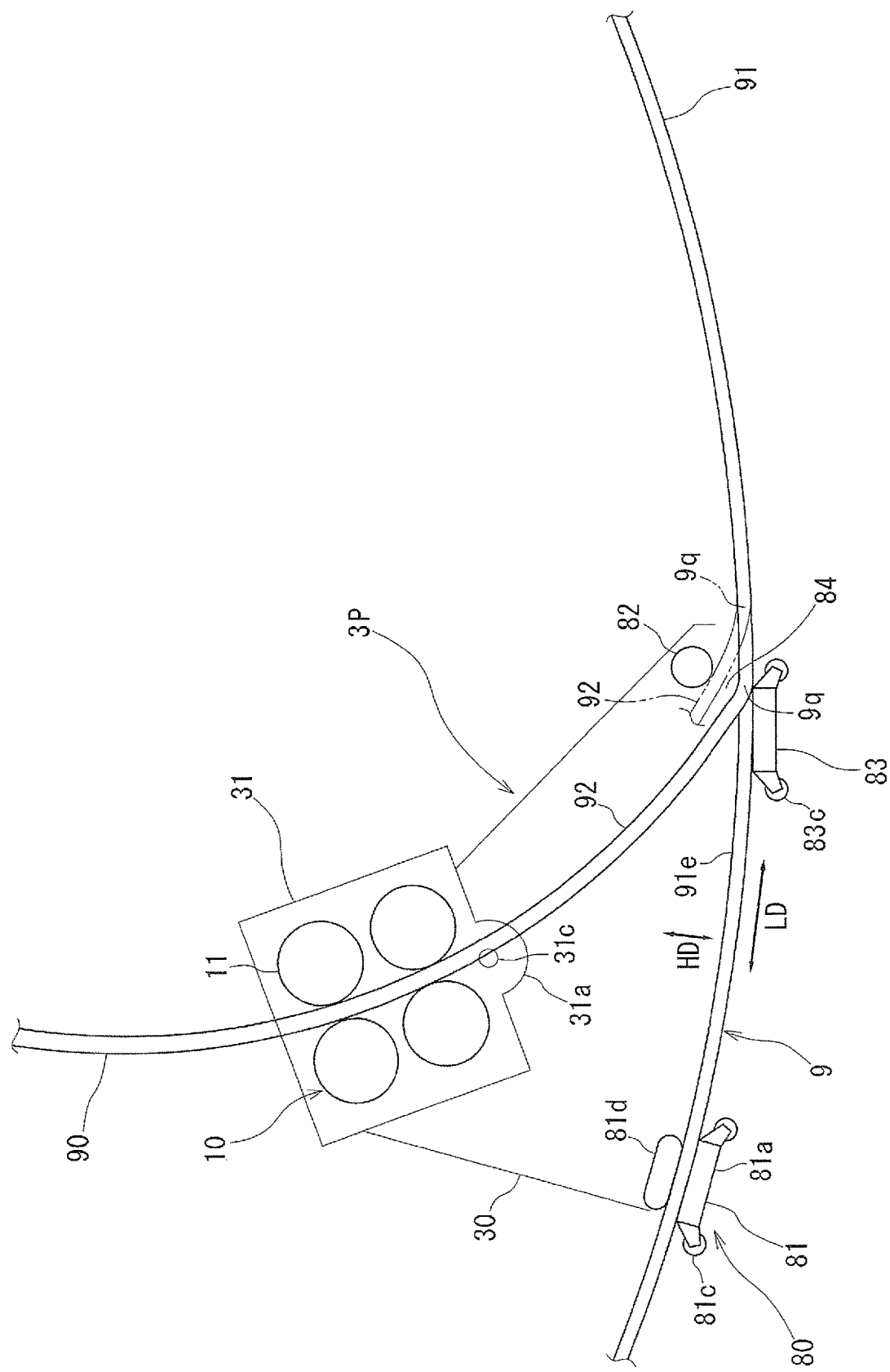
FIG. 44 is a side view schematically illustrating a pipe-forming apparatus according to a sixteenth embodiment of the invention in a state where rehabilitation pipe forming is in progress.

FIG. 44 illustrates a sixteenth embodiment of the invention.

In a pipe-forming apparatus 3P of the sixteenth embodiment, the face side guide portion 82 is disposed closer to the top portion side in the machine-height direction BD (upper side in FIG. 44), that is, the inner periphery side of the rehabilitation pipe 9 than in the fourteenth and fifteenth embodiments (FIGS. 34 and 41). Accordingly, the inter-guide clearance 84 is open wider than in the fourteenth and fifteenth embodiments in the machine-height direction HD.

The position 9q at which the following strip portion 92 is fitted with the preceding spiral pipe portion 91 may vary with, for example, the pipe diameter of the rehabilitation pipe 9, the winding habit of the following strip portion 92, and the hardness of the strip member 90. In the pipe-forming apparatus 3P, it is possible to give a certain degree of freedom to the passage of the following strip portion 92 by enlarging the inter-guide clearance 84.

As indicated by a two-dot chain line in FIG. 44, depending on the passage of the following strip portion 92, the fitting position 9q may be disposed not in the inter-guide clearance 84 but on the propulsion rear side (right side in FIG. 44) beyond the face side guide portion 82. For example, when a small-diameter pipe is formed, the extrusion angle of the following strip portion 92 decreases, and thus the fitting position 9q can be disposed on the propulsion rear side beyond the face side guide portion 82.

Seventeenth Embodiment

Figure 45:
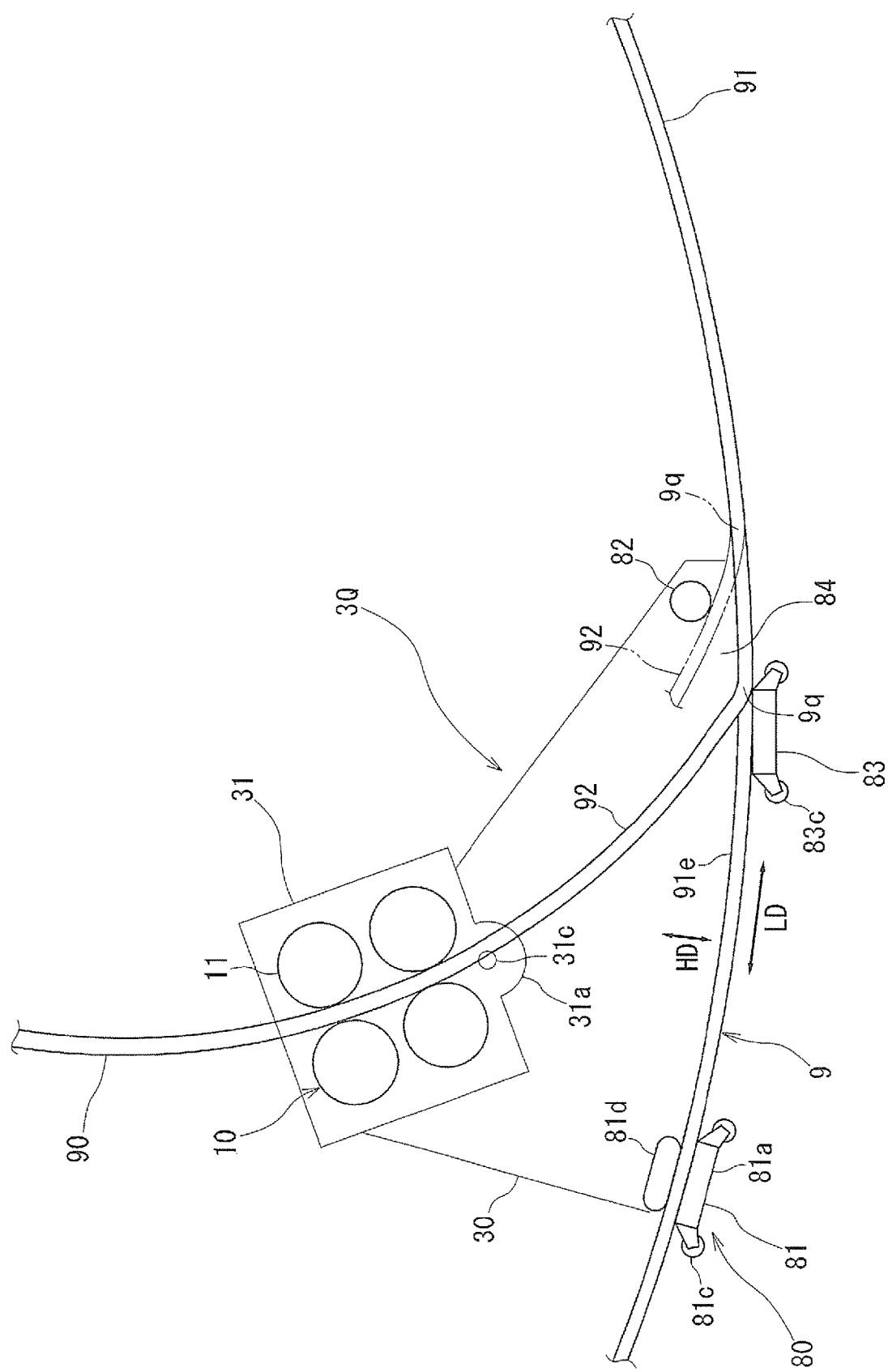
FIG. 45 is a side view schematically illustrating a pipe-forming apparatus according to a seventeenth embodiment of the invention in a state where rehabilitation pipe forming is in progress.

FIG. 45 illustrates a seventeenth embodiment of the invention.

In a pipe-forming apparatus 3Q of the seventeenth embodiment, the face side guide portion 82 is disposed closer to the top portion side in the machine-height direction BD (upper side in FIG. 45) and the propulsion rear side (right side in FIG. 45) than in the fourteenth and fifteenth embodiments (FIGS. 34 and 41). Accordingly, the inter-guide clearance 84 is open wider than in the fourteenth and fifteenth embodiments in the machine-height direction HD and the propelling longitudinal direction LD.

Therefore, a sufficient degree of freedom can be given to the passage of the following strip portion 92. As indicated by a two-dot chain line in FIG. 45, the fitting position 9q may be disposed on the propulsion rear side (right side in FIG. 45) beyond the face side guide portion 82 depending on the passage of the following strip portion 92 as in the sixteenth embodiment (FIG. 44).

Any position can be set as the position of the rotation axis 31c of the angle adjustment mechanism 31a (position adjustment mechanism).

Eighteenth Embodiment

Figure 46:
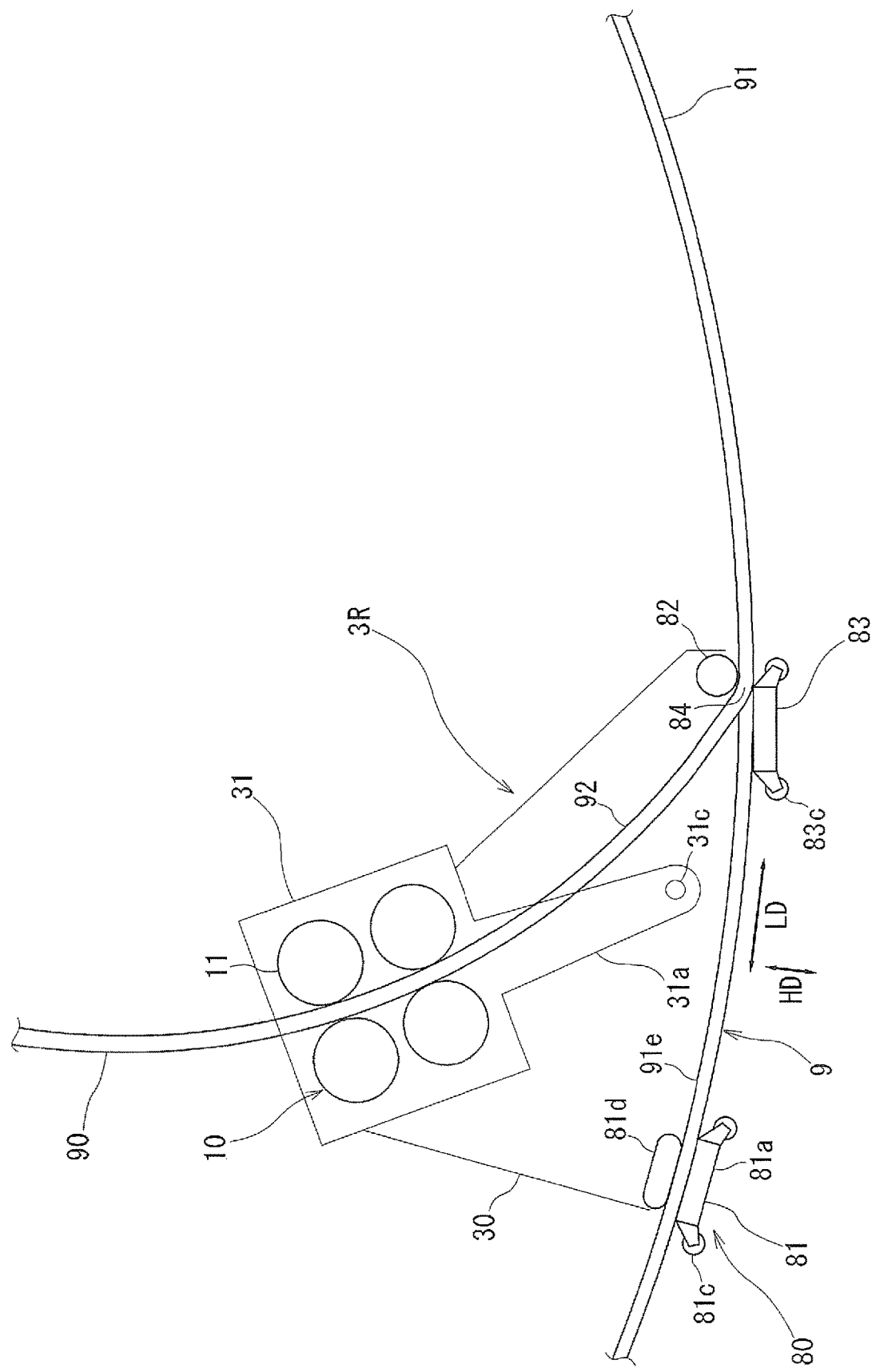
FIG. 46 is a side view schematically illustrating a pipe-forming apparatus according to an eighteenth embodiment of the invention in a state where rehabilitation pipe forming is in progress.

FIG. 46 illustrates an eighteenth embodiment of the invention.

In a pipe-forming apparatus 3R of the eighteenth embodiment, the rotation axis 31c is disposed closer to the guide portions 82 and 83 than in the fifteenth embodiment. Specifically, the angle adjustment mechanism 31a (position adjustment mechanism) has an arm 31b. The arm 31b extends from the driving part 10 to the propulsion rear side (right side in FIG. 46) and the reverse side in the machine-height direction BD (lower side in FIG. 46). The rotation axis 31c is provided at the tip of the arm 31b.

The height of the apparatus frame 30 can be reduced by the rotation axis 31c being disposed on the reverse side in the machine-height direction BD.

For example, the pipe-forming apparatus of the invention can be applied to forming of various spiral pipes not limited to the rehabilitation pipe 9 for rehabilitating the existing pipe 1. The pipe-forming apparatus of the invention is also applicable to spiral pipe forming along the outer peripheral surface of a pipe body such as a columnar body.

The reinforcing strip member 96 may be omitted. The rib 90b may constitute a ridge portion by protruding to the outer periphery side beyond the fitting portions 93 and 94.

The strip member 90 does not have to have a ridge portion protruding to the outer periphery side beyond the fitting portions 93 and 94. In the places where the guide portions 21 and 22 are disposed, the following strip portion 92 may be slightly pulled away from the existing pipe 1 for an interposition space for the guide portions 21 and 22 to be ensured.

The amount by which the following strip portion 92 is pulled can be reduced by a flat thin plate shape being given to the receiving portions 21a and 22a.

The rear side guide portion 22 may be disposed on the fitting position 9p. The rear side guide portion 22 may be disposed between the front side guide portion 21 and the fitting position 9p.

A single guide portion may constitute the pipe end guide 20 alone. The front side guide portion 21 and the rear side guide portion 22 may be connected to each other to constitute one guide portion. The guide portion may be disposed on the fitting position 9p.

A guide roller may constitute the guide portions 21 and 22. In other words, the guide portion may have a roller shape. In this case, it is necessary to ensure a height corresponding to the diameter of the roller-shaped guide portion and a rotary axis disposition space.

A clamping roller may be provided on each of the inner periphery sides of the guide portions 21 and 22 (upper sides in FIGS. 3 and 8) for the strip member 90 or the preceding spiral pipe portion 91 to be clamped between the guide portions 21 and 22 and the clamping roller.

In the second embodiment (FIG. 8), the rolling bodies 24 and 26 may be provided in only one of the front side guide portion 21 and the rear side guide portion 22. In the second embodiment (FIG. 8), the outside rolling body 26 may be omitted.

Inter-embodiment combination is also possible.

The tenth and eleventh embodiments (FIGS. 19 to 29) and the twelfth and thirteenth embodiments (FIGS. 30 to 33) may be combined with each other. In other words, the pipe-forming apparatus may be provided with both the leading roller 41 or 42 and the biasing device 50 or 51 as the acting portion.

An elastic member such as rubber may be used as the biasing device of the acting portion instead of the springs 50 and 51 (FIGS. 30 to 33).

The acting portion may include detection means for detecting the angle of the guide unit 70 or the tangential direction of the inner peripheral surface of the existing pipe 1 and adjustment means for adjusting the angle of the guide unit 70 based on the detected angle.

The acting portion may be provided in the front side guide unit 60.

The inner rollers 65 and 75 may be omitted.

The front side guide unit 60 and the rear side guide unit 70 may be provided directly in the apparatus frame 30 or may be provided indirectly in the apparatus frame 30 via another member. The adjacent edge portions (fitting portions 93 and 94) of the strip member 90 may be connected via a connecting member other than the strip member 90. In that case, the connecting member may be fitted to the strip member 90 before pipe forming and subsequently supplied to the pipe-forming apparatus 3.

In the fifteenth to eighteenth embodiments (FIGS. 41 to 46), the position of the driving part 10 may be adjustable by the angle adjustment mechanism 31a such that the driving part 10 performs a parallel movement in the propelling longitudinal direction LD and the machine-height direction HD.

The expansion and contraction control may be performed by the clamping guide portion 81 and the angle adjustment mechanism 31a being combined and the extrusion force of the following strip portion 92 being adjusted.

INDUSTRIAL APPLICABILITY

The invention can be applied to an existing pipe rehabilitation technique in which rehabilitation pipe lining constitutes an existing pipe such as a sewer pipe and an agricultural water pipe.

REFERENCE SIGNS LIST

ED Extension direction
LD Propelling longitudinal direction
HD Machine-height direction
WD Machine-width direction
1 Existing pipe
3, 3B to 3R Pipe-forming apparatus
9 Rehabilitation pipe (spiral pipe)
9p Fitting position
10 Driving part
13 Driving roller
20 Pipe end guide
21, 22, 25 Guide portion
21a, 22a, 25a Receiving portion
21b, 22b, 25b Engaging portion
21c, 22c, 25c Rotary axis
21f, 22f, 25f Angle holding portion
22e Pressing portion
12 Rear stage pressing portion
23G Movable pressing portion
24 Inside rolling body (rolling body)
26 Outside rolling body (rolling body)
27 Pressing portion biasing device
30 Apparatus frame
31a Angle adjustment mechanism (position adjustment mechanism)
41, 42 Leading roller (acting portion)
51 Torsion spring (acting portion, biasing device)
60, 70 Guide unit
63, 73 Guide portion
63d, 73d Outside rolling body
73f Engaging portion
80 Pipe end guide
81 Clamping guide portion
81a Receiving portion
81b Engaging portion
81d Pressing portion
82 Face side guide portion
83 Reverse side guide portion
83f Engaging portion
84 Inter-guide clearance
90 Strip member
91 Preceding spiral pipe portion
91e Pipe end portion
92 Following strip portion
95b Groove portion

What is claimed is:

1. A pipe-forming apparatus for forming a spiral pipe by joining edges of a strip member adjacent with a difference of one lap with each other while spirally winding the strip member along a peripheral surface of an existing pipe, the pipe-forming apparatus comprising:

an apparatus frame configured to be disposed on a partial part in a circumferential direction of a pipe end portion of a preceding spiral pipe portion formed in advance of the strip member, the pipe end portion being provided on a forefront side in an extending direction along a pipe axis of the preceding spiral pipe portion, and the apparatus frame having a propelling longitudinal direction along a winding direction of the preceding spiral pipe portion;

a driving part provided in the apparatus frame and configured to join the preceding spiral pipe portion with a following strip portion of the strip member following the preceding spiral pipe portion, the driving part being configured to obtain a propelling force by pressing the following strip portion toward the preceding spiral pipe portion, the driving part including a driving roller having a contact part configured to contact the following strip portion, and an axis of the driving roller being oriented in a machine-width direction orthogonal to the propelling longitudinal direction and oriented along the extending direction;

a support plate disposed on a front side in the extending direction from the contact part, the support plate being rotatably supported by the apparatus frame about a rotary axis directed in the machine-width direction;

a non-circular guide portion connected to the support plate at a position on the front side in the extending direction from the contact part, the non-circular guide portion being integrally rotatable with the support plate with respect to the apparatus frame around the rotary axis, and the non-circular guide portion being configured to be applied to an outer peripheral surface on a side of the preceding spiral pipe portion facing the existing pipe; and an acting portion configured to act such that the non-circular guide portion follows the peripheral surface of the existing pipe or the preceding spiral pipe portion, wherein the pipe-forming apparatus is configured to perform pipe-forming in a state where a part of the pipe end portion other than the partial part is released from the pipe-forming apparatus.

2. The pipe-forming apparatus according to claim 1, wherein:

the non-circular guide portion includes a flat-shaped receiving portion; and the acting portion is configured to act such that the flat-shaped receiving portion follows the peripheral surface of the existing pipe or the preceding spiral pipe portion.

3. The pipe-forming apparatus according to claim 1, wherein the acting portion includes a leading roller disposed on a front side of the non-circular guide portion in the propelling longitudinal direction, and the leading roller is capable of coming into contact with the peripheral surface of the existing pipe or the preceding spiral pipe portion.

4. The pipe-forming apparatus according to claim 3, wherein the leading roller, the support plate and the non-circular guide portion are connected so as to be integrally rotatable with each other around the rotary axis.

5. The pipe-forming apparatus according to claim 1, wherein the acting portion includes a biasing device configured to rotationally bias the support plate and the non-circular guide portion around the rotary axis such that a front end portion of the non-circular guide portion in the propelling longitudinal direction faces a face side opposite to an existing pipe side.

6. The pipe-forming apparatus according to claim 1, wherein the rotary axis is disposed on a face side opposite to the non-circular guide portion across the preceding spiral pipe portion.

7. The pipe-forming apparatus according to claim 1, further comprising a plurality of guide units separated from each other in the propelling longitudinal direction, wherein each of the plurality of guide units includes the support plate, the non-circular guide portion and the acting portion.

\* \* \* \* \*